US008041102B2

(12) United States Patent
Yuyama et al.

(10) Patent No.: US 8,041,102 B2
(45) Date of Patent: Oct. 18, 2011

(54) TABLET STORAGE AND TAKE-OUT APPARATUS

(75) Inventors: Shoji Yuyama, Toyonaka (JP); Yoshinori Kumano, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 1002 days.

(21) Appl. No.: 10/587,353

(22) PCT Filed: Jan. 17, 2005

(86) PCT No.: PCT/JP2005/000478
§ 371 (c)(1),
(2), (4) Date: Sep. 14, 2006

(87) PCT Pub. No.: WO2005/072677
PCT Pub. Date: Aug. 11, 2005

(65) Prior Publication Data
US 2007/0169838 A1 Jul. 26, 2007

(30) Foreign Application Priority Data
Jan. 30, 2004 (JP) ................................ 2004-024914

(51) Int. Cl.
*G06K 9/00* (2006.01)
*G06K 9/40* (2006.01)
*G06K 9/20* (2006.01)
*A47F 1/04* (2006.01)

(52) U.S. Cl. ........ 382/142; 382/141; 382/143; 382/153; 382/181; 382/255; 382/274; 382/317; 221/155; 221/154

(58) Field of Classification Search .................. 382/141, 382/142, 143, 153, 181, 255, 274, 317; 221/155; 222/154
See application file for complete search history.

(56) References Cited

U.S. PATENT DOCUMENTS

| | | | | |
|---|---|---|---|---|
| 5,040,228 | A * | 8/1991 | Bose et al. | 382/141 |
| 5,292,029 | A * | 3/1994 | Pearson | 221/2 |
| 5,597,995 | A * | 1/1997 | Williams et al. | 235/375 |
| 5,713,648 | A * | 2/1998 | Geib et al. | 312/249.2 |
| 6,202,923 | B1 * | 3/2001 | Boyer et al. | 235/375 |
| 6,386,367 | B1 * | 5/2002 | Bayliss, IV | 206/534 |
| 6,535,637 | B1 * | 3/2003 | Wootton et al. | 382/190 |
| 6,690,464 | B1 * | 2/2004 | Lewis et al. | 356/326 |
| 6,735,497 | B2 * | 5/2004 | Wallace et al. | 700/231 |
| 6,738,723 | B2 * | 5/2004 | Hamilton | 702/128 |
| 6,771,369 | B2 * | 8/2004 | Rzasa et al. | 356/326 |
| 6,892,941 | B2 * | 5/2005 | Rosenblum | 235/383 |
| 7,221,805 | B1 * | 5/2007 | Bachelder | 382/255 |

(Continued)

FOREIGN PATENT DOCUMENTS

EP 1 102 210 5/2001

(Continued)

*Primary Examiner* — Matthew Bella
*Assistant Examiner* — Michael A Newman
(74) *Attorney, Agent, or Firm* — Wenderoth, Lind & Ponack, L.L.P.

(57) ABSTRACT

A tablet storing/retrieving device which stores a plurality of kinds of medicines, and delivers as many tablets of such descriptions as designated by prescription data into a vial (3) and retrieves it. An imaging device (400) is provided for photographing the interior of the vial before a cap is applied to the vial (3) after tablets are dispensed into the vial (3). Accordingly, a quick and easy auditing process is possible without removing the cap of a retrieved vial.

8 Claims, 57 Drawing Sheets

U.S. PATENT DOCUMENTS

| | | | | |
|---|---|---|---|---|
| 7,747,477 | B1 * | 6/2010 | Louie et al. | 705/28 |
| 2001/0019100 | A1 * | 9/2001 | Ogura et al. | 250/201.2 |
| 2003/0174326 | A1 * | 9/2003 | Rzasa et al. | 356/326 |
| 2003/0176942 | A1 * | 9/2003 | Sleep et al. | 700/213 |
| 2004/0207842 | A1 * | 10/2004 | Rzasa et al. | 356/328 |
| 2008/0056556 | A1 * | 3/2008 | Eller et al. | 382/142 |

FOREIGN PATENT DOCUMENTS

| | | | |
|---|---|---|---|
| JP | A 4-41351 | | 2/1992 |
| JP | A 4-372199 | | 12/1992 |
| JP | A 06-291490 | | 10/1994 |
| JP | 07-262379 | | 10/1995 |
| JP | 10-33636 | | 2/1998 |
| JP | B2 2824378 | | 9/1998 |
| JP | A 11-195899 | | 7/1999 |
| JP | B2 3093339 | | 7/2000 |
| JP | 2001-211382 | | 8/2001 |
| JP | 2001-255260 | | 9/2001 |
| JP | A 2002-50899 | | 2/2002 |
| JP | A 2002-185189 | | 6/2002 |
| JP | 2003-507819 | | 2/2003 |
| JP | 2003-517335 | | 5/2003 |
| JP | A 2003-218595 | | 7/2003 |
| JP | A 2003-298294 | | 10/2003 |
| WO | 00/06078 | | 2/2000 |
| WO | WO 0006078 | A2 * | 2/2000 |
| WO | WO0006078 | A2 * | 2/2000 |
| WO | 01/15006 | | 3/2001 |

* cited by examiner

Robot arm control

Photographing initialization

Photographing control 0.0 Main menu 1.0 Automatic dispensing screen 1.1 In-process prescription list screen 1.1.1 Vial take-out error confirmation screen

*Fig. 47* 1.1.1.1 Vial interior photo display device
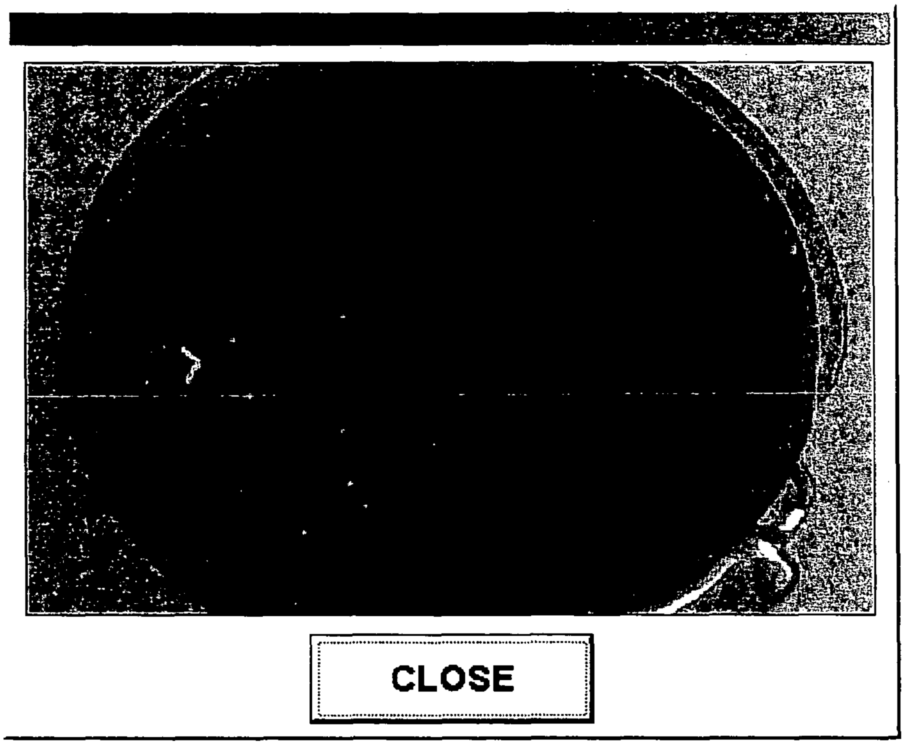
*Fig. 48* 1.2 Drug filling cassette specification screen
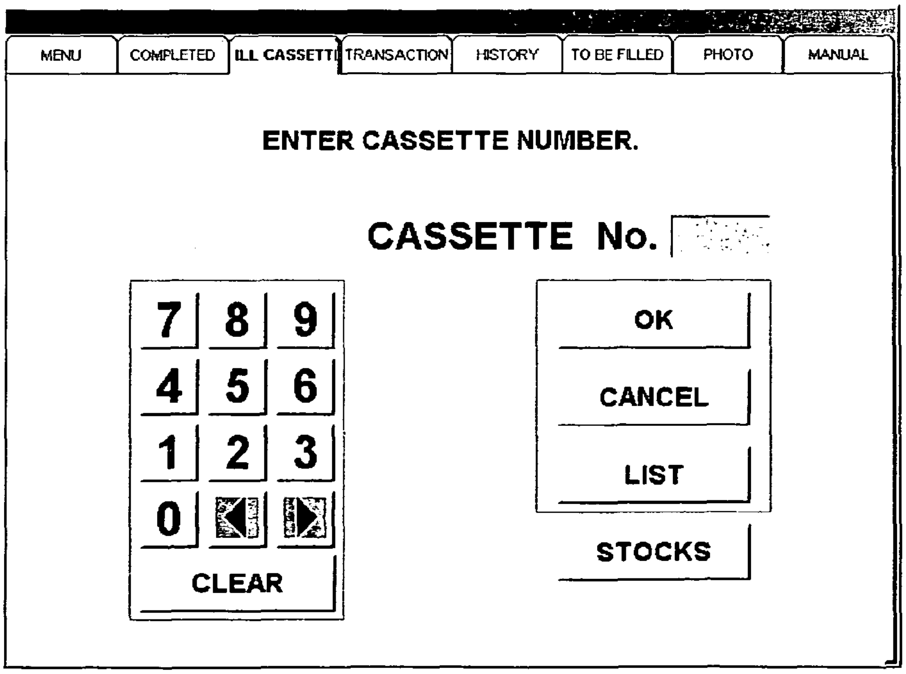

*Fig. 49* 1.2.1a New drug registration screen
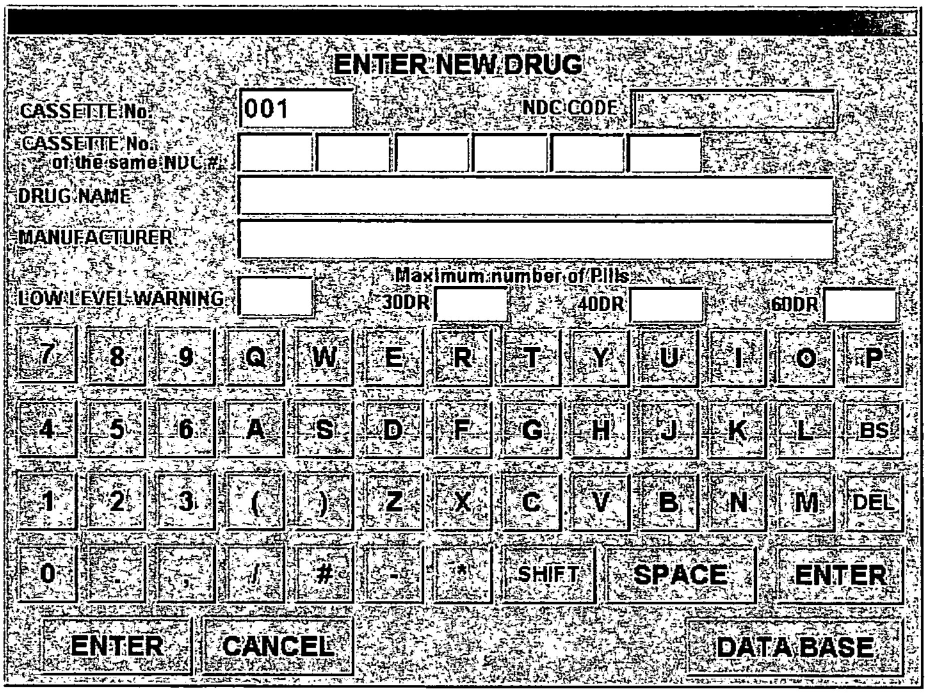
*Fig. 50* 1.2.1a.1 Drug list display screen
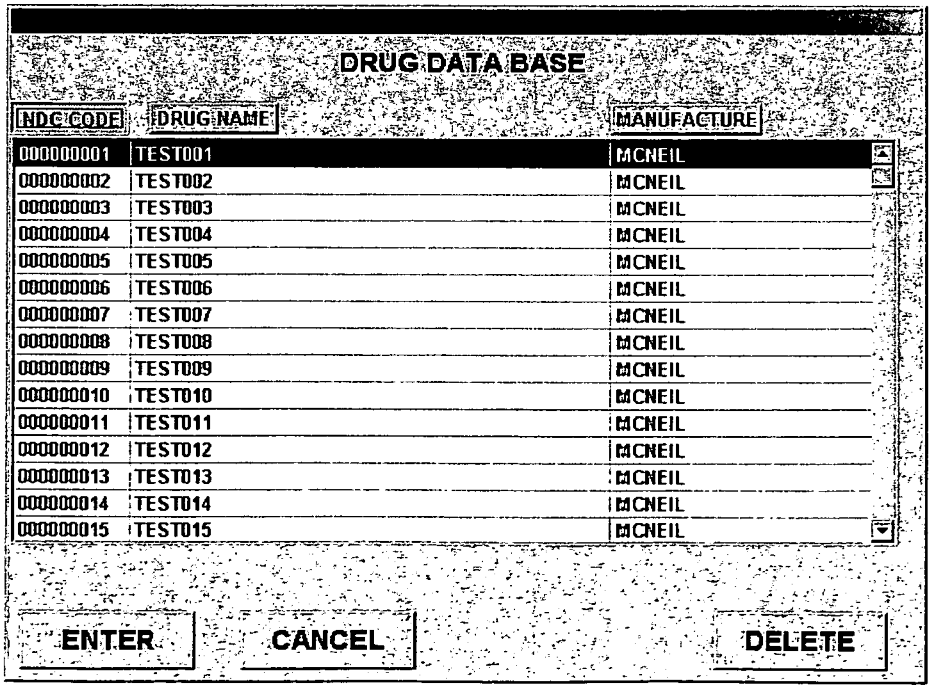

*Fig. 51* 1.2.1a.1.1 NDC master drug delete screen
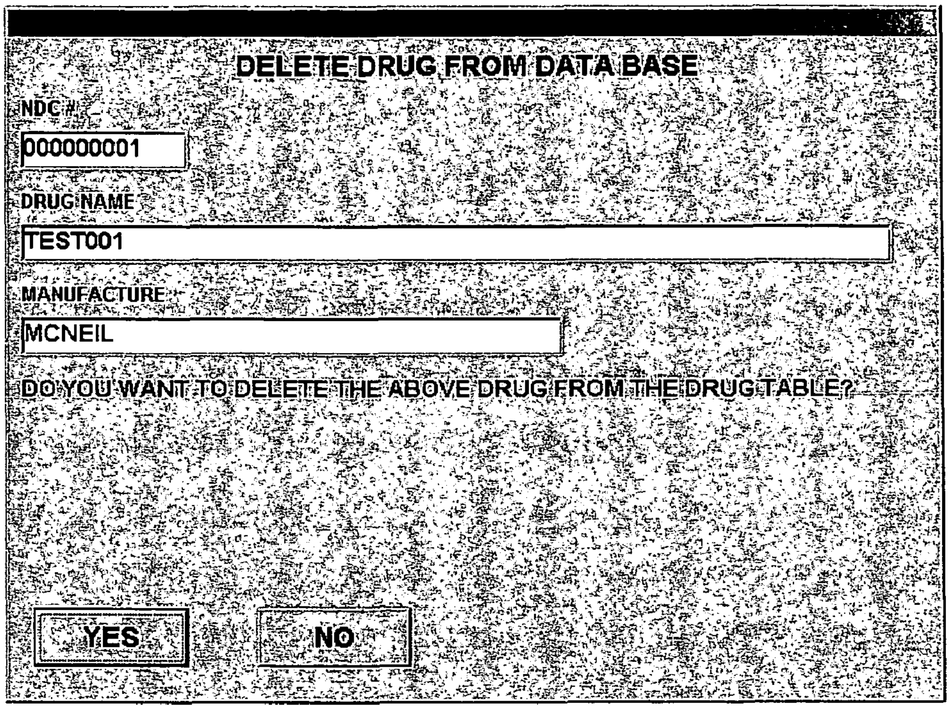
*Fig. 52* 1.2.1b NDC code check screen
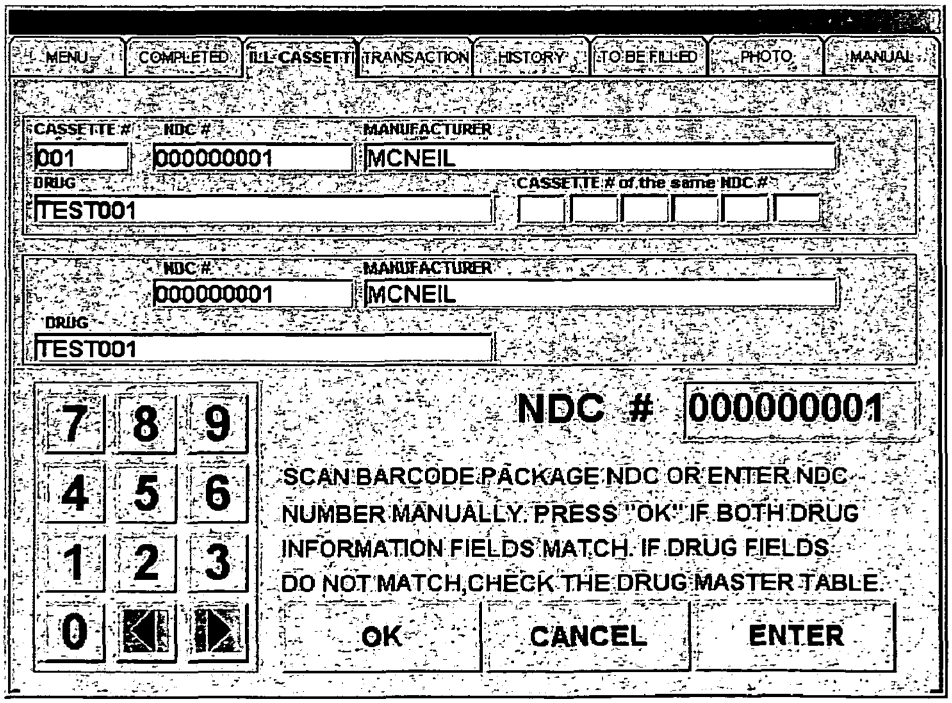

1.2.1b.1 Tablet filling screen 1.2.1b.1.1 Filling confirmation screen 1.2.2 Cassette list screen 1.2.3 Cassette-by-cassette tablet inventory list screen

*Fig. 57* 1.2.3.1 Tablet inventory change screen
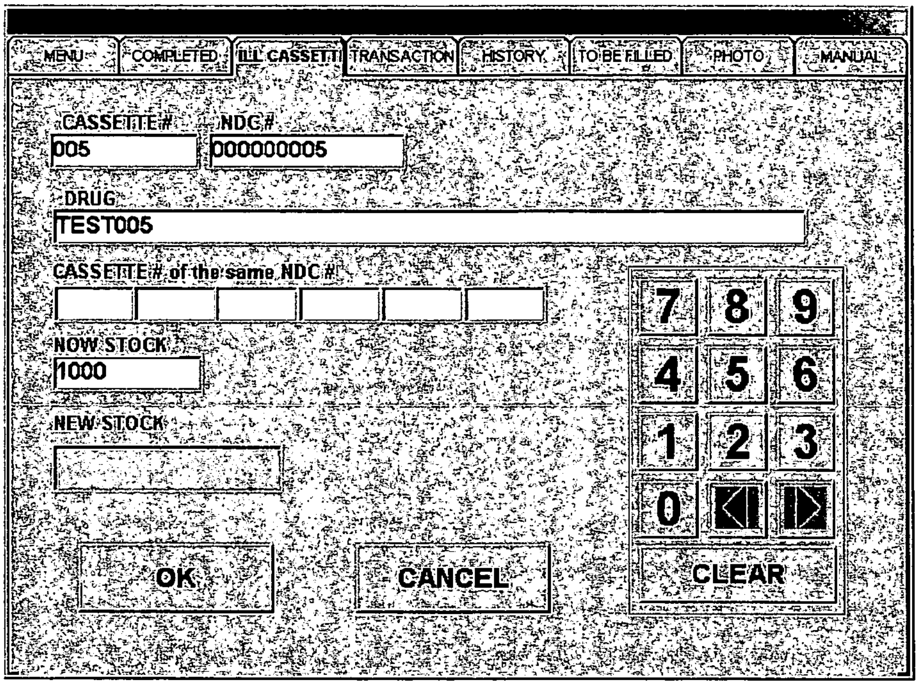
*Fig. 58* 1.3 Processed prescription list screen
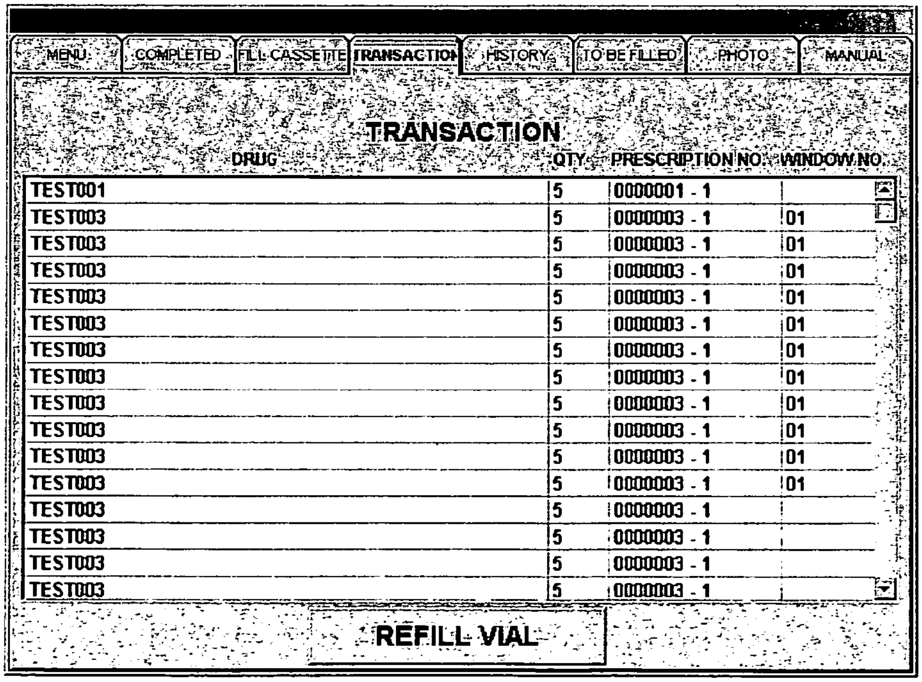

*Fig.59* 1.4 Filling history drug selection screen
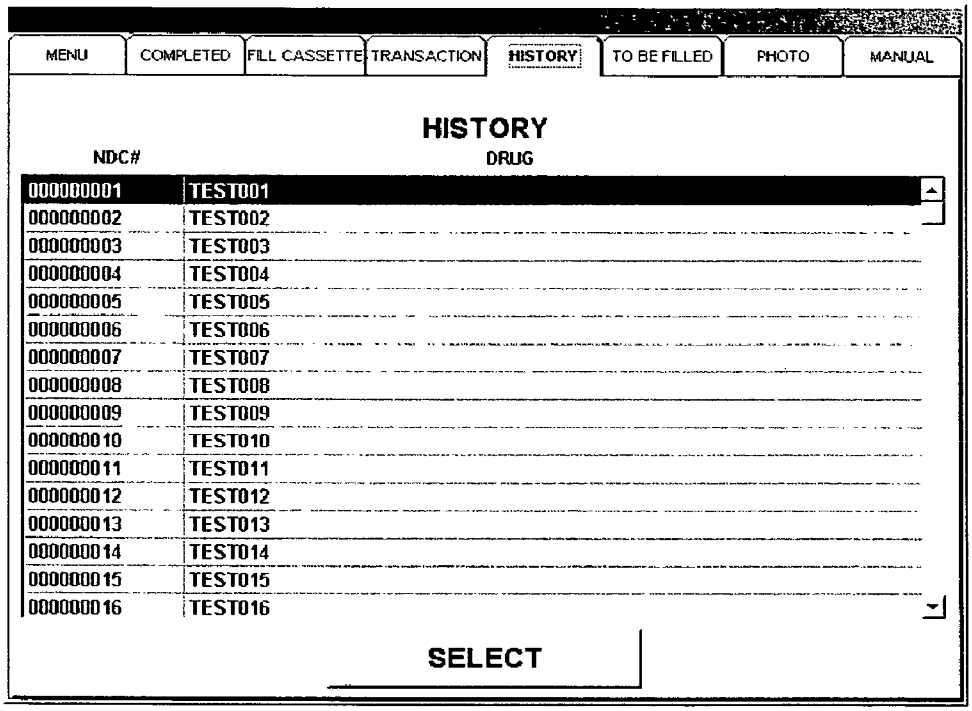
*Fig.60* 1.4.1 Filling history display screen
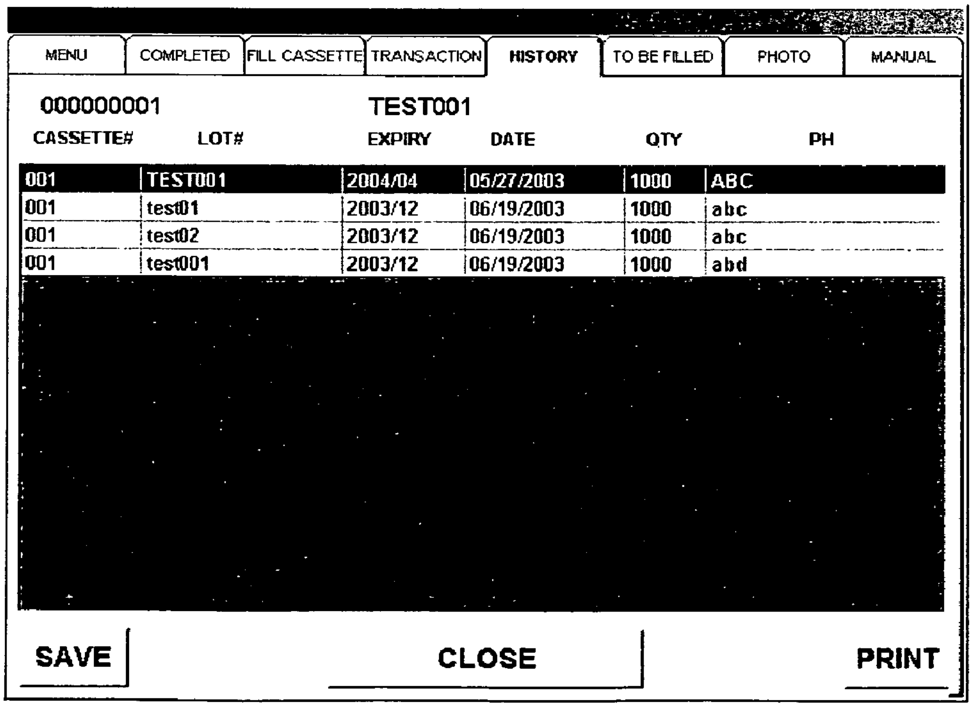

Fig. 61 1.5 Dispensing machine not-yet-transmitted prescription list screen
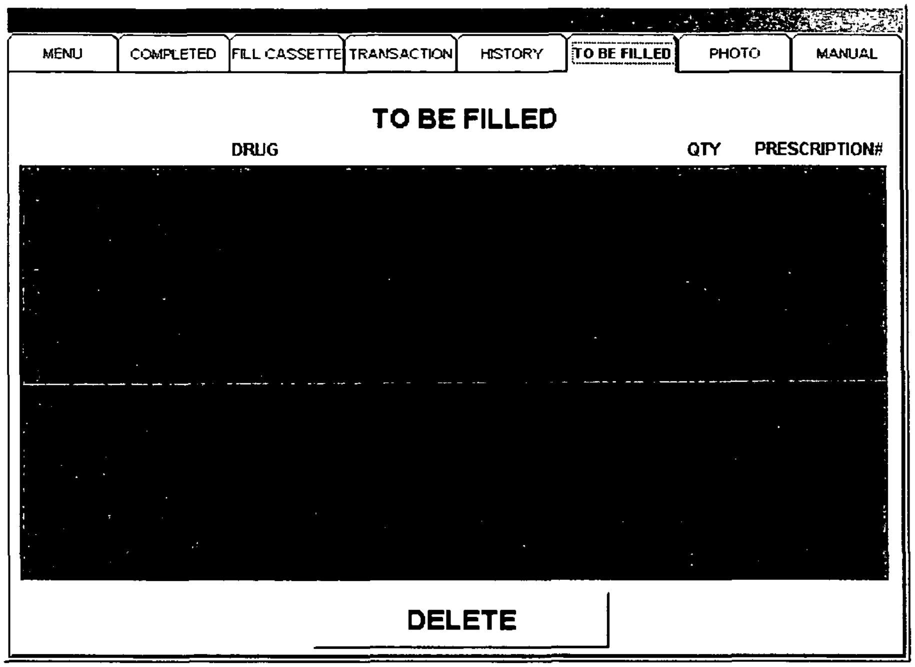
Fig. 62 1.6 Dispensed vial photo list screen
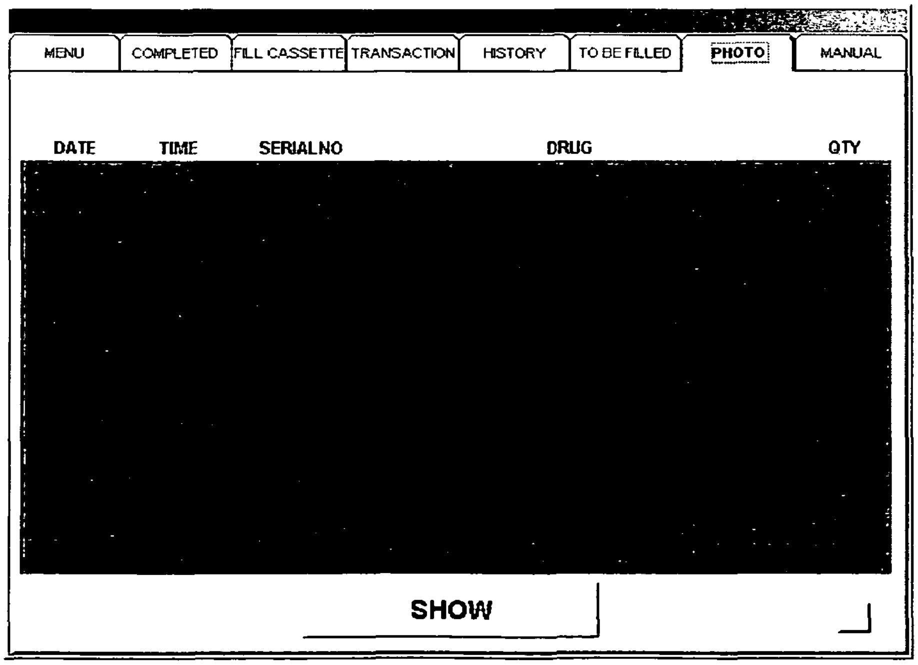

*Fig. 63* 1.6.1 Photo display screen
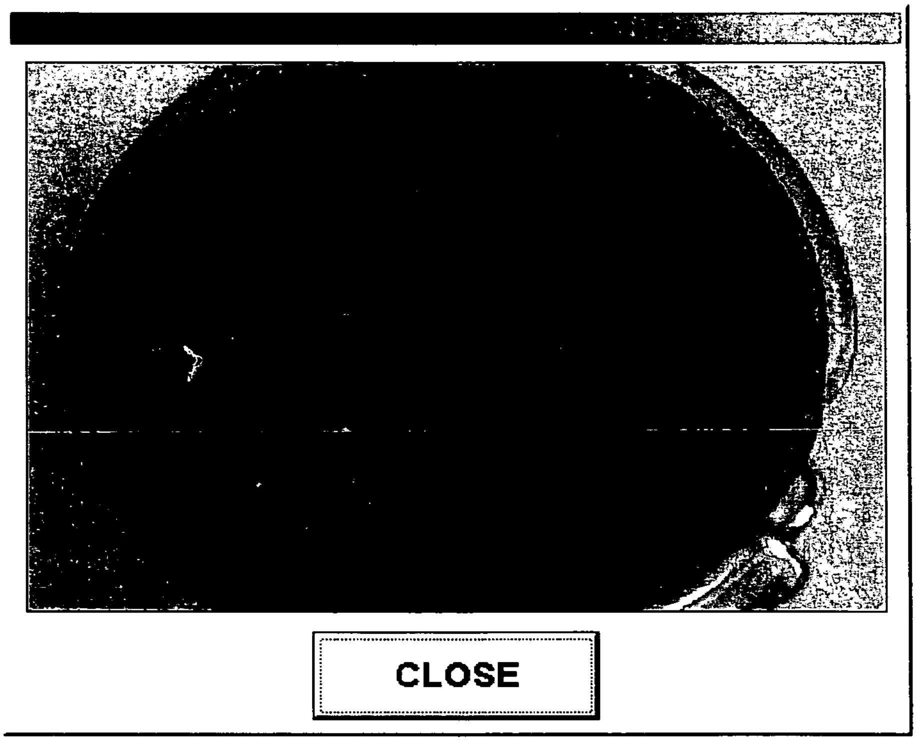
*Fig. 64* 1.7 Manual dispensing cassette designation screen
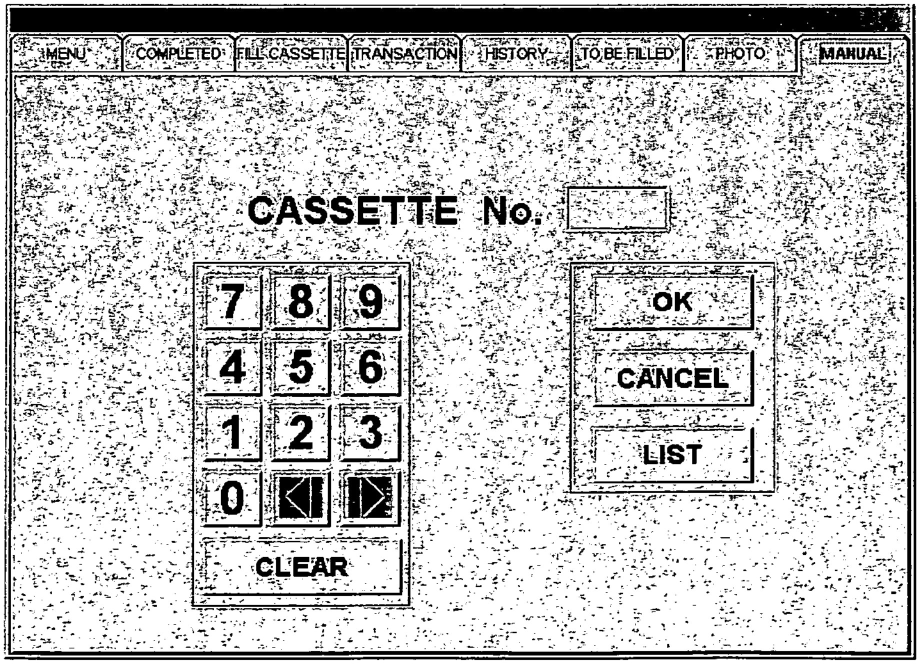

1.7.1 Manual dispensed tablet quantity designation screen 1.7.2 Cassette list screen 2.0 Drug table list screen 2.1 Deleted drug confirmation screen Fig. 69 3.0 Tablet cassette control screen
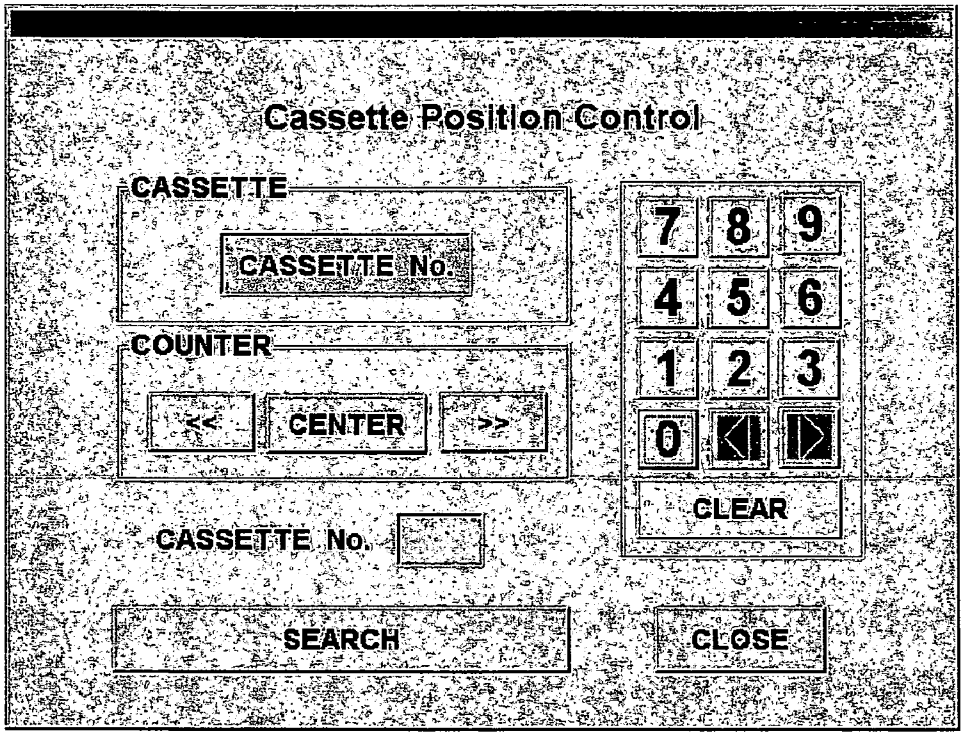
Fig. 70 4.0 Host disconnection screen
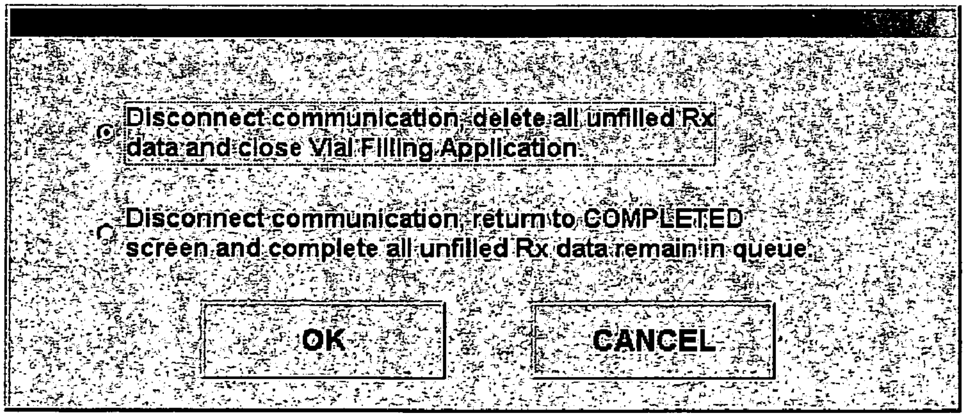

5.0 Date update time setting screen 5.1 Program version information display screen

TABLET STORAGE AND TAKE-OUT APPARATUS

BACKGROUND OF THE INVENTION

1. Technical Field

The present invention relates to a tablet storage and take-out apparatus which stores various kinds of tablets and which fills a vial with tablets in accordance with prescription data so that the vial can be taken out.

2. Description of the Related Art

As a conventional apparatus for filling a vial with tablets, Japanese Patent Application Laid-open No. H10-33636 discloses a drug filler, which has double inner and outer drums whose outer surfaces are fitted with many tablet feeders, guides tablets discharged from these tablet feeders inside the inner and outer drums, introduces the tablets through a drop guide path to a hopper provided below the inner and outer drums, and then fills the tablets into vials supplied from a vial supply part.

In the apparatus of JP H10-33636, in order to conduct an auditing process to determine whether the vial has been filled as prescribed, it has been necessary to open the cap of the vial taken out to check inside, resulting in poor working efficiency of the auditing process.

SUMMARY OF THE INVENTION

In view of the problem described above, the present invention has been made, and it is an object of the invention to provide a tablet storage and take-out apparatus capable of quickly and easily performing the auditing work without opening the cap of the removed vial.

To solve the problem described above, the present invention adopts the following means.

In a tablet storage and take-out apparatus for storing plural kinds of tablets, and filling a vial with a particular type and number of tablets in accordance with prescription data and taking out the vial. The apparatus comprising photographing means for photographing the interior of the vial before attaching the cap on the vial after filling the vial with the tablets.

Here, the tablet storage and take-out apparatus include one in which the vial is filled with tablets and automatically capped and one in which the vial is manually capped. The photographing means includes a digital camera and another one with which it is possible to photograph a state after filling the vial with tablets irrespective of a still image or a moving image.

The apparatus may further comprise a focus control sensor for irradiating the surface of the filled tablets in the vial; and a focus control means for focus controlling the photographing means according to the detection value of the focus control sensor. The photographing data of the photographing means after focus controlling by the focus control means is transferred to a control section of the tablet storage and take-out apparatus. Here, the focus control sensor includes one which irradiates an object with a light to measure a distance to the object.

The apparatus may further comprise an initializing means for initializing the photographing means in accordance with a command from the control section.

The apparatus may further comprise a contrast control means for controlling the contrast of the photographing means in accordance with a command from the control section.

The focus control sensor may be one which irradiates multiple times the surface of the tablets in the vial, and wherein the focus control means adopts as the detection value the mean value of the multiple detection values of the focus control sensor.

The apparatus may further comprise a supporting member for supporting the photographing means on the body of the tablet storage and take-out apparatus. The supporting means is movable horizontally in front and rear and left and light directions and also movable vertically.

According to the present invention, as the photographing means for photographing the interior of the vial before attaching the cap on the vial after filling the vial with the tablets is provided, it is possible to quickly and easily conduct auditing work without opening the cap of the vial that has been taken out.

BRIEF DESCRIPTION OF THE DRAWINGS

FIG. 47 is a view showing Vial interior photo display screen 1.1.1.1;

FIG. 48 is a view showing Drug filling cassette specification screen 1.2;

FIG. 49 is a view showing New drug registration screen 1.2.1*a;*

FIG. 50 is a view showing Drug list display screen 1.2.1*a*.1;

FIG. 51 is a view showing NDC master drug delete screen 1.2.1*a*.1.1;

FIG. 52 is a view showing NDC code check screen 1.2.1*b;*

FIG. 57 is a view showing Tablet inventory change screen 1.2.3.1;

FIG. 58 is a view showing Processed prescription list screen 1.3;

FIG. 59 is a view showing Filling history drug selection screen 1.4;

FIG. 60 is a view showing Filling history display screen 1.4.1;

FIG. 61 is a view showing Dispensing machine not-yet-transmitted prescription list screen 1.5;

FIG. 62 is a view showing Dispensed vial photo list screen 1.6;

FIG. 63 is a view showing Photo display screen 1.6.1;

FIG. 64 is a view showing Manual dispensing cassette designation screen 1.7;

FIG. 69 is a view showing Tablet cassette control screen 3.0;

FIG. 70 is a view showing Host disconnection screen 4.0;

DETAILED DESCRIPTION OF THE INVENTION

Figure 1:
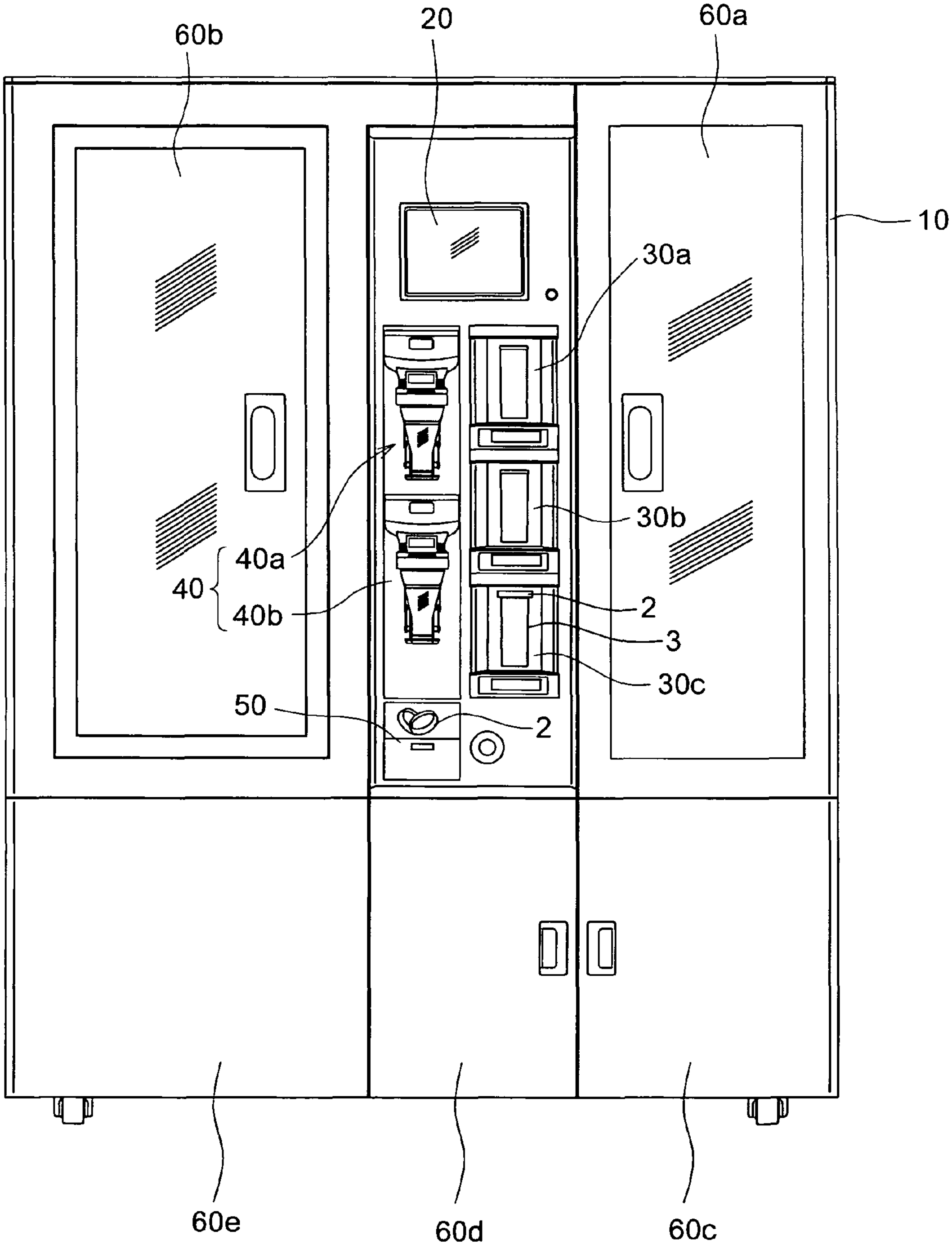
FIG. 1 is an elevation view of a tablet storage and take-out apparatus according to the present invention.
Figure 2:
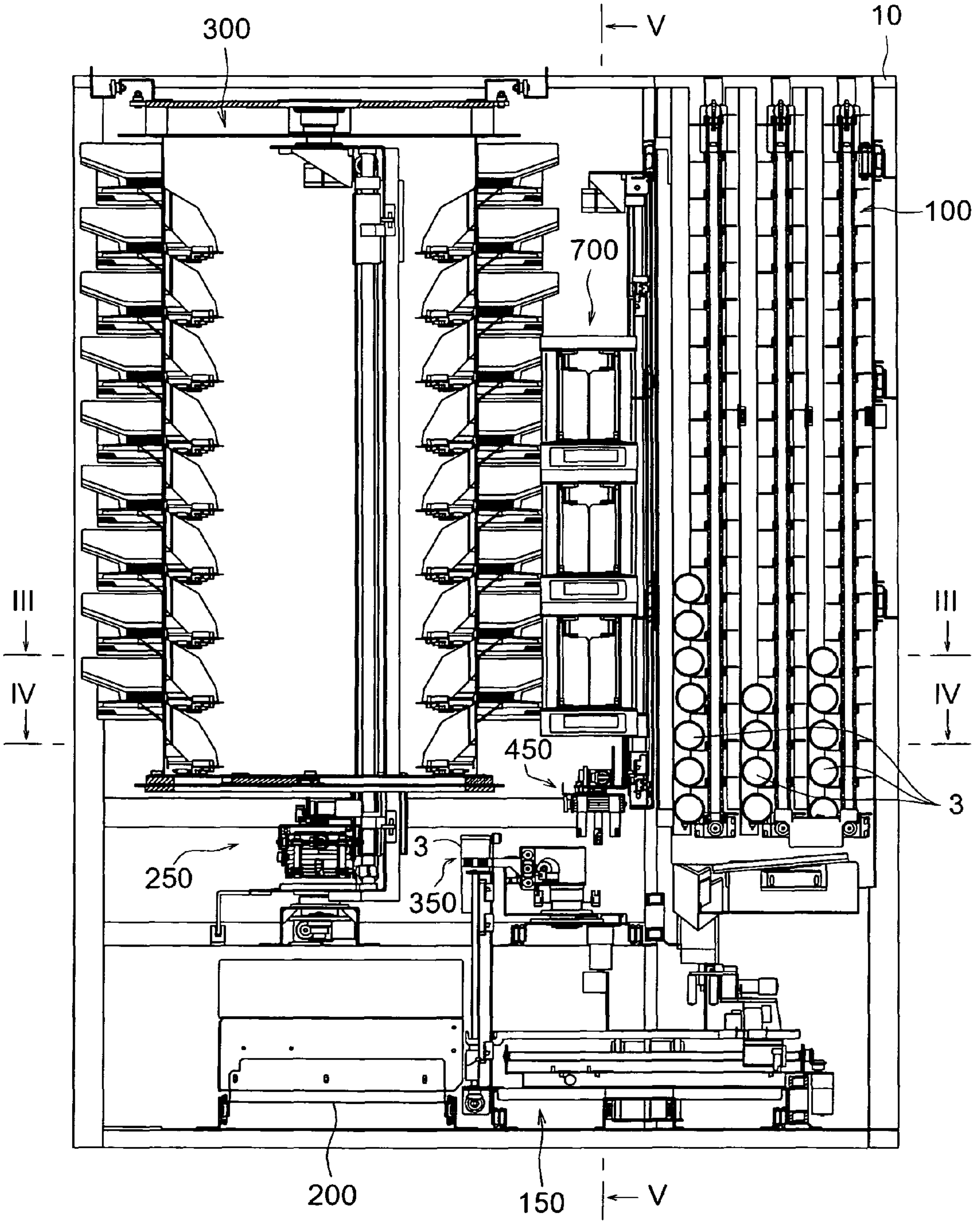
FIG. 2 is an elevation view of the interior of the tablet storage and take-out apparatus of FIG. 1.
Figure 3:
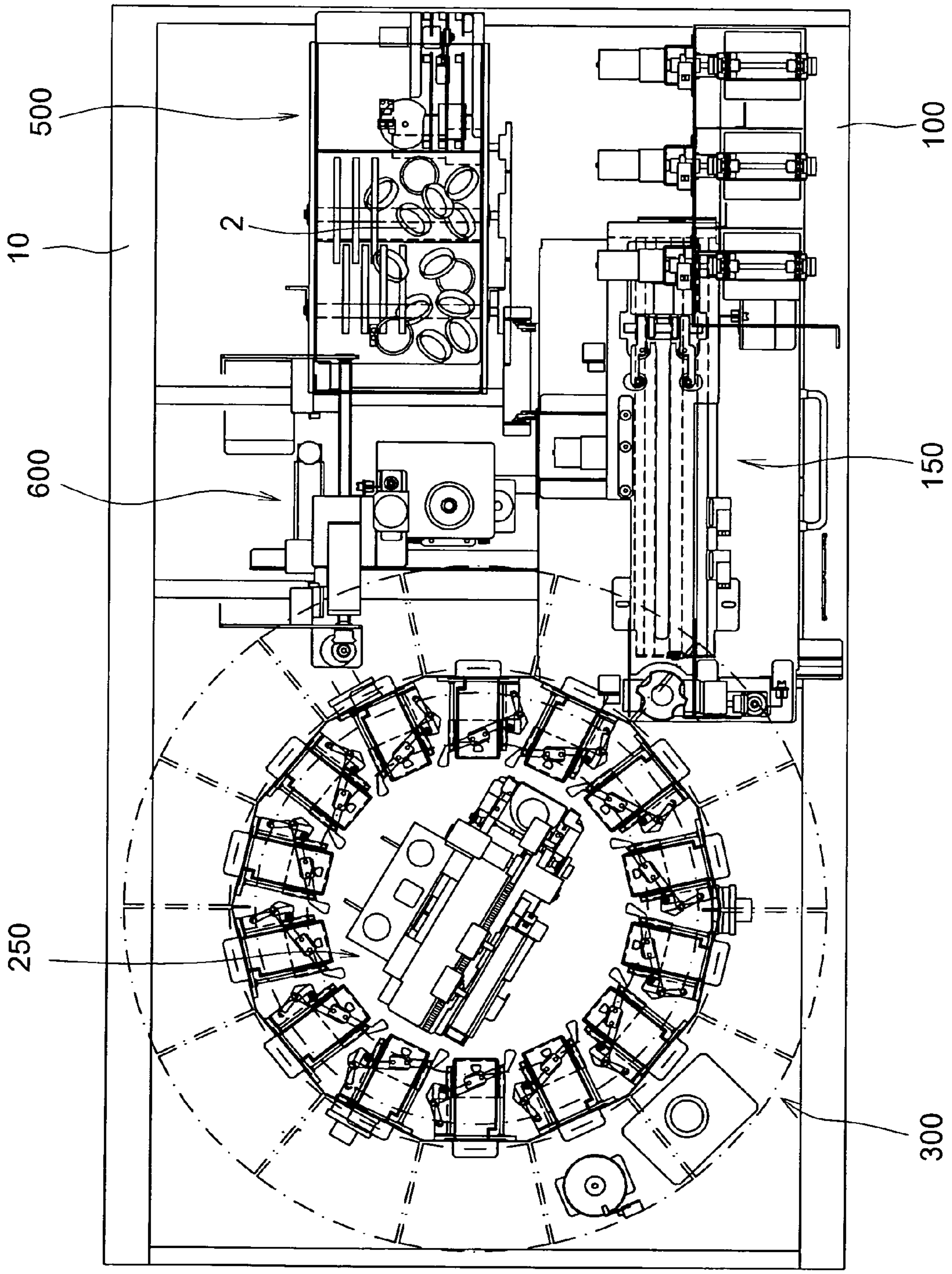
FIG. 3 is a cross section taken on line of FIG. 2.
Figure 4:
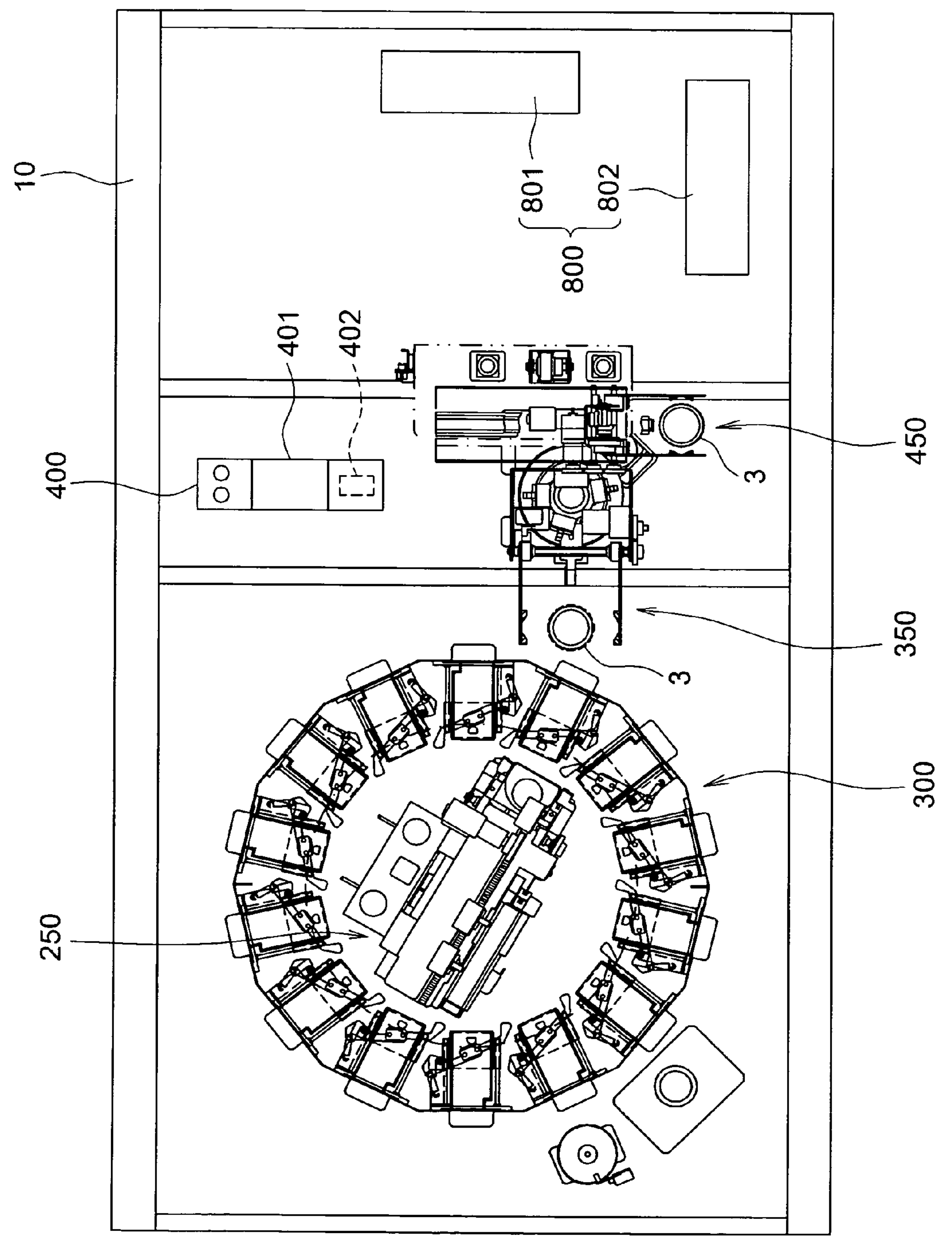
FIG. 4 is a cross section taken on line IV-IV of FIG. 2.
Figure 5:
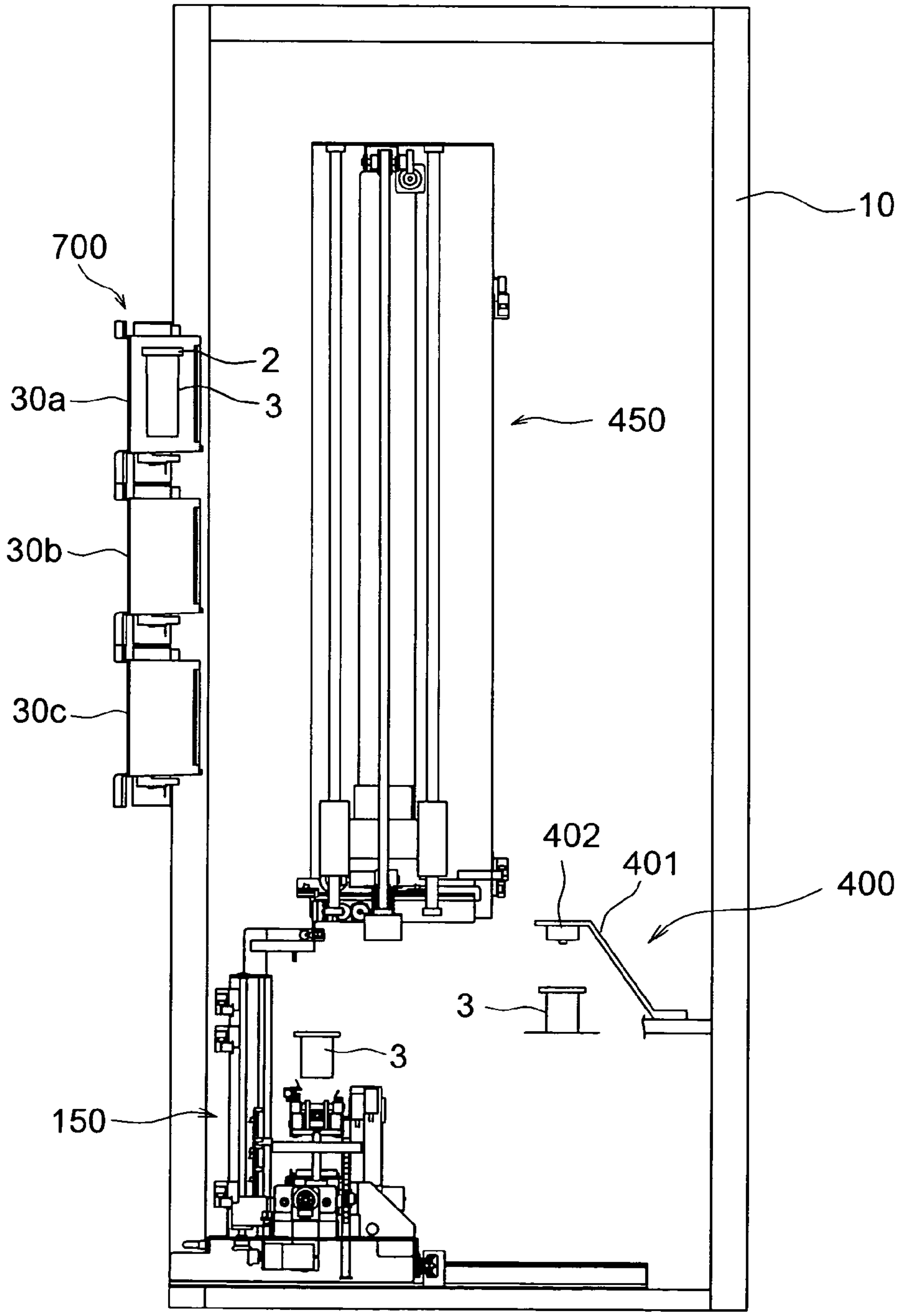
FIG. 5 is a cross section taken on line V-V of FIG. 2.

FIG. 1 is an elevation view of a tablet storage and take-out apparatus 1 according to the invention. FIG. 2 is an elevation view of the interior of the tablet storage and take-out apparatus 1. FIG. 3 is a cross section taken on line of FIG. 2. FIG. 4 is a cross section taken on line IV-IV of FIG. 2. FIG. 5 is a cross section taken on line V-V of FIG. 2.

1. Overall Arrangement and Construction

First, a description will be given on the overall arrangement and construction of the tablet storage and take-out apparatus 1. As shown in FIG. 1, at the upper center of a main body 10 as viewed from the front, an operation display panel 20 is provided which provides displays required for operating the tablet storage and take-out apparatus 1. To the lower right of the operation display panel 20, three vial take-out ports 30*a*, 30*b*, and 30*c* are provided. To the lower left thereof are provided auxiliary tablet supply parts 40 (40*a*, 40*b*), under which an auxiliary cap storage part 50 is provided. The auxiliary tablet supply parts 40 store two different kinds of pyrazolone tablets respectively, and supply tablets in accordance with prescription data. The auxiliary cap storage part 50 randomly stores a large number of caps 2 and permits them to be manually taken out when necessary. At the upper right side of the tablet storage and take-out apparatus 1 as viewed from the front is provided a door 60*a* for replacing a vial 3. At the left side thereof is provided a door 60*b* for replacing and refilling tablets. At the bottom thereof are also provided doors 60*c*, 60*d*, and 60*e* for maintenance.

Inside the tablet storage and take-out apparatus 1, as shown in FIGS. 2, 3, 4, and 5, there are provided: a vial supply part 100, a labeling part 200, a tablet supply part 300, a photographing part 400, a cap supply part 500, a capping part 600, and a storage part 700. The vial supply part 100 is provided on the right side of the main body 10 as viewed from the front, as shown in FIG. 2, and stores a large number of vials 3 by size and supplies, one-by-one, vials 3 of a size suitable for receiving a prescribed number of tablets in accordance with prescription data. The labeling part 200 is provided at the lower center of the main body 10 as viewed from the front, and puts a label with printed prescription information on a vial 3 supplied from the vial supply part 100. The tablet supply part 300 is provided on the left side of the main body 10, and stores a large number of tablets (non-pyrazolone) by type and supplies tablets in accordance with prescription data. The photographing part 400 is provided, as shown in FIG. 4, on the center back side of the main body 10, and photographs a vial 3 from above for audit of tablets filled into the vial 3. The cap supply part 500 is provided, as shown in FIG. 3, on the right side of the main body 10 and behind the vial supply part 100, and stores caps 2 for plugging the vials 3, and supplies the caps one-by-one. The capping part 600 is provided on the center back side of the main body 10, and plugs a vial 3, which is filled with tablets, with a cap 2 supplied from the cap supply part 500. The storage part 700, as shown in FIG. 5, stores vials 3 filled with tablets and plugged with a cap 2 so that they can be taken out by an operator through take-out ports 30*a*, 30*b*, and 30*c*.

The tablet storage and take-out apparatus 1 is further provided, as shown in FIG. 2, with a first transfer robot 150, a second transfer robot 250, a third transfer robot 350, and a fourth transfer robot 450. The first transfer robot 150 is provided below the vial supply part 100, and can hold a vial 3 supplied from the vial supply part 100, transfer it leftward from the vial supply part 100 to the labeling part 200 in the horizontal direction of the main body, and transfer it upward from the labeling part 200 to the second transfer robot 250 or the third transfer robot 350. The second transfer robot 250 is provided inside the tablet supply part 300, and can hold a vial 3 delivered from the first transfer robot 150, transfer it to supply ports of the tablet supply part 300, and transfer it from the supply ports to the third transfer robot 350. The third transfer robot 350 is provided above the first transfer robot 150 in the main body 10, and can deliver, between the capping part 600 and the fourth transfer robot 450, a vial 3 delivered from the first transfer robot 150 or the second transfer robot 250. The fourth transfer robot 450 is provided above the third transfer robot 350, and can transfer a vial 3 delivered from the third transfer robot 350 upward to the storage part 700.

Figure 6:
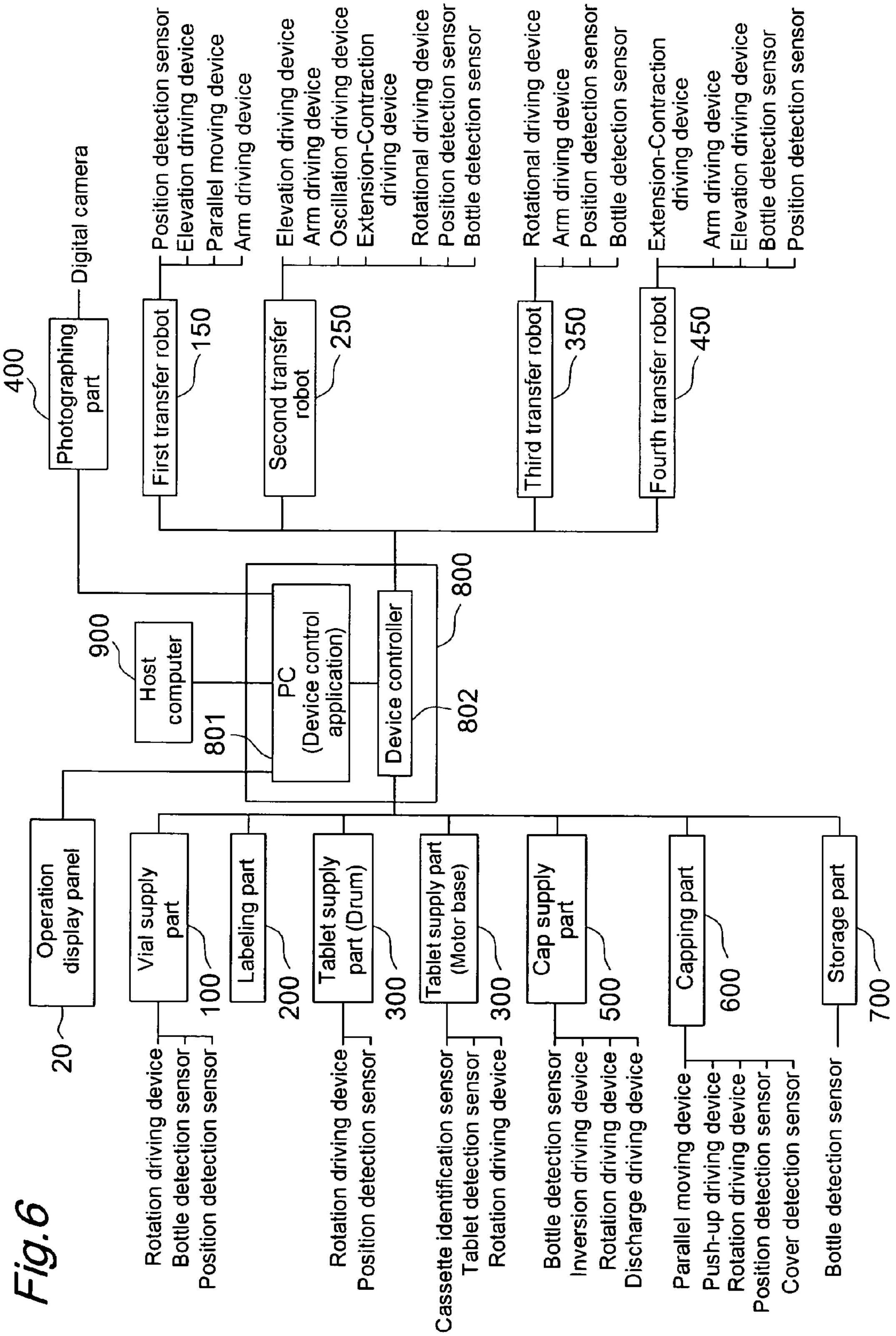
FIG. 6 is a block diagram of control performed by a control part.

In the tablet storage and take-out apparatus 1, as shown in FIG. 4, a control part 800 is provided on the right side of the main body 10. The control part 800 is, as shown in FIG. 6, composed of a personal computer (PC) 801 in which apparatus control applications are installed; and a device controller 802 composed of a micro computer and the like. The PC 801 is connected to a host computer 900 installed in a hospital or a drug store, and receives inputted data such as prescription data and the like. The PC 801 is also connected to the operation display panel 20, and outputs display information required for the operation of the tablet storage and take-out apparatus 1 and also receives operation information inputted through the touch panel on the operation display panel 20. Furthermore, the PC 801 is connected to a digital camera provided in the photographing part 400. The device controller 802 is connected to sensors and driving devices of the vial supply part 100, the labeling part 200, the tablet supply part 300, the cap supply part 500, the capping part 600, and the storage part 700 so as to drive and control these parts. Moreover, the device controller 802 is connected to sensors and driving devices of the first transfer robot 150, the second transfer robot 250, the third transfer robot 350, and the fourth transfer robot 450 so as to drive and control these parts.

Hereinafter, a detailed description will be given on the tablet supply part 300, the second transfer robot 250, the third transfer robot 350, and the photographing part 400 of the tablet storage and take-out apparatus 1 provided with the overall arrangement and construction as described above. The other parts are not related to the present invention, and thus are omitted from the description.

2. Tablet Supply Part 300

The tablet supply part 300 is composed of a drum 301 and tablet feeders 340.

2.1 Drum

FIGS. 7 to 10 show the structure of the drum 301. The drum 301 is composed of a fixed half drum 301*a* and a movable half drum 301*b*. The fixed half drum 301*a* and the movable half drum 301*b* are each formed by bending a metal plate material, such as stainless steel, into a polyhedral half-cylinder (half-cylindrical polyhedron). The fixed half drum 301*a* and the movable half drum 301*b* are combined together into a cylinder which is then arranged with its axis oriented vertically.

Figure 7:
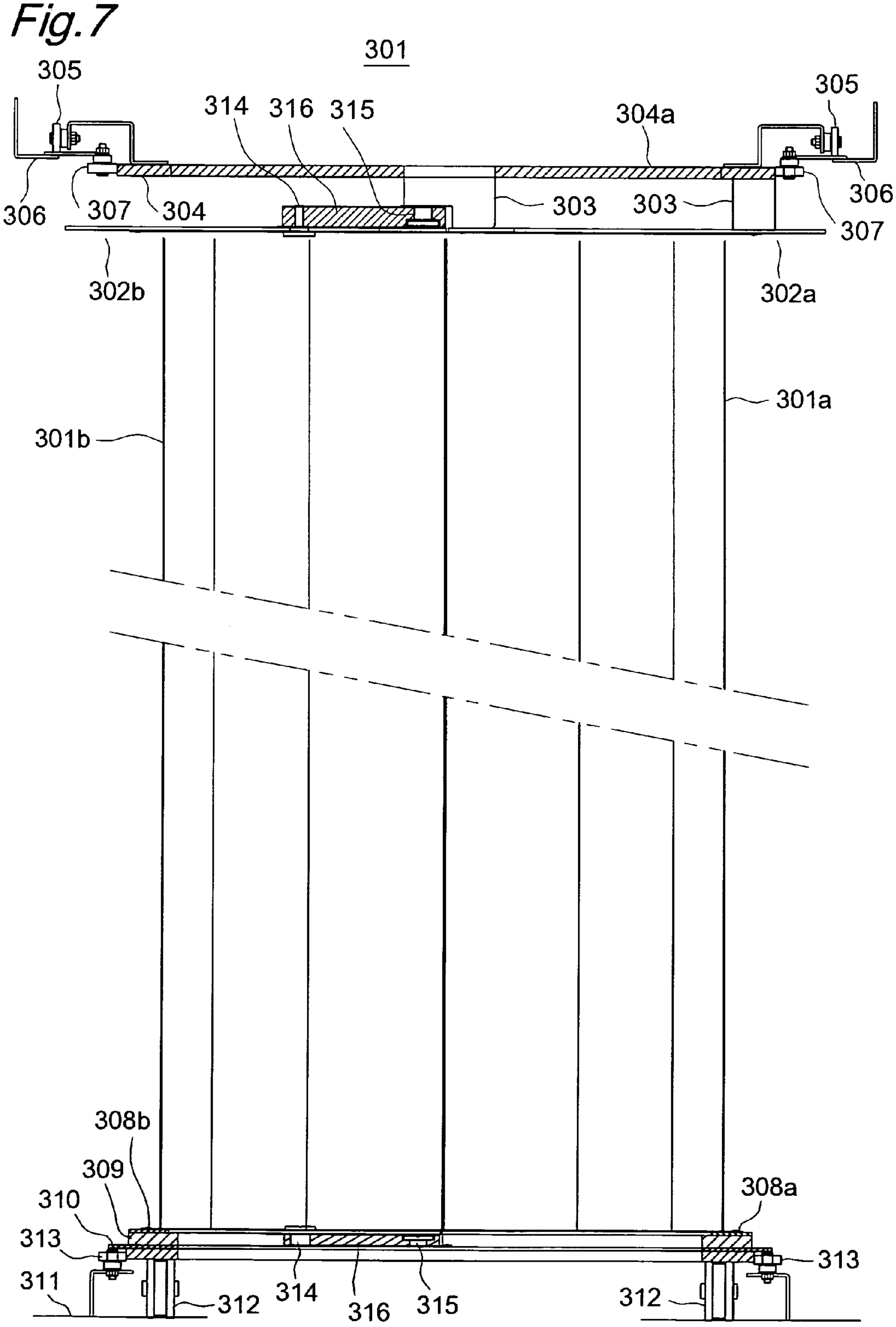
FIG. 7 is a vertical cross section of a drum.
Figure 8:
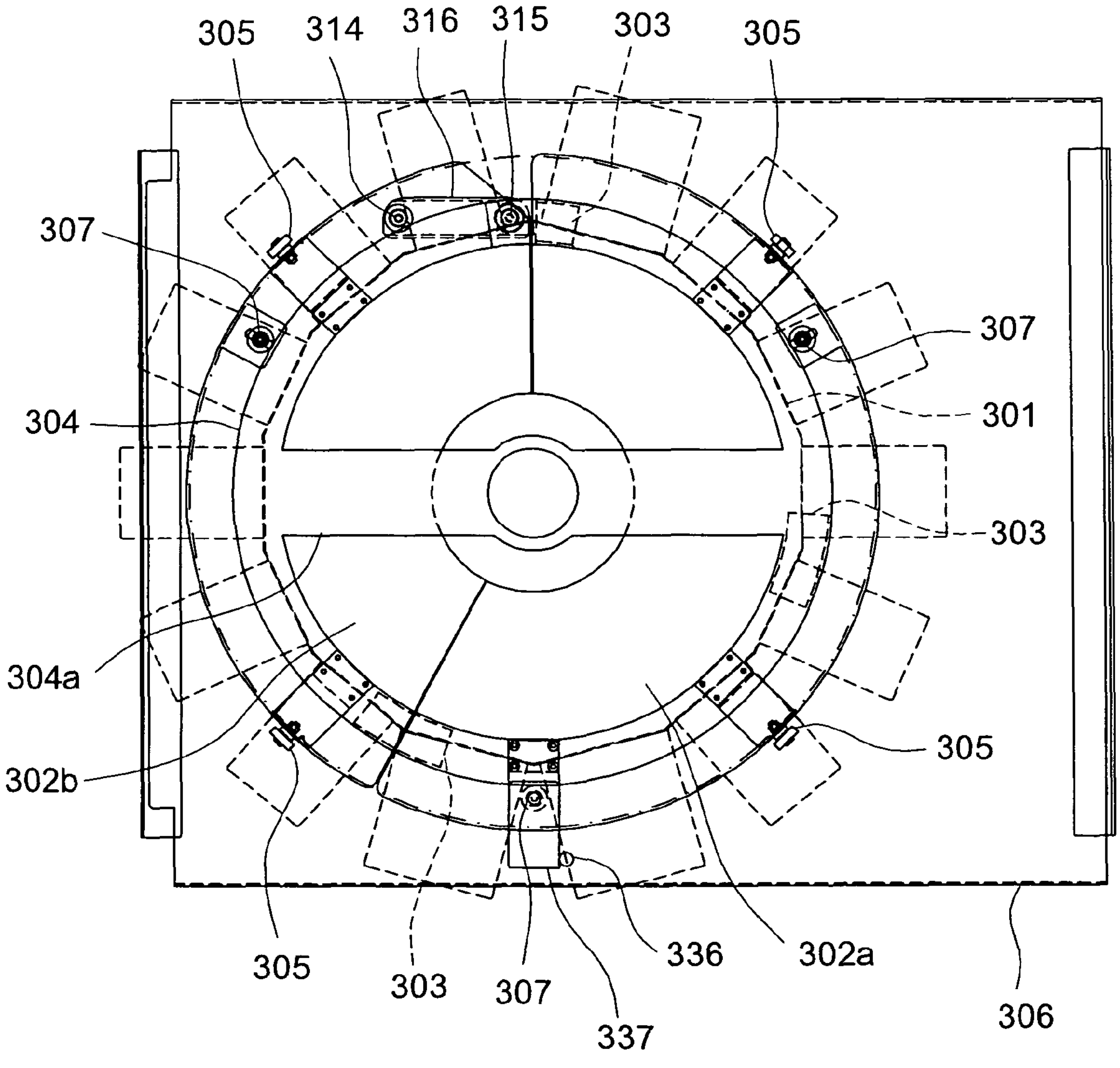
FIG. 8 is a plan view of the drum.
Figure 9:
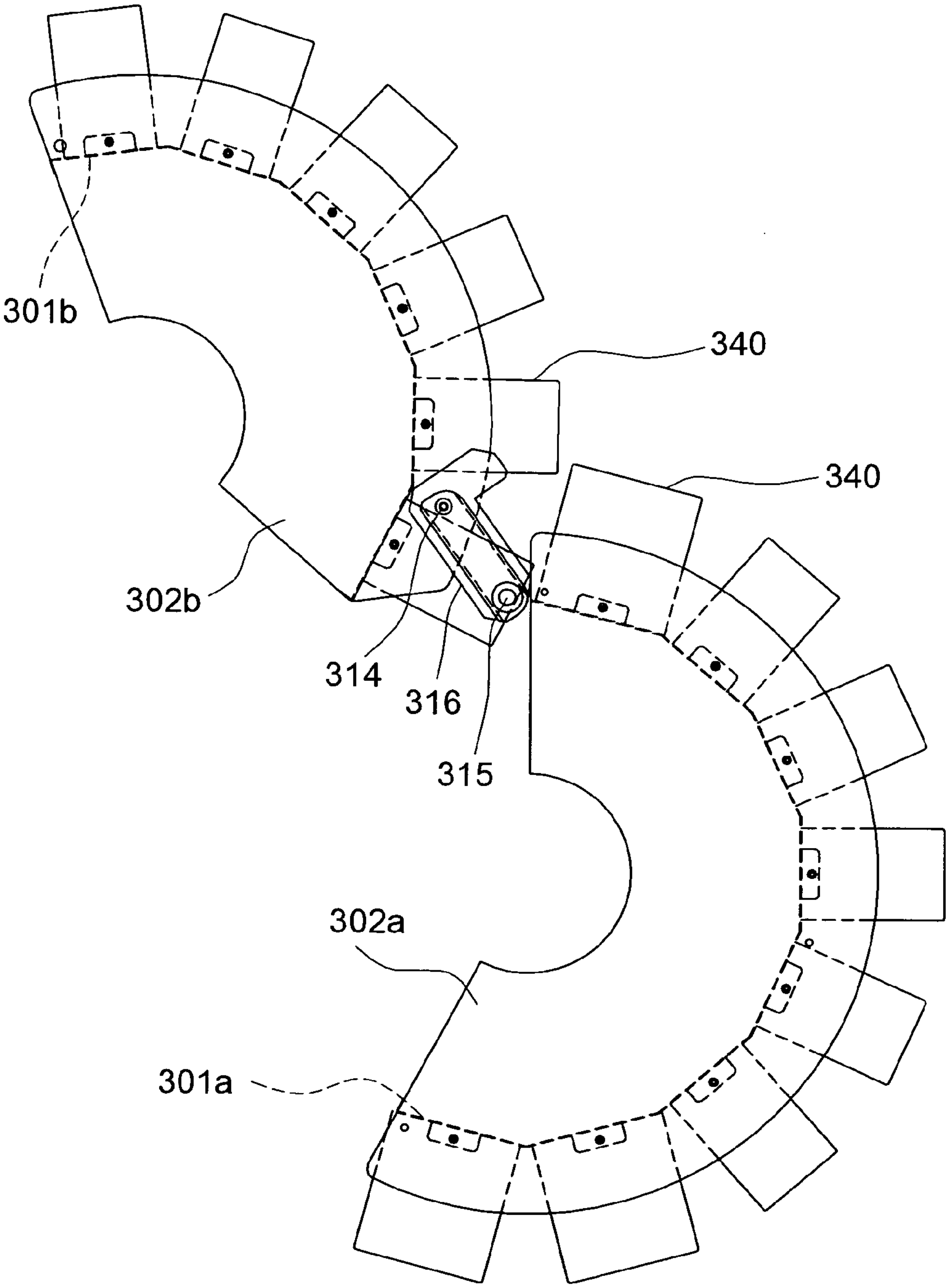
FIG. 9 is a plan view of the drum in an open state.

To the upper end of the fixed half drum 301*a*, a half top panel 302*a* is fixed which has a substantially fan-like shape as shown in FIG. 9. On the half top panel 302*a*, an upper ring 304 is fitted with three spacers 303 in between as shown in FIG. 8. In a space facing the inner circumference of the upper ring 304 is integrally provided a stay 304*a* for fitting the second transfer robot 250. To the outer circumference of the upper ring 304, a plurality of support rollers 305 are fitted which are respectively placed in a rollable manner on the upper surface of an upper support member 306 provided in the main body 10. The outer circumferential end surface of the upper ring 304 is guided by guide rollers 307 fitted to the upper support member 306. As shown in FIG. 7, to the lower end of the fixed half drum 301*a* is fixed a half ring 308*a*, below which a lower ring 309 is fitted. A gear 310 is formed on the outer circumferential end surface of the lower ring 309. The bottom surface of the lower ring 309 is supported by a plurality of support rollers 312 that are fitted to a lower support member 311 provided in the main body 10. The outer circumferential end surface of the lower ring 309 is guided by a plurality of guide rollers 313 fitted to the lower support member 311.

Figure 10:
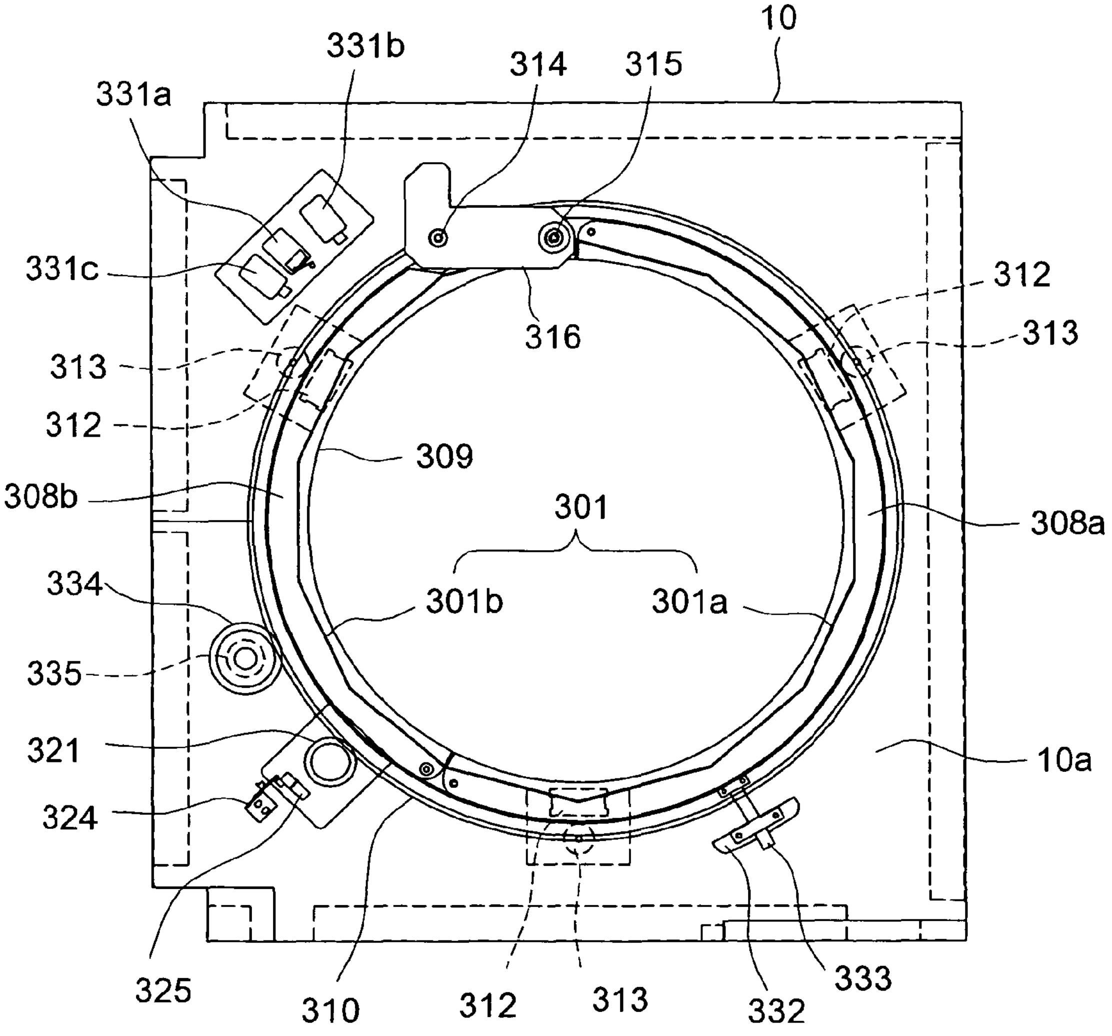
FIG. 10 is a transverse cross section of the bottom portion of the drum.

To the upper end of the movable half drum 301*b*, a half top panel 302*b* is provided which has a substantially fan-like shape as shown in FIG. 9, and to the lower end thereof, a half ring 308*b* is fixed as shown in FIG. 10. Spindles 314 provided at the top and bottom ends of one circumferential end portion of the movable half drum 301*b* are, as shown in FIGS. 8 and 9, rotatably fitted to ends of links 316 whose other ends are rotatably fitted with spindles 315 in between to the upper ring 304 and the lower ring 309, respectively. This permits the movable half drum 301*b* to be rotatable between a working position, where the movable half drum 301*b* faces the fixed half drum 301*a* so as to be formed together into a cylinder, and an open position as shown in FIG. 9, where the movable half drum 301*b* separates from the fixed half drum 301*a* thereby opening the inside of the drum 301. The other circumferential end of the movable half drum 301*b* is disengageably coupled to a circumferential end portion of the fixed half drum 301*a*. The link 316 moves when the fixed half drum 301*a* is opened from the working position to the open position, thus permitting this opening operation at a wide angle while preventing the tablet feeders 340 of the movable half drum 301*b* from interfering with the tablet feeders 340 of the fixed half drum 301*a*.

2.2 Drum Driving Part

FIGS. 11A to 11C show a driving unit 317 for driving the drum 301 into rotation and a manual operation unit 318. These units 317 and 318 are provided on the bottom surface of a base 10*a* in the main body 10. The driving unit 317 is formed by fitting a drum rotation driving motor 320 to the bottom surface of a slide plate 319 and fitting a driving gear 321 to a driving shaft projecting therefrom. A slide plate 319 is so fitted as to be slidable by a pair of guides 322 so that the driving gear 321 is disengaged from the gear 310 of the drum 301. A driving pin 323 projects from the bottom surface of the slide plate 319. To the top surface of the slide plate 319, a detected piece 325 is fitted. The detected piece is to be detected by a sensor 324 provided on the base 10*a*. The manual operation unit 318 is built by fitting a control lever 327, a link 328, and a slide shaft 329 to a support plate 326 fitted to the lower support member 311 of the main body 10. The control lever 327 is so fitted as to be rotatable about a spindle 327*a*. The link 328 is fitted near the spindle 327*a* of the control lever 327 so as to be rotatable by a pin 328*a*. The slide shaft 328 is inserted in a guide member 330 so as to be slidable in the same direction as the slide plate 319. The slide shaft 329 has one end thereof rotatably fitted to the link 328 with a pin 328*b* in between and has the other end thereof fitted to the driving pin 323 of the slide plate 319.

Figure 11:
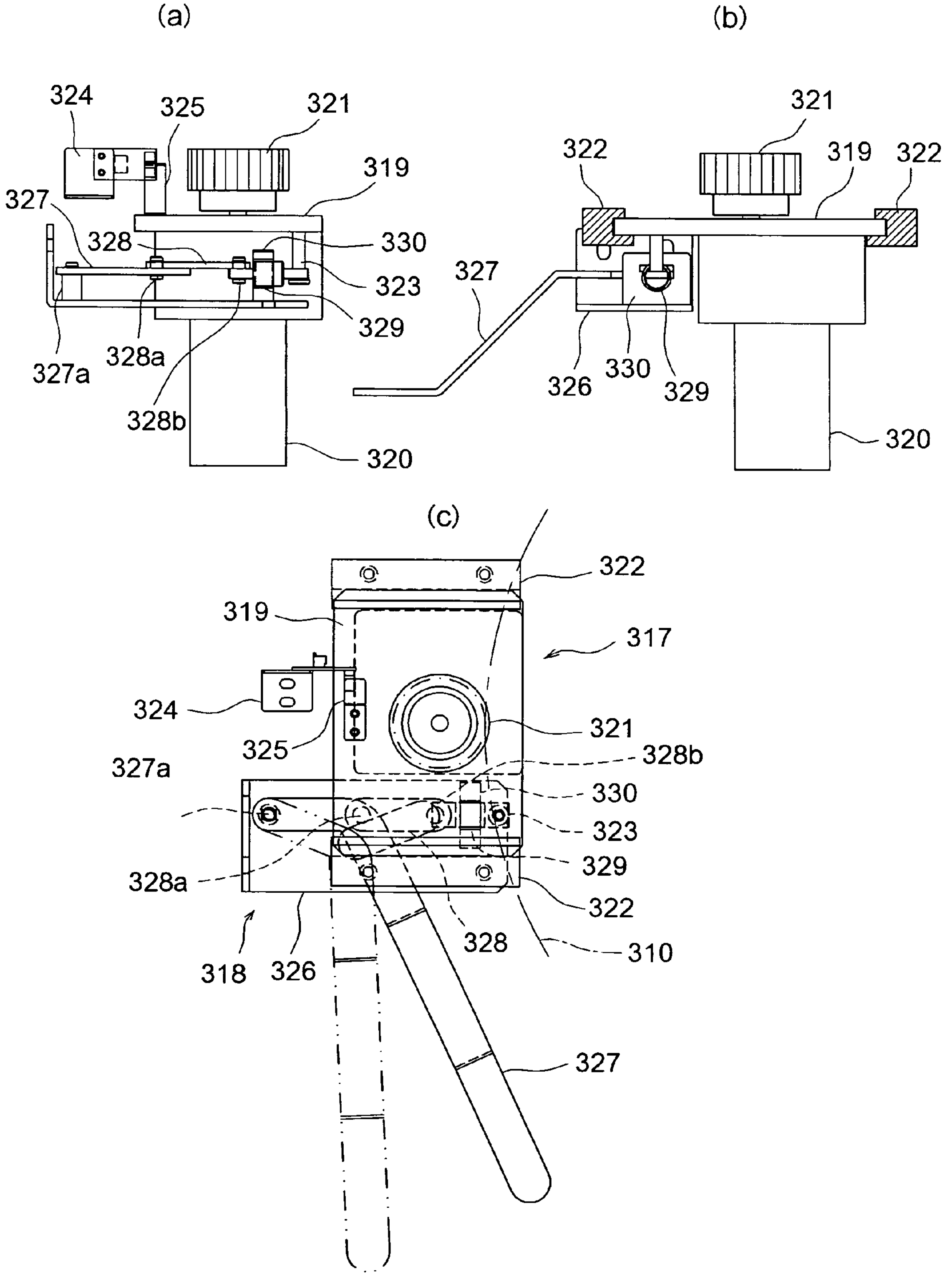
FIG. 11A is a side view of a drum driving unit.
FIG. 11B is a front view thereof.
FIG. 11C is a plan view thereof.

In the drum driving part described above, pressing the control lever 327 toward the drum 301 as shown in FIG. 11 causes the slide shaft 329 to move through the link 328, whereby the driving pin 323 is pressed. This causes the slide plate 319 to slide to engage with the gear 310 of the drum 301 as shown in FIG. 10, thereby permitting rotation of the drum 301 by the drum rotation driving motor 320. On the other hand, pulling back the control lever 327 away from the drum 301 causes the driving gear 321 to separate from the gear 310 of the drum 301, thereby permitting manual rotation of the drum 301. At this point, the detected piece 325 of the slide plate 319 is detected by the sensor 324, whereby the rotation of the drum 301 is prohibited.

2.3 Origin Detection Mechanism

As shown in FIG. 10, the lower ring 309 of the drum 301 is provided with a contact piece 332 which is brought into contact with an origin detection sensor (limit switch) 331*a* fitted on the base 10*a* of the main body 10. The contact piece 332 is fitted with a detected piece 333, which is detected by a first and a second rotation limit detection sensors (optical sensors) 331*b* and 331*c* fitted to both sides of the origin detection sensor (limit switch) 331*a*. When the first rotation limit detection sensor 331*b* first detects an origin, the position thereof is defined as a left rotation limit. When the second rotation limit detection sensor 331*c* first detects the origin, the position thereof is defined as a right rotation limit. The drum 301 stops when the origin detection sensor 331*a* detects the origin after these rotation limits have been detected, the drum 301 stops. The rotation position of the drum 301 from the origin is configured to be detected by a rotary encoder 335, which rotates through a gear 334 engaging with the gear 310 of the lower ring 309 of the drum 301. Upon detection of an origin of the drum 301 by the origin detection sensor 331*a*, the rotation position detected by the rotary encoder 335 is reset. Note that, as shown in FIG. 8, the upper ring 304 of the drum 301 is fitted with a projecting piece 337, which comes into contact with a stopper 336 provided on the upper support member 306. This can prevent the drum 301 from rotating through 360 degrees or more when the drum 301 is rotated manually.

2.4 Tablet Feeder

Figure 12:
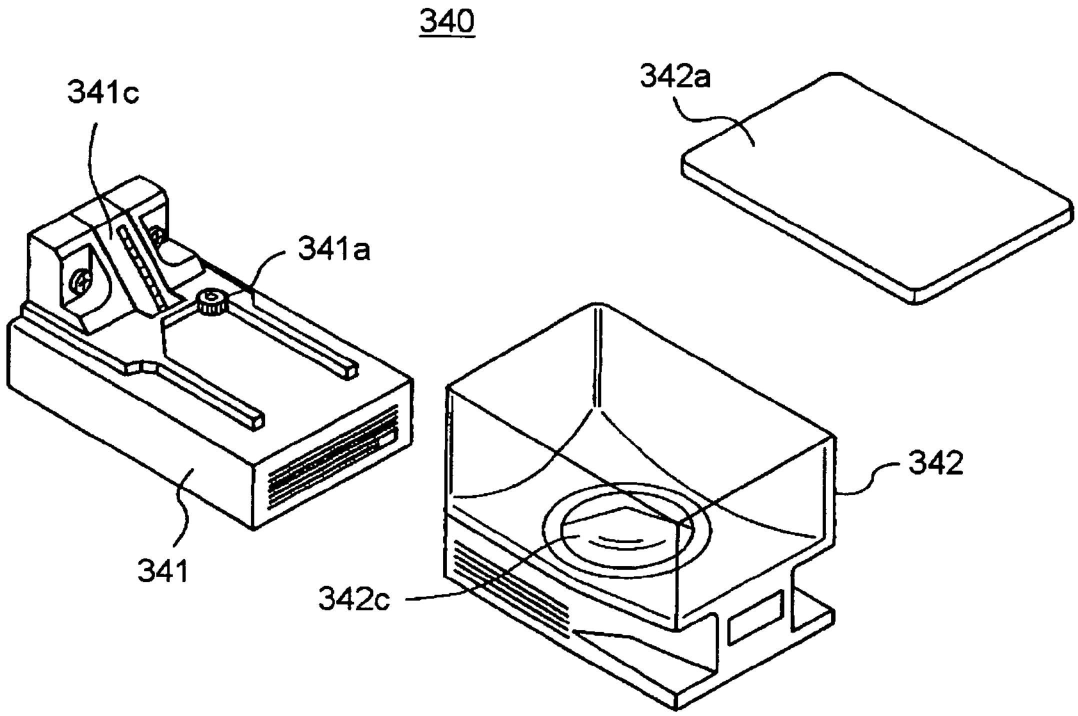
FIG. 12 is a perspective view of a tablet feeder.
Figure 13:
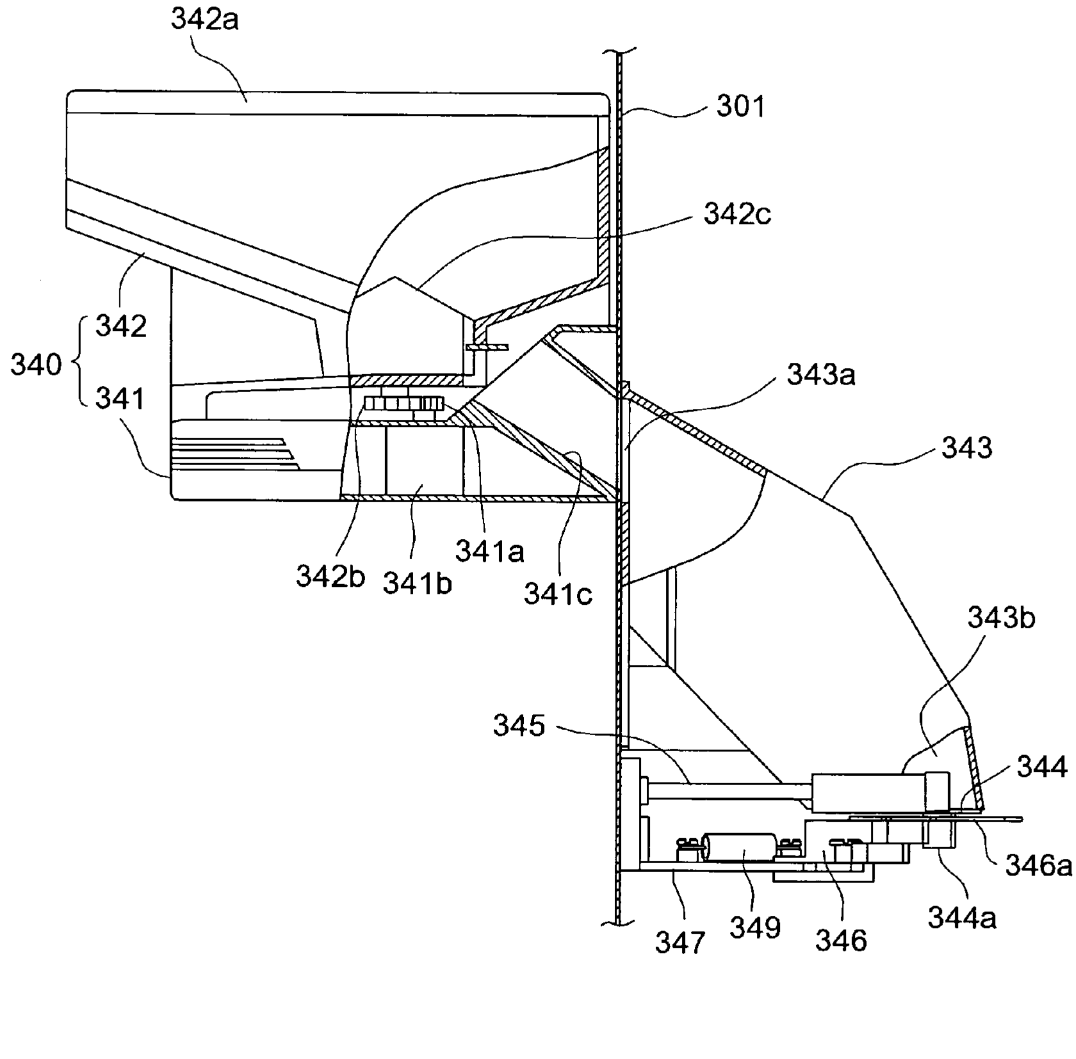
FIG. 13 is a side view of a tablet storage case of the tablet feeder.

FIG. 12 shows the tablet feeder 340. The tablet feeder 340 is composed of a motor base 341 and a tablet cassette 342. The motor bases 341 are circumferentially arranged along the outer surface of the drum 301 and vertically provided in multi-stages. Each motor base 341 has a built-in motor 341*b* fitted with a driving gear 341*a*, as shown in FIG. 13. In the motor base 341, a guide passage 341*c* is formed. The guide passage guides tablets discharged from the tablet cassette 342 into the drum 301. The tablet cassette 342 is a box with a cover 342*a* which stores multiple tablets and which is attachable to and detachable from the motor base 341. The tablet cassette 342 has therein a rotor 342*c* provided with a driving gear 342*b* that engages with the driving gear 341*a* of the motor base 341. When the driving motor 341*b* of the motor base 341 is driven, the rotor 342*c* of the tablet cassette 342 rotates through the driving gear 341*a* and the driving gear 342*b*, and thereby tablets inside the cassette are discharged one-by-one and then led through the guide passage 341*c* to the inside of the drum 301.

2.5 Tablet Storage Case and Shutter

Figure 14:
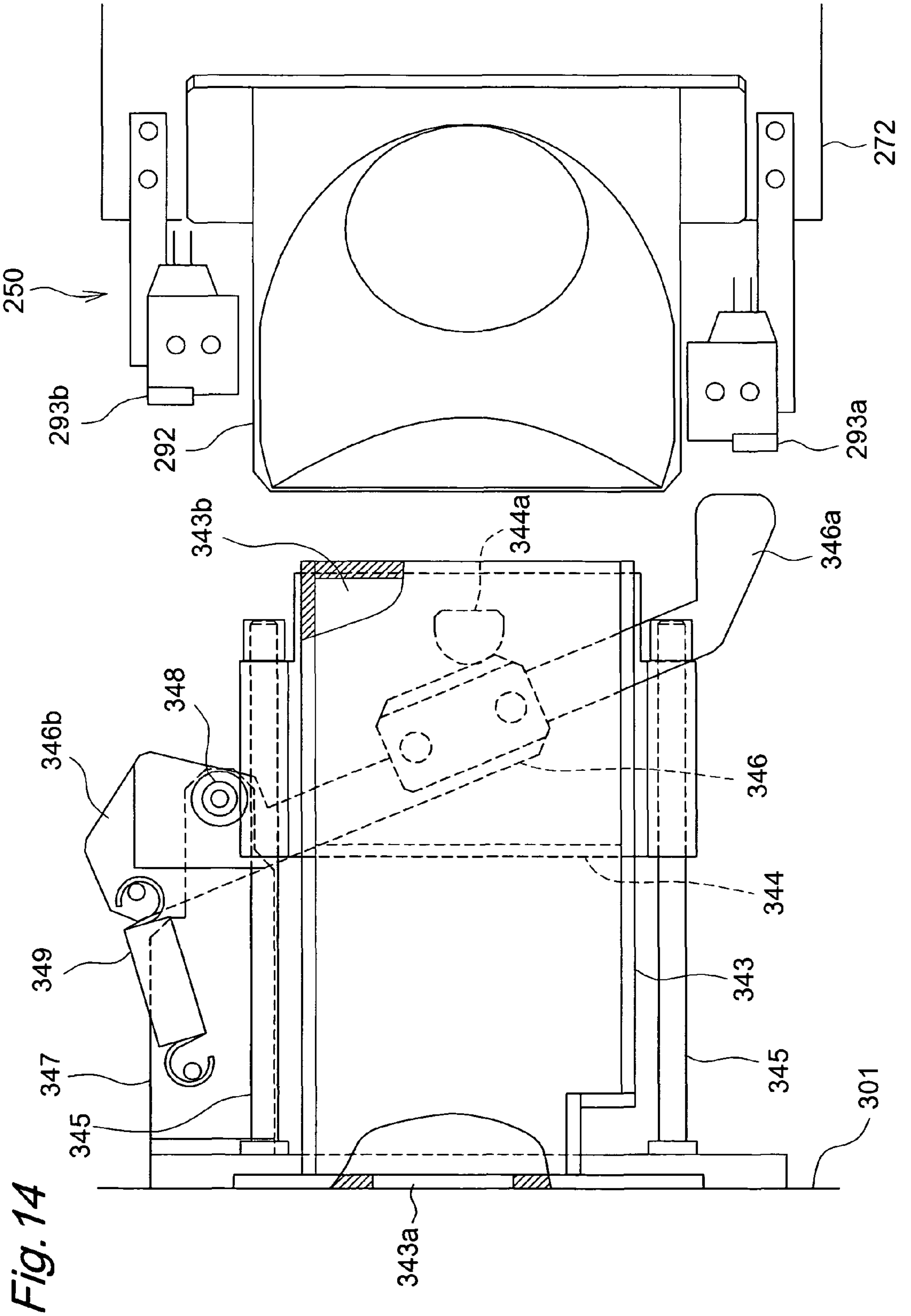
FIG. 14 is a plan view of the tablet case.

The tablet storage case 343 is fitted inside the drum 301, as shown in FIG. 13. The tablet storage case 343 has an upper end opening 343*a* facing the guide passage 341*c* of the motor base 341 and a lower end opening 343*b*. Below the lower end outlet 343*b* of the tablet storage case 343, a shutter 344 is provided as shown in FIG. 14. The shutter 344 is slidably fitted to a pair of guide bars 345 projecting from the inner surface of the drum 301 so that the shutter 344 is movable between a closed position where the lower end opening 343*b* of the tablet storage case 343 is closed and an open position where the lower end opening 343*b* is open. On the bottom surface of the shutter 344, a projecting part 344*a* is formed, and the projecting part is pressed by a guide member 292 of the second transfer robot 250. Below the shutter 344, a return lever 346 is provided, which is fitted to a projecting piece 347 fitted to the inner surface of the drum 301 so as to be rotatable through a pin 348, with one end in contact with the projecting part 344*a* of the shutter 344 and with the other end connected through a spring 349 to the projecting piece 347. This permits the shutter 344 to be opened with its projecting piece 347 being pressed by the guide member 292 of the second transfer robot 250 and to be closed by the return lever 346. The return lever 346 is fitted with: a detected piece 346*a* to be detected by a sensor 293*a* that detects the start position of shutter opening operation performed by the second transfer robot 250; and a detected piece 346*b* to be detected by a sensor 293*b* that detects the end position of shutter opening operation performed by the second transfer robot 250.

2.6 Modified Embodiment of the Tablet Supply Part (Overrun Mechanism)

In the embodiment described above, the drum 301 does not rotate through 360 degrees. However, providing the overrun mechanism, to be described below, permits the drum 301 and the second transfer robot 250 to rotate through 360 degrees or more (a range of approximately 400 degrees). Thus, even when, for example, the rotation range of the drum 301 is limited during a replenishment operation performed with the tablet cassette 342, due to the ability to rotate through 360 degrees or more with reference to the origin, the second transfer robot 250 can fill a target tablet case 343 from any direction, thus achieving efficient tablet supply operation.

Figure 15:
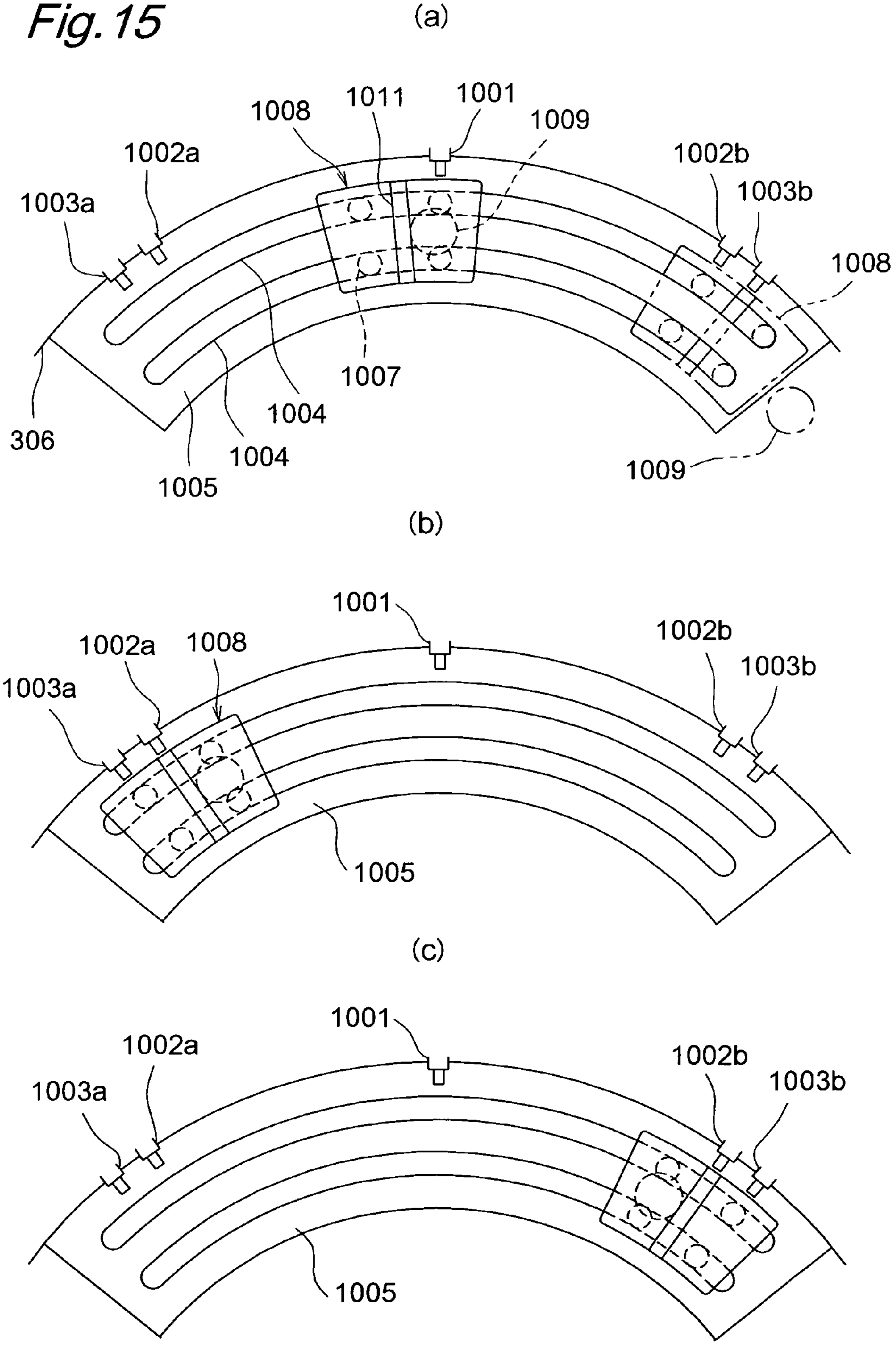
FIGS. 15A to 15C are plan views showing an example of an overrun mechanism of the drum.
Figure 16:
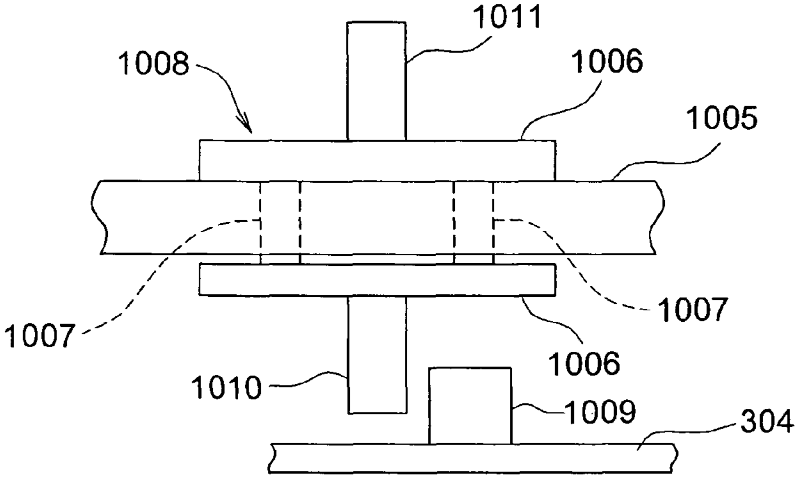
FIG. 16 is an enlarged elevation view of a slide member of FIG. 15.

FIG. 15 shows an example of this mechanism, in which a deceleration point detection sensor 1001 is arranged on the upper support member 306, and, on both sides of the deceleration point detection sensor 1001, rotation limit detection sensors 1002*a*, 1002*b*, and overrun detection sensors 1003*a*, 1003*b* are arranged in such a manner that they are separated from one another by predetermined angles. On the upper support member 306, a guide plate 1005 is also fitted in which two guide grooves 1004 are formed in the shape of a circular arc having the same center as that of the drum 301. To this guide plate 1005, as shown in FIG. 16, a slide member 1008 composed of two slide plates 1006 sandwiching the guide plate 1005 and four guide pins 1007 placed between the slide plates 1006 and inserted in the guide groove 1004 is slidably fitted along the guide groove 1004. The slide member 1008 is provided with: a projecting piece 1010 with which a projection 1009 fitted to the upper ring 304 of the drum 301 makes contact; and a detected piece 1011 to be detected by the five sensors 1001, 1002*a*, 1002*b*, 1003*a*, and 1003*b* described above. In this embodiment, when the drum 301 rotates counterclockwise and thereby the projection 1009 thereof presses the slide member 1008 located at the position defined by a chain double-dashed line of FIG. 15A, it is assumed that the drum 301 has rotated through 360 degrees. When the drum 301 rotates further counterclockwise to thereby slide the slide member 1008 and then the deceleration point detection sensor 1001 detects the detected piece 1011 of the slide member 1008, the drum 301 starts to decelerate. Then, when the rotation limit detection sensor 1002*a* detects the detected piece 1011 of the slide member 1008, this position is defined as the rotation limit in the counterclockwise direction. The drum 301 stops when the overrun detection sensor 1003*a* detects the detected piece 1011. The same applies to clockwise rotation of the drum 301 from the state as shown FIG. 15B to the state as shown in FIG. 15C. As a result, the drum 301 can rotate through 360 degrees or more.

Figure 17:
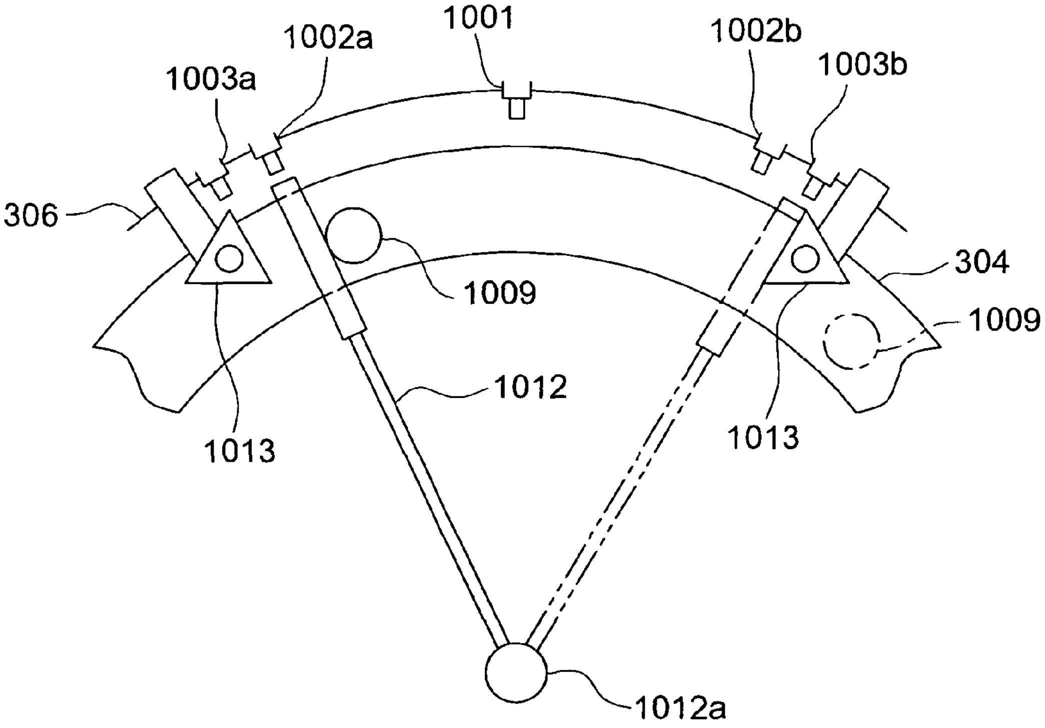
FIG. 17 is a plan view showing another example of the overrun mechanism of the drum.

FIG. 17 shows still another embodiment, in which a deceleration point detection sensor 1001 is arranged on the upper support member 306, and on both sides of the deceleration point detection sensor 1001, rotation limit detection sensors 1002*a*, 1002*b* and overrun detection sensors 1003*a*, 1003*b* are arranged in the same manner as in the embodiment of FIG. 16. To the main body 10, a guide arm 1012 is provided in such a manner as to be rotatable, between two stoppers 1013, about an axis 1012*a* located on the axis of the drum 301. The tip of the guide arm 1012 is configured to be detected by the sensors 1001, 1002*a*, 1002*b*, 1003*a*, and 1003*b*. The guide arm 1012 is configured to be contacted by the projection 1009 fitted to the upper ring 304 of the drum 301. In this embodiment, when the drum 301 rotates counterclockwise and thereby the projection 1009 thereof presses the guide arm 1012 located at the position defined by a chain double-dashed line of FIG. 17, it is assumed that the drum 301 has rotated through 360 degrees. When the drum 301 rotates further counterclockwise to thereby turn the slide member 1008 and then the deceleration point detection sensor 1001 detects the guide arm 1012, the drum 301 starts to decelerate. Then, when the rotation limit detection sensor 1002*a* detects the guide arm 1012, this position is defined as the rotation limit in the counterclockwise direction. The drum 301 stops when the overrun detection sensor 1003*a* detects the detected piece 1011. The same applies to clockwise rotation, i.e., in the direction opposite to the direction in FIG. 17. As a result, the drum 301 can rotate through 360 degrees or more In order to prevent the drum 301 from stopping at the overrun detection sensors 1003*a* and 1003*b* when the drum 301 is rotated manually, if a spring which presses back the projection 1009, the detected piece 1011, or the guide arm 1012 at least toward the rotation limit detection sensors 1002*a* and 1002*b* is provided, no error occurs at the time of origin acquisition.

3. Second Transfer Robot

Figure 18:
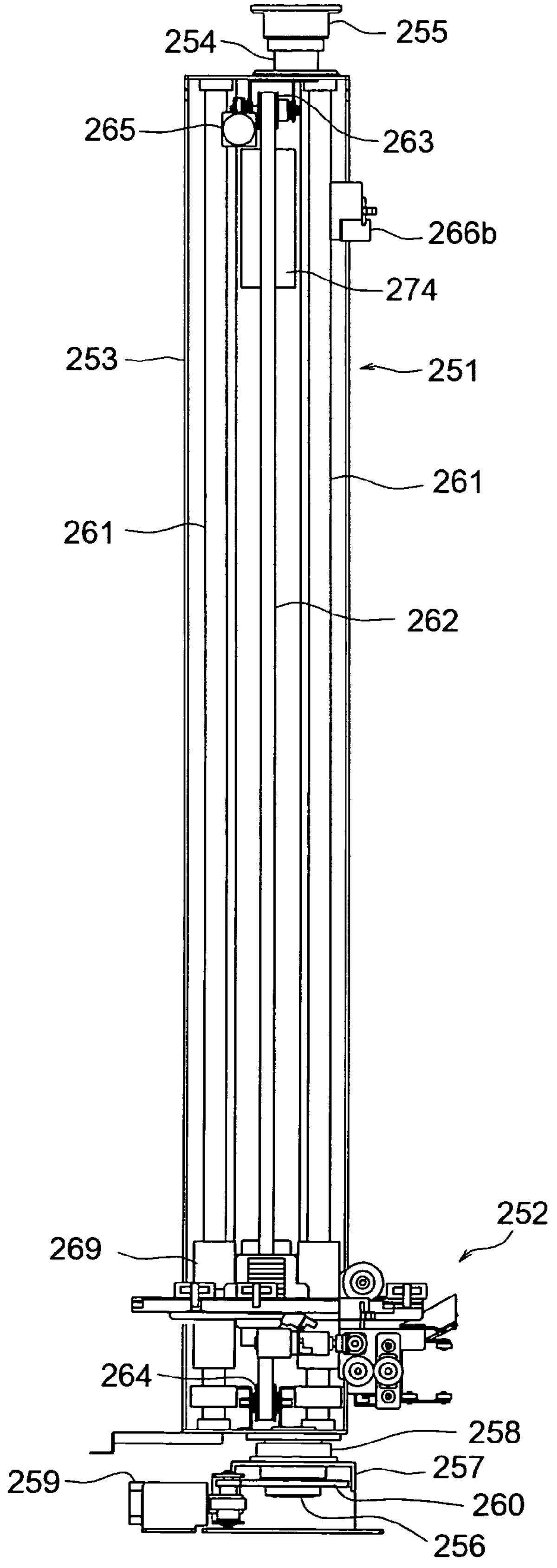
FIG. 18 is an elevation view of a second transfer robot.
Figure 19:
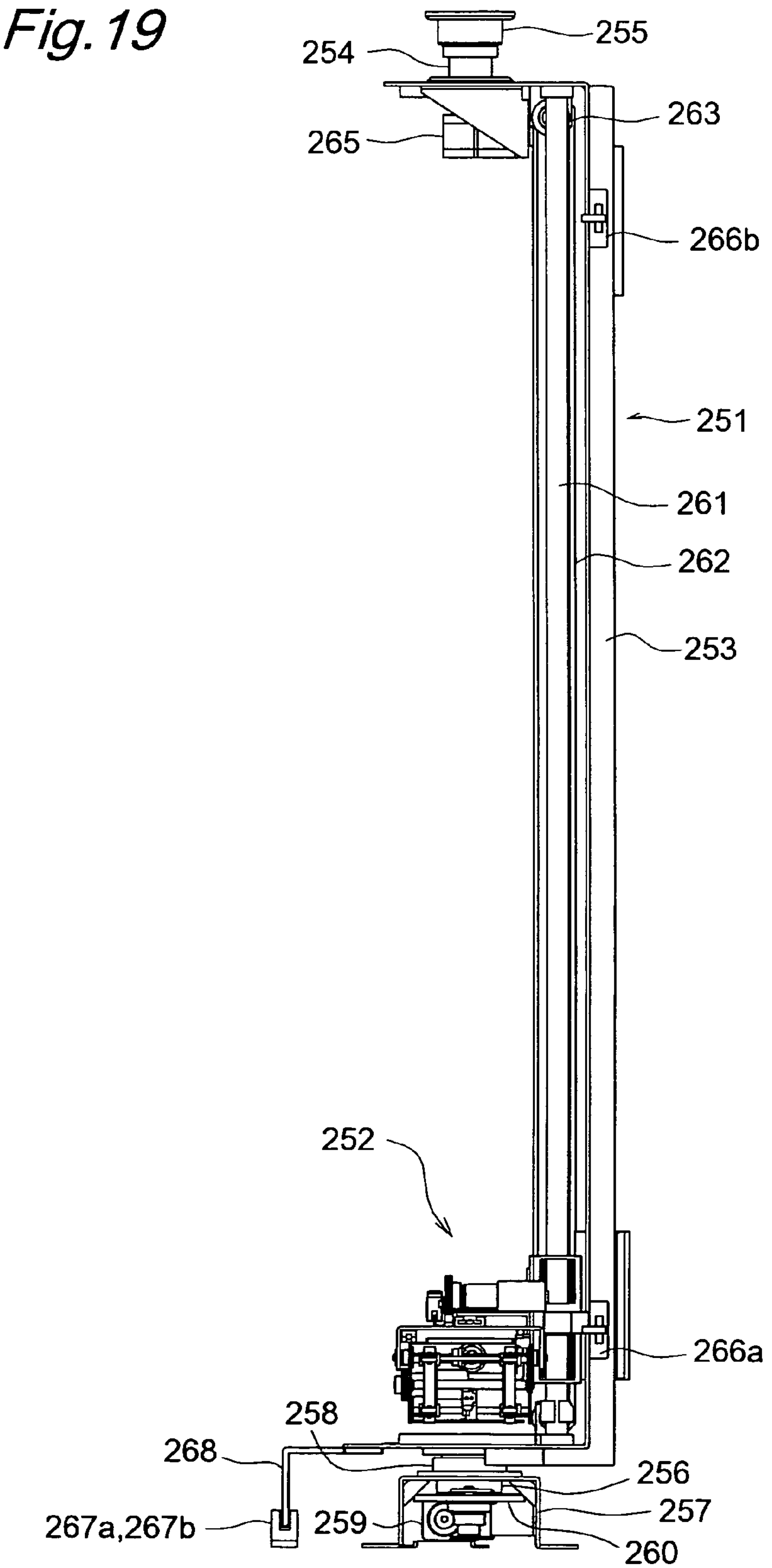
FIG. 19 is a right side view of FIG. 18.

The second transfer robot 250 is composed of a rotary block 251 and a lifting block 252, as shown in FIGS. 18 and 19.

The rotary block 251 is composed of a frame 253 extending along the axis of the drum 301. An upper end shaft 254 of the frame 253 is rotatably supported through a bearing 255 by the upper ring 304 of the drum 301, and a lower end shaft 256 thereof is supported through 258 by a support base 257 provided in the main body 10. The lower end shaft 256 of the frame 253 is coupled through a gear 260 to a rotation driving motor 259 fitted to the main body 10. This permits the frame 253 to rotate around the axis of the drum 301. The frame 253 has two guide rods 261 arranged in parallel to the line connecting the upper and lower end shafts 254 and 256 with a gear belt 262 arranged between the guide rods 261. The gear belt 262 is stretched over an upper gear 263 provided at the upper end portion of the frame 253 and a lower gear 264 provided at the lower end portion thereof. The upper gear 263 is coupled to a lifting driving motor 265 fitted to the frame 253. This permits the gear belt 262 to run vertically. To the upper and lower ends of the frame 253, an origin position detection sensor 266*a* and an end point position detection sensor 266*b* are fitted, respectively. To the lower end of the frame 253, a detected piece 268 is fitted which is detected by a delivery position sensor 267*a* for detecting delivery from the first transfer robot 150 and a delivery position detection sensor 267*b* for detecting delivery from the third transfer robot 350, both provided in the main body 10.

Figure 20:
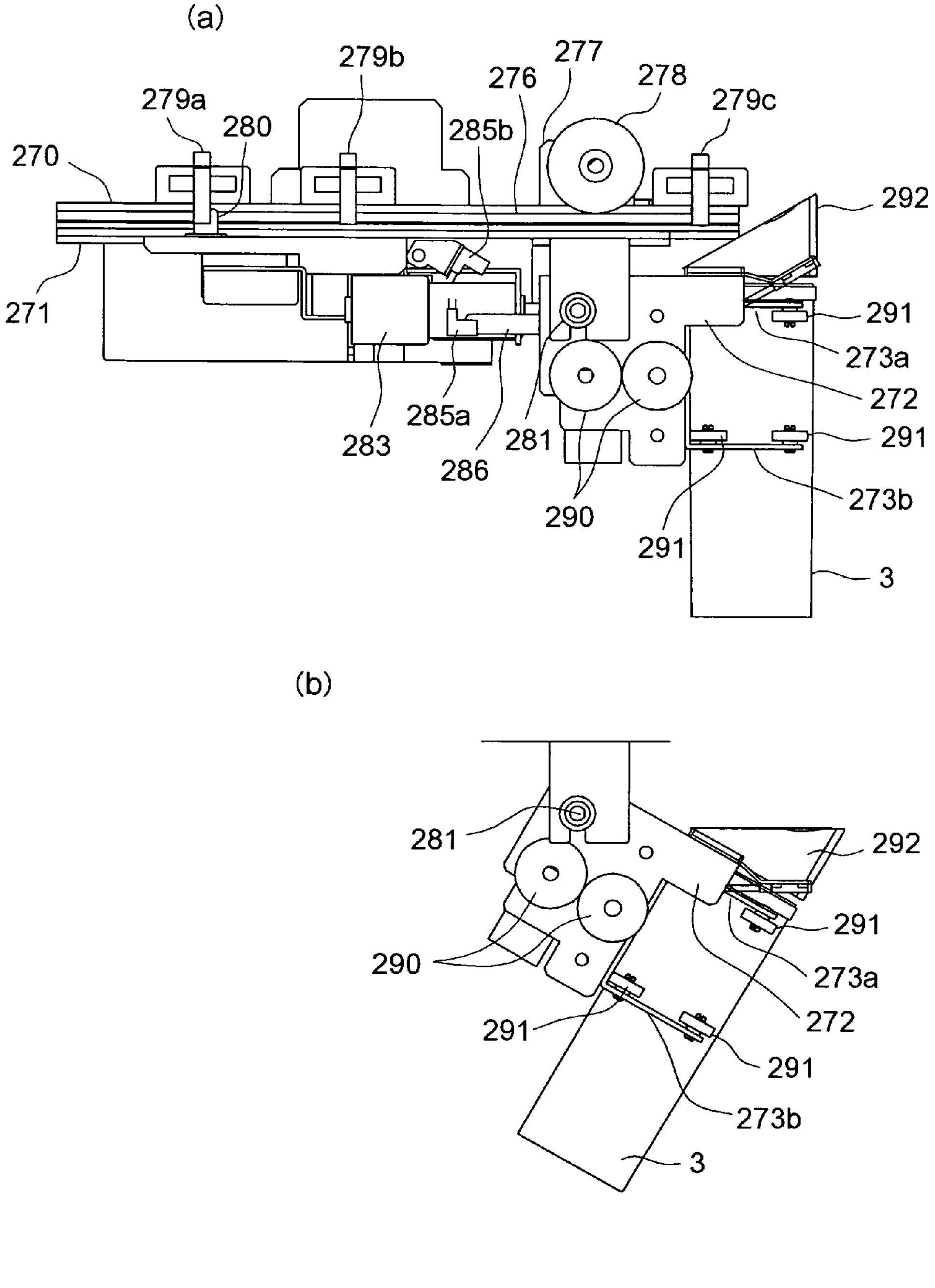
FIGS. 20A and 20B are elevation views of a lifting block provided in the second transfer robot of FIG. 18.
Figure 21:
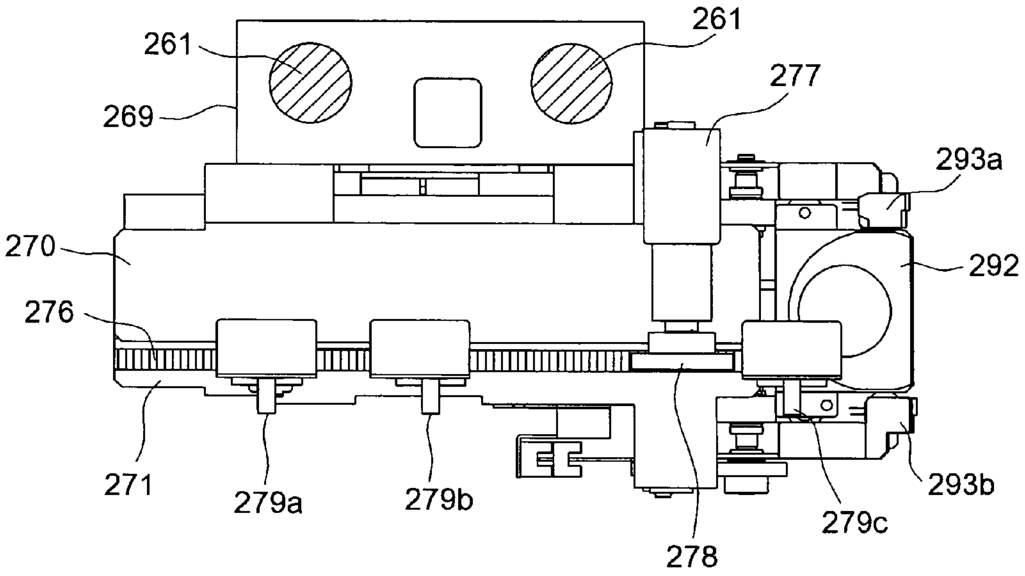
FIG. 21 is a plan view of FIG. 20.
Figure 23:
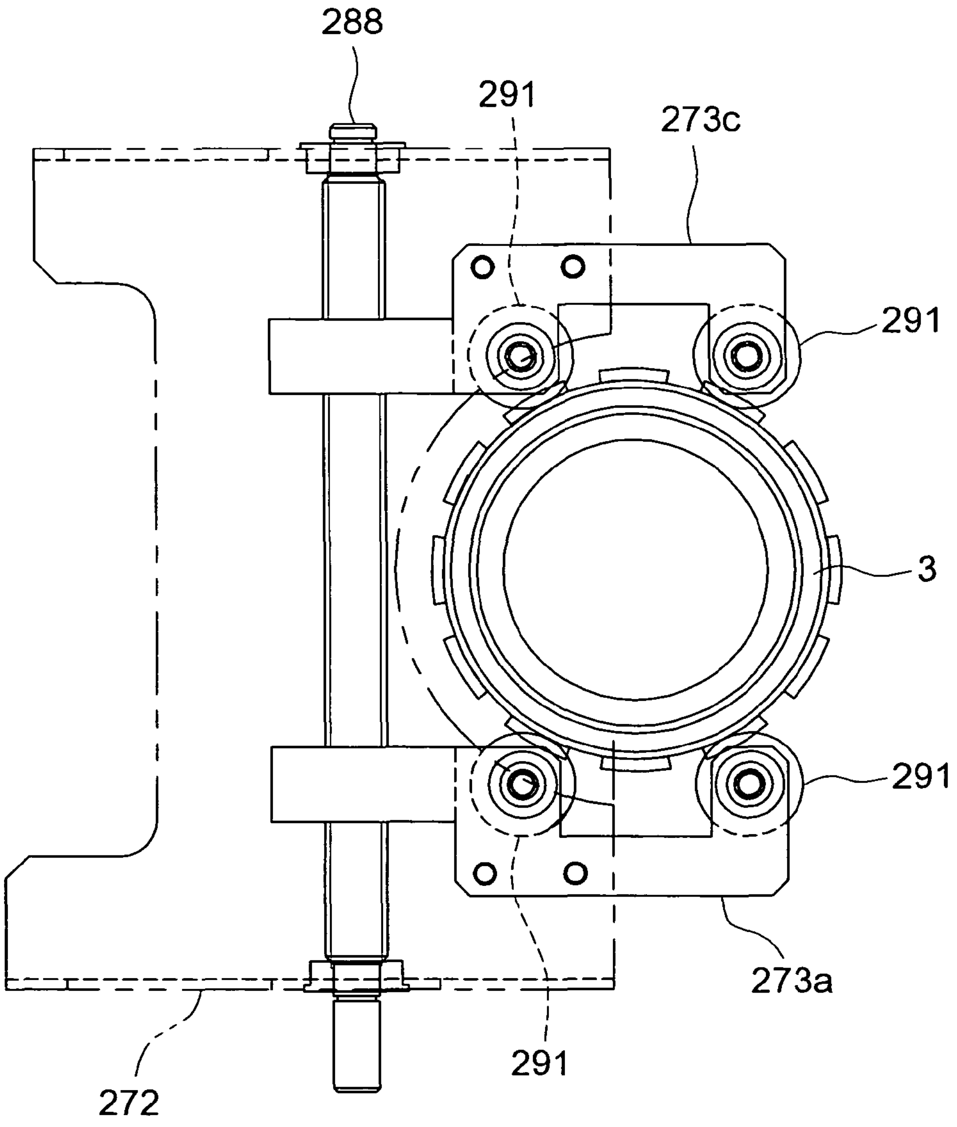
FIG. 23 is an enlarged plan view of an arm of FIG. 20.

The lifting block 252 is, as shown in FIGS. 20A to 20B through 23, composed of a lifting base 269, a lifting table 270, a boom 271, an arm base 271, and two pairs of arms 273*a* and 273*b*. The lifting base 269 is slidably fitted to the guide rod 261 of the rotary block 251 and firmly fixed to part of the gear belt 262 described above so that the lifting base 269 can be lifted by running of the gear belt 262. The gear belt 262 is fitted with a balance weight 274 so as to be balanced with the lifting block 252. The lifting table 270 is fitted to the side surface of the lifting base 269. The boom 271 is fitted below the lifting table 270 with guides 275*a* and 275*b* in between so as to be slidable horizontally. To the top surface of the boom 271, a rack 276 is fitted which engages with a pinion 278 of an extension-contraction driving motor 277 fitted to the lifting table 270. This permits the boom 271 to extend and contract horizontally. From the boom 271, a detected piece 280 is projected which is detected by three position detection sensors 279*a*, 279*b*, and 279*c* provided on the lifting table 270.

Figure 22:
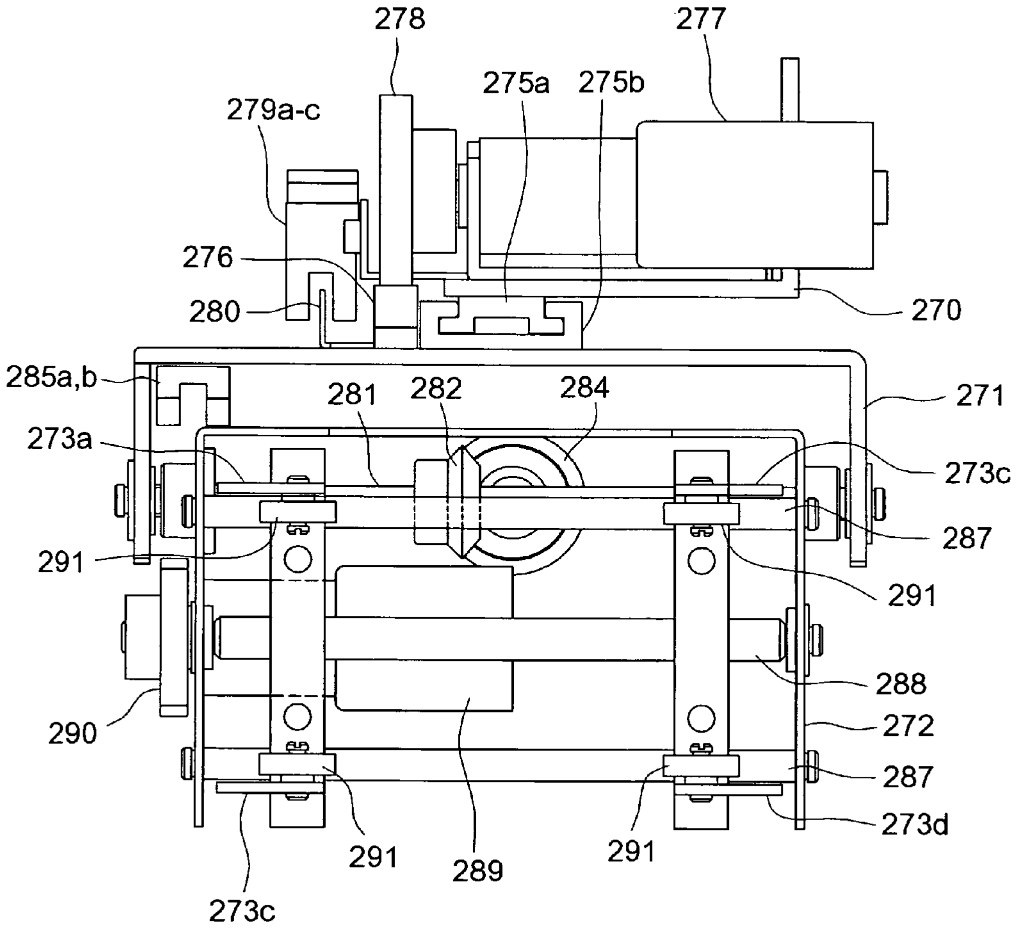
FIG. 22 is an enlarged right side view of FIG. 20.

The arm base 271 is, as shown in FIG. 22, an inverted-V shape as viewed horizontally and is swingably fitted to the lower ends of the boom 271 with a swing shaft 281 in between. To the middle of the swing shaft 281, a bevel gear 282 is fitted which engages with a gear 284 of an oscillation driving motor 283 fitted to the boom 271. This permits the arm base 272 to swing between a horizontal position and a tilt position. The arm base 272 is fitted with a detected piece 286 which is detected by two position detection sensors 285*a* and 285*b* provided on the boom 271. To the ends of the arm base 272, guide bars 287 are fitted in pairs at the upper and the lower positions, respectively, with a ball screw 288 stretched in between.

The base ends of the two pairs of arms 273*a* to 273*d* are slidably joined to the guide bars 287 and are also screwed with the ball screw 288. One end of the ball screw 288 is coupled with a gear 289 in between to an arm driving motor 289 fitted to the arm base 272 with a gear 290 in between. This permits the distance between the arms 273*a* and 273*b* to become wider or narrower when the arm driving motor 289 is driven, thereby permitting holding and releasing a vial 3. Support rollers 291 are fitted to the end and middle of each of the arms 273*a* to 273*d*. This permits, as shown in FIG. 23, the two pairs of arms 273*a* to 273*d* to support a vial 3 at the eight points with the eight support rollers 291.

The arm base 272 is fitted with a funnel-shaped guide member 292 above the two pairs of the arms 273*a* to 273*b*. The guide member 292 has an outlet thereof facing the opening of a vial 3 held by one pair of the arm members 273*a*-273*d* and has an inlet thereof so shaped as to be tilted through substantially 45 degrees when the arm base 272 is at the horizontal position and to be oriented horizontally when the arm base 272 is at a tilt position. To both sides of the guide member 292, sensors 293*a* and 293*b* are fitted which detect the detected pieces 343*a* and 346*b*, respectively, of the return lever 346 of the shutter 344 provided in the tablet supply part 300.

Figure 24:
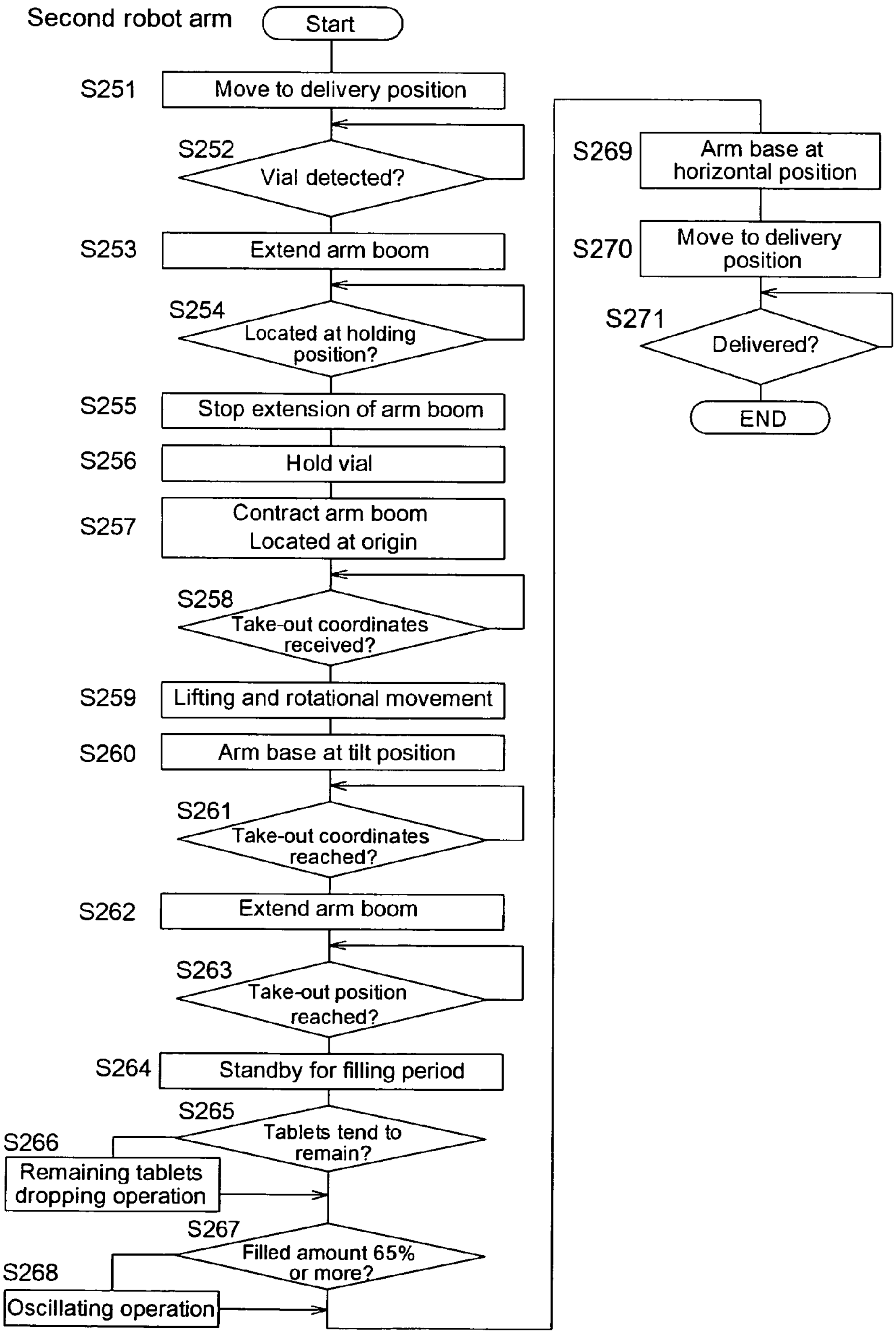
FIG. 24 is a flowchart diagram showing the operation of the second transfer robot 250.

The operation of the second transfer robot 250 constructed as described above will be described with reference to the flowchart diagram of FIG. 24. First, the second transfer robot 250 moves to the delivery position of the first transfer robot 150 in step S251. If the second transfer robot 250 detects a vial 3 in step S252, it extends the boom 271 in step S253. If the second transfer robot 250 is located at the holding position in step S254, it stops the extension of the boom 271 in step S255 and then holds the vial 3 in step S256. The second transfer robot 250 contracts the boom 271 and returns to the origin position in step S257. If the second transfer robot 250 receives take-out coordinates from the PC801 in step S258, the second transfer robot 250 rotates the rotary block 251 and lifts the lifting block 252 in step S259 and tilts the arm base 272 to the tilt position in step S260. If the second transfer robot 250 reaches take-out coordinates in step S261, the second transfer robot 250 extends the boom 271 in step S262. If the boom 271 reaches the take-out coordinates in step S263, it stands by for a predetermined filling period in step S264, whereby tablets are dispensed into the vial 3. Subsequently, the second transfer robot 250 detects in step S265 whether or not the tablets are of a type that tends to remain. Here, tablets of a type that tends to remain refer to those which tend to adhere to the guide passage due to the viscosity of its surface that is variable depending on ambient temperature and humidity. If the tablets are of a type that tends to remain, the second transfer robot 250 performs an operation of dropping off the remaining tablets by extending and contracting the boom 271 two or three times in step S266. If the tablets are not of a type that tends to remain, the second transfer robot 250 judges in step S267 whether or not the filled amount of tablets is 65% or more. Here, the filled amount of tablets of 65% or more refers to the filled amount of tablets accounts for 65% or more of the capacity of a vial 3. If the filled amount is 65% or more, since the tablets are filled beyond the opening edge of the tilted vial 3 and thus are spilled over the guide member 292, there is a possibility that the tablets will spill out when the vial 3 is delivered to the third transfer robot 350. Thus, the second transfer robot 250 performs an oscillating operation by tilting the arm base 272 through minus 5 degrees in step S268. This oscillating operation permits the tablets that have spilled over the guide member 292 to be filled back into the vial 3. If the filled amount is less than 65%, the second transfer robot 250 locates the arm base 272 at the horizontal position in step S269, moves to the delivery position of the third transfer robot 350 in step S270, and, upon confirmation of the delivery in step S271, ends its operation.

If the filled amount is 65% or more, instead of the oscillating operation performed in step S268, the vial 3 may be returned to the horizontal position so that a member with a flat tip is pressed against the opening of the vial 3 to provide an even surface for tablet filling.

4. Tablet Filling Position Control

The tablet filling position control, performed when a vial 3 grasped by the arms 273*a* to 273*d* of the second transfer robot 250 is to be filled with tablets supplied from the tablet feeder 340 of the drum 301, includes mutual control, drum control, and robot arm control. These controls will be described below with reference to the flowchart diagrams of FIGS. 25 to 27.

<Mutual Control>

Figure 25:
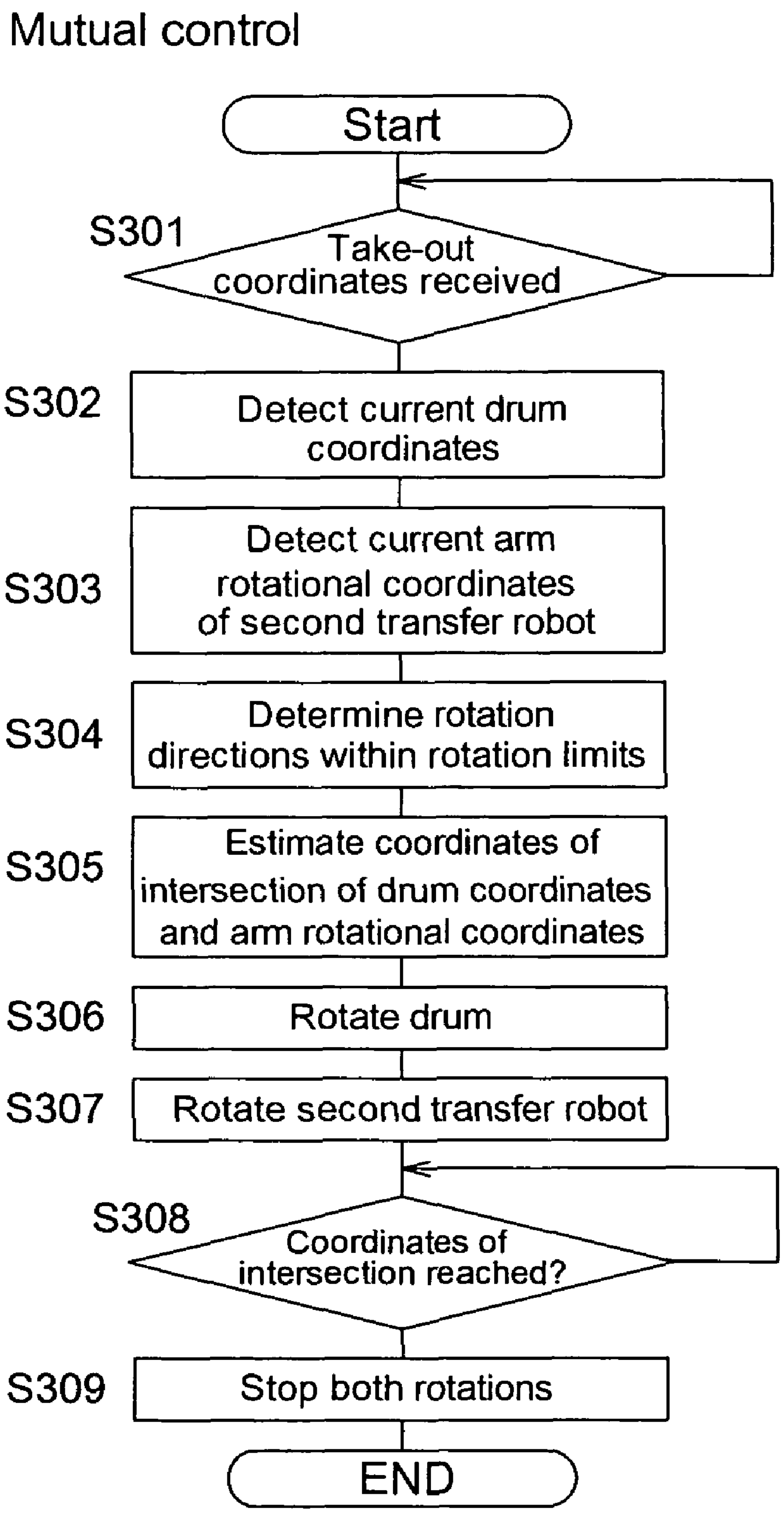
FIG. 25 is a flowchart diagram of tablet filling position control achieved through mutual control.

In FIG. 25, when take-out coordinates are received in step S300, the current coordinates of the tablet supply part 300 are detected in step S302, the current arm rotational coordinates of the second transfer robot 250 are detected in step S303, and, based on these coordinates, the rotation directions of both the drum 301 and the second transfer robot 250 within the rotation limits are determined in step S304. Then, the coordinates of the intersection of the drum coordinates and the arm coordinates are estimated in step S305, the drum 301 is rotated in step S306, and the second transfer robot 250 is rotated in step S307. If both reach the intersection coordinates in step S308, both rotations are stopped in step S309.

<Drum Control>

Figure 26:
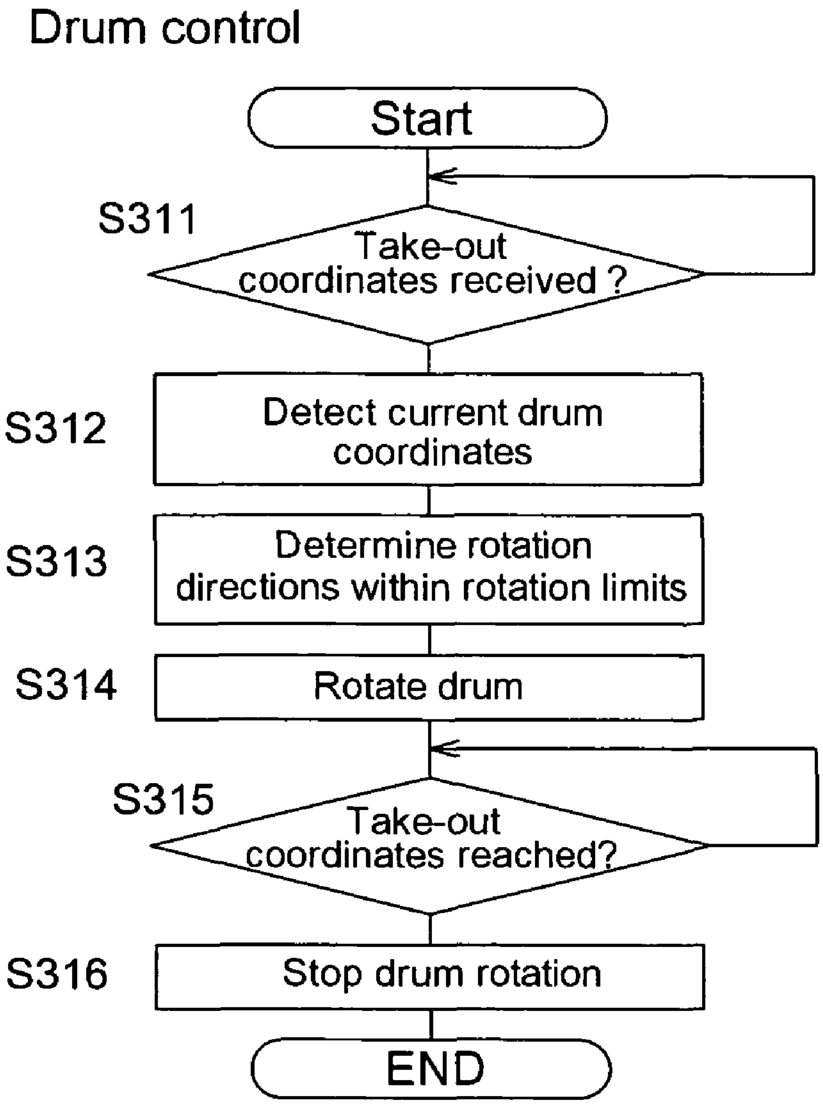
FIG. 26 is a flowchart diagram of tablet filling position control achieved through drum control.

In FIG. 26, when take-out coordinates are received in step S311, the current drum coordinates are detected in step S312, and, based on the coordinates, the rotation direction of the drum 301 within the rotation limit is determined in step S313. Then, the drum 301 is rotated in step S314, and, if it is detected that the drum 301 has reached the take-out coordinates in step S315, the rotation of the drum 301 is stopped in step S316.

<Robot Arm Control>

Figure 27:
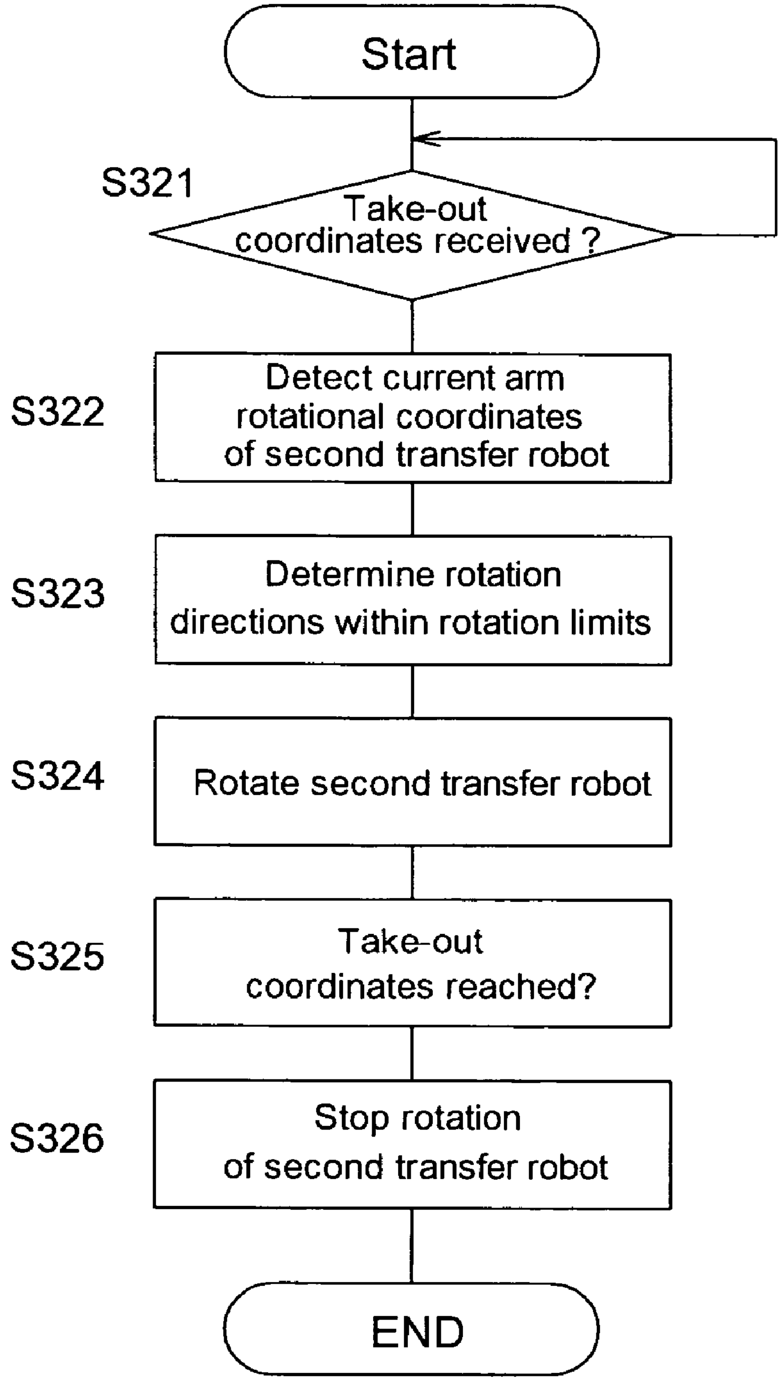
FIG. 27 is a flowchart diagram of tablet filling position control achieved through robot arm control.

In FIG. 27, when take-out coordinates are received in step S321, the current arm rotation coordinates of the second transfer robot are detected in step S322, and, based on the coordinates, the rotation direction of the second transfer robot 250 within the rotation limit is determined in step S323. Then, the second transfer robot 250 is rotated in step S324, and, if it is detected that the second transfer robot 250 has reached the take-out coordinates in step S325, the rotation of the second transfer robot 250 is stopped in step S326.

5. Modified Embodiment of the Tablet Supply Part (Double Drum Mechanism)

In the embodiment described above, one drum 301 is provided. Doubling this drum 301 increases the number of cassettes 340 to be fitted, thereby permitting a large number of tablets to be stored and taken out.

Figure 28:
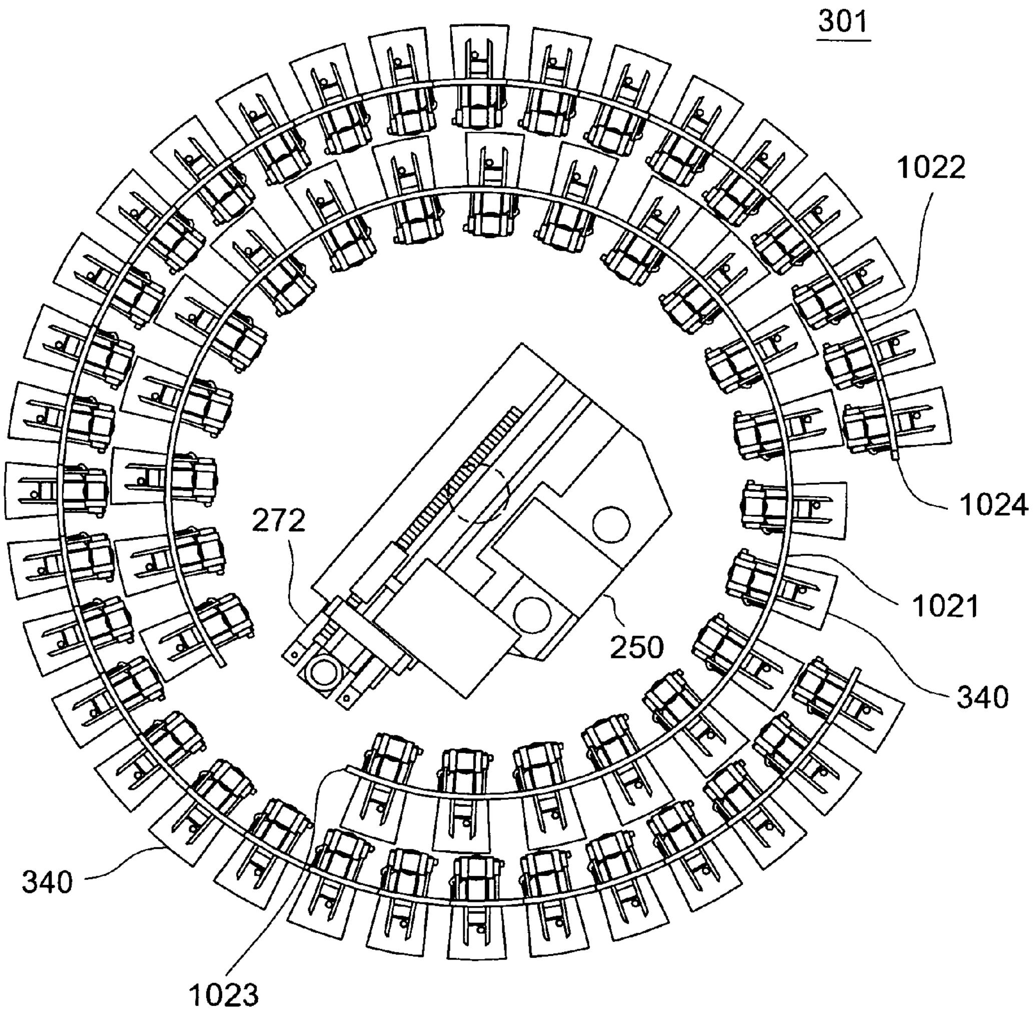
FIG. 28 is a plan view showing a first modified embodiment of the drum (double drum)

FIG. 28 shows a first modified embodiment of the tablet supply part 300 in which the drums 301 are doubled. This drum 301 is composed of an inner drum 1021 and an outer drum 1022 arranged on the outer side of the inner drum 1021 coaxially therewith. The inner drum 1021 and the outer drum 1022 are rotatably supported as in the embodiment described above. In the inner drum 1021, an opening 1023 is formed which permits the arm 272 of the second transfer robot 250 to pass therethorugh. The opening 1023 of the inner drum 1021 is formed across the upper end and the lower end of the inner drum 1021, and may also be formed over the range where the tablet storage case 343 of the outer drum 1022 is provided. In the outer drum 1022, an opening 1024 is formed which permits access to the tablet feeders 340 of the inner drum 1021 from outside. The opening 1024 of the outer drum 1022 is also formed across the upper end and the lower end of the outer drum 1022, and may also be formed over the range where the tablet feeders 340 of the inner drum 1021 are provided. In this modified embodiment, operation for receiving the supply of tablets from the tablet feeder 340 of the inner drum 1021 is performed in the same manner as in the embodiment described above. To receive the supply of tablets from the tablet feeder 340 of the outer drum 1022, the arm base 272 of the second transfer robot 250 is brought into agreement with the opening 1023 of the inner drum 1021.

Figure 29:
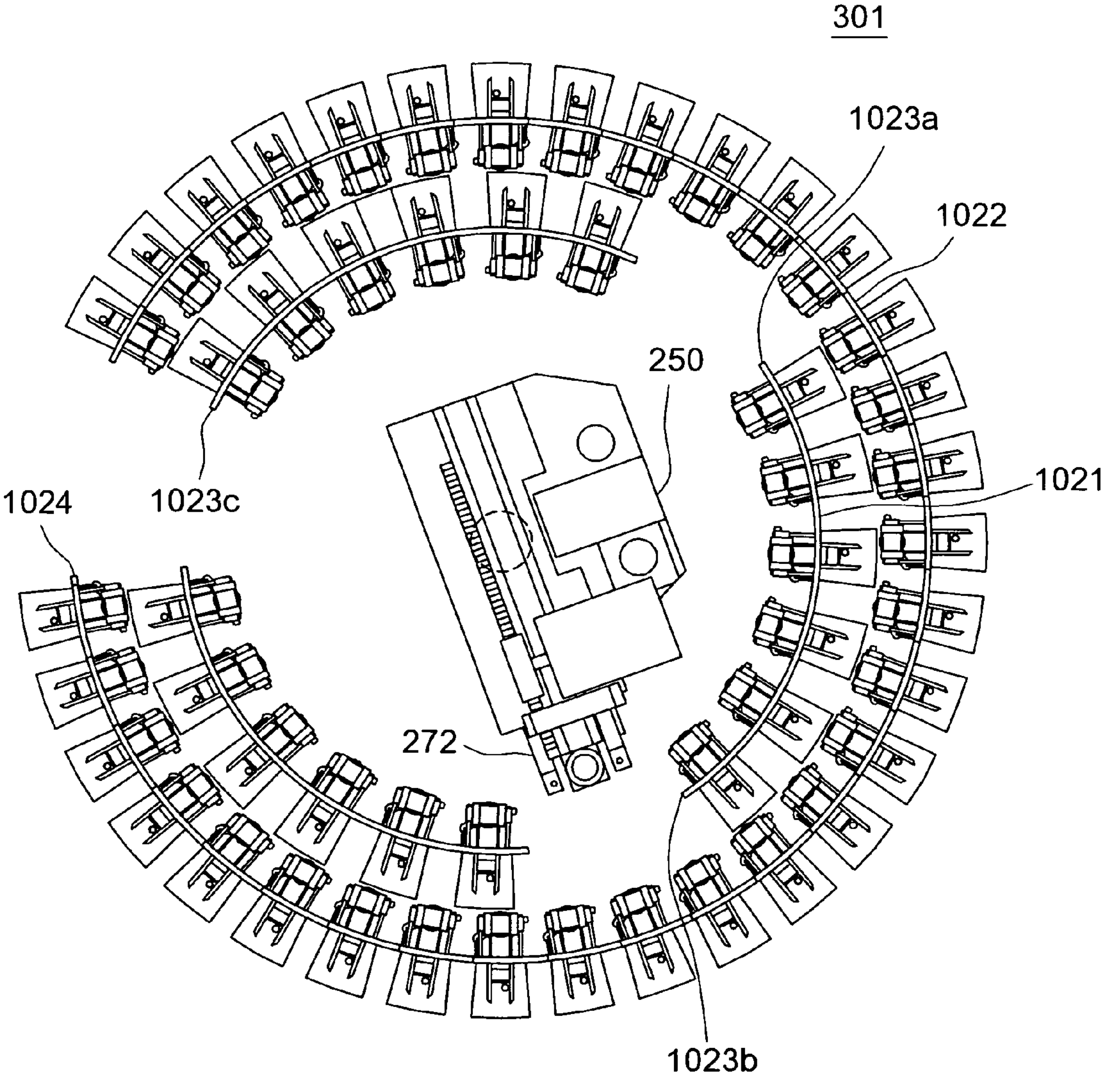
FIG. 29 is a plan view showing a second modified embodiment of the drum (double drum)

FIG. 29 shows a second modified embodiment in which the inner drum 1021 of the first modified embodiment includes openings 1023*a*, 1023*b*, and 1023*c* that are formed circumferentially at regular intervals. In this modified embodiment, to receive the supply of tablets from the tablet feeder 340 of the outer drum 1022, the arm base 272 of the second transfer robot 250 may be brought into agreement with the closest openings 1023*a*, 1023*b*, and 1023*c*, thus permitting a reduction in the rotation amount of the second transfer robot 250 or the inner drum 1021.

Figure 30:
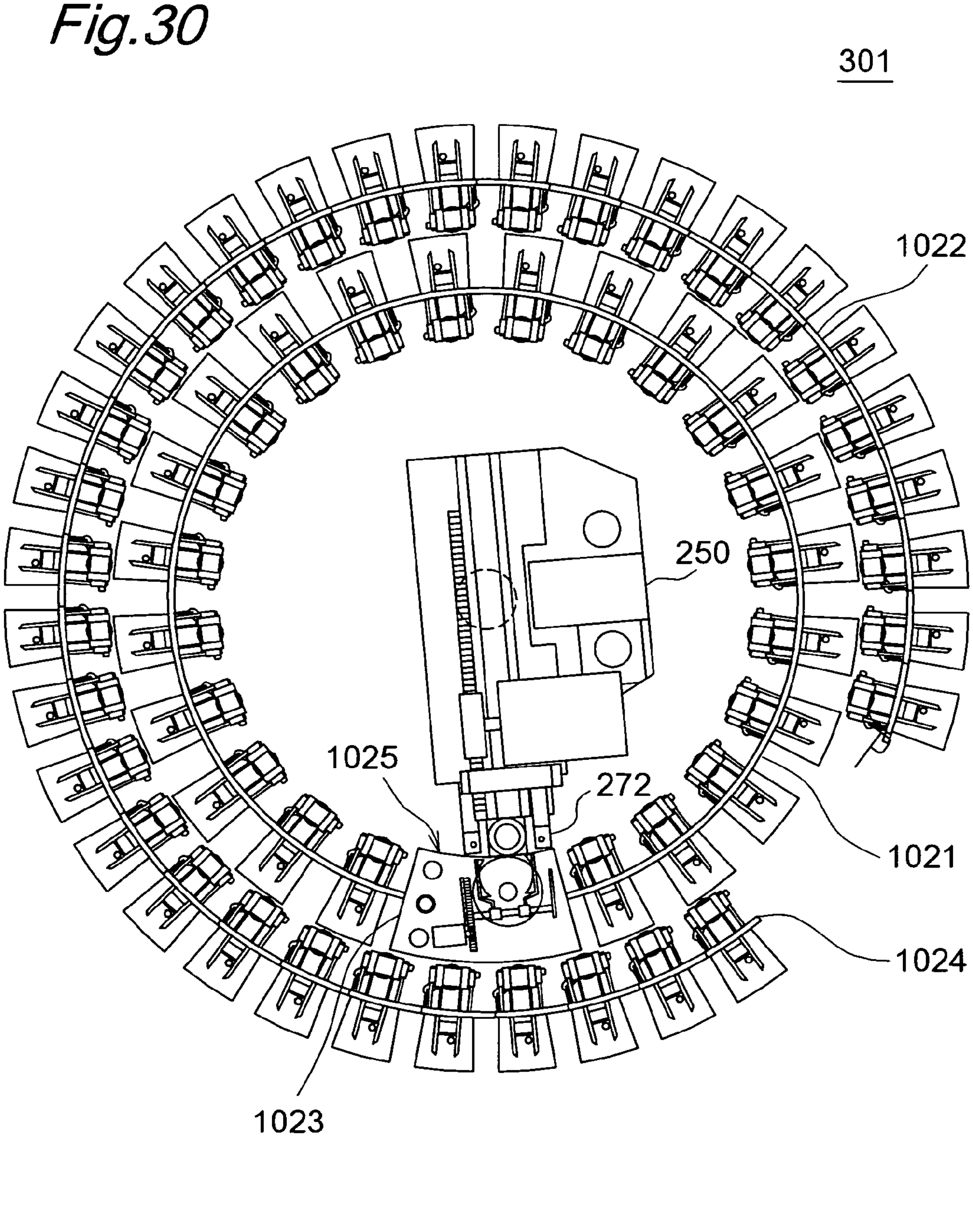
FIG. 30 is a plan view showing a third modified embodiment of the drum (double drum)
Figure 31:
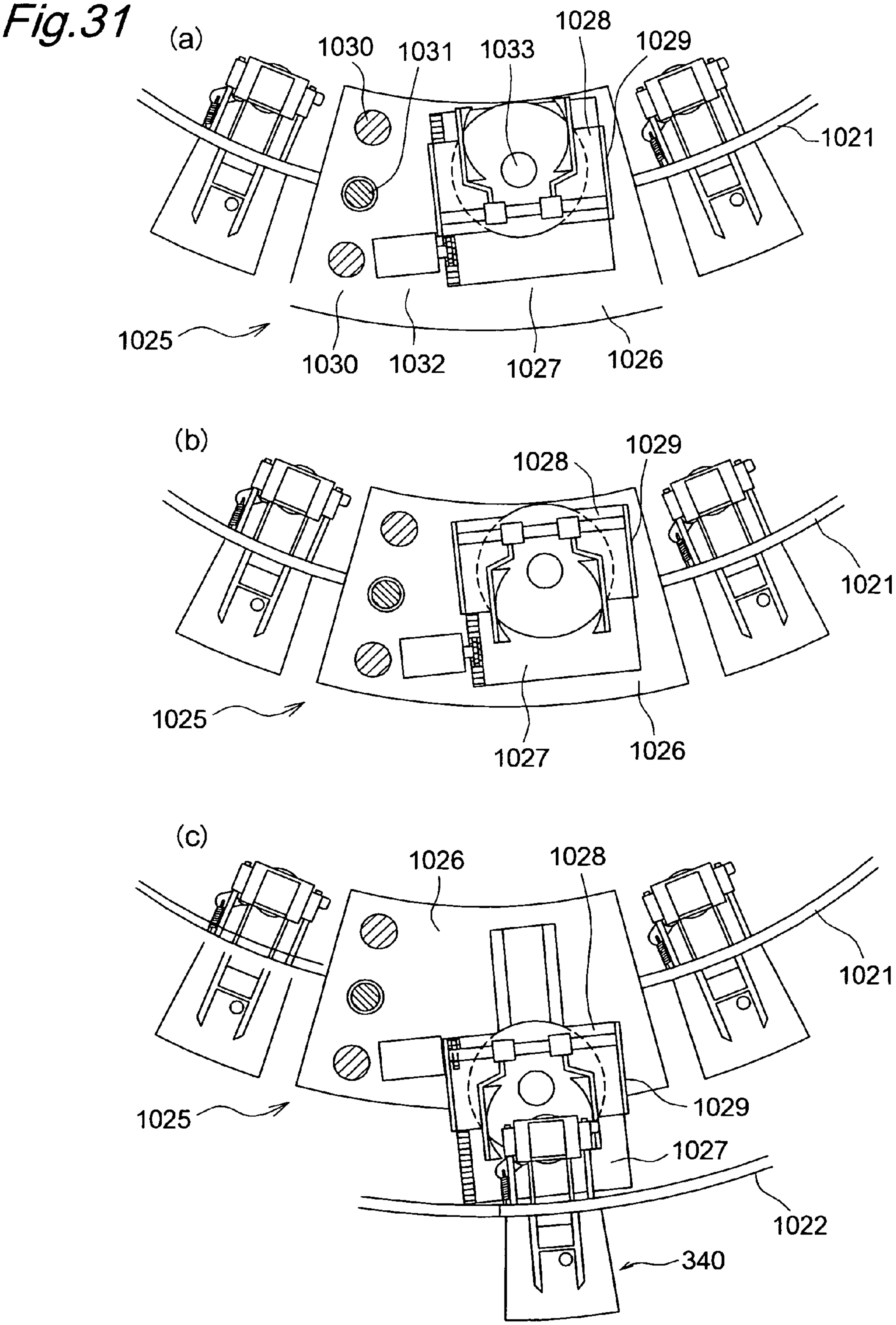
FIGS. 31A to 31C are plan views showing the operation performed by an auxiliary transfer robot of FIG. 30.

FIG. 30 shows a third modified embodiment in which an auxiliary transfer robot 1025 is provided in the opening 1023 of the inner drum 1021 of the first modified embodiment. The auxiliary transfer robot 1025 is composed of, as shown in FIGS. 31A to 31C, a lifting table 1026, a boom 1027, a swivel table 1028, and an arm head 1029. The lifting table 1026 is guided by a pair of guide bars 1030 arranged in parallel with the axis of the inner drum 1021, screwed with a ball screw 1031 provided between the guide bars 1030, and is capable of lifting by driving the ball screw 1031 by a motor (not shown). The boom 1027 is provided on the lifting table 1026 so as to be slidable along the radial direction of the inner drum 1021 through a rack-pinion mechanism by being driven by a motor 1032. The swivel table 1028 is provided on the boom 1027 so as to be capable of swiveling about a swivel shaft 1033 by a motor (not shown). The arm base 1029 is provided on the swivel table 1028 with the same construction as is employed for the arm base 272 of the second transfer robot 250 so that the arm base 1029 is capable of holding a vial 3. This auxiliary transfer robot 1025 receives a vial 3 from the second transfer robot 250 when in the state shown in FIG. 31A, and then swivels the swivel table 1028 through 180 degrees so as to orient the arm base 1029 to face outward as shown in FIG. 31B. Subsequently, the auxiliary transfer robot 1025 rotates the inner drum 1021 or the outer drum 1022 and lifts the lifting table 1026, thereby orienting the arm base 1029 to face the position of a target tablet feeder 340. Then, as shown in FIG. 31C, the auxiliary transfer robot 1025 carries the boom 1027 forward to the outer drum 1022 to receive the supply of tablets. Subsequently, the auxiliary transfer robot 1025 swivels the swivel table 1028 to orient the arm base 1029 to face inward and delivers the vial 2 to the second transfer robot 250.

<Drug Filling Position Control of the Double Drum in Modified Embodiments 1 and 2>

Figure 32:
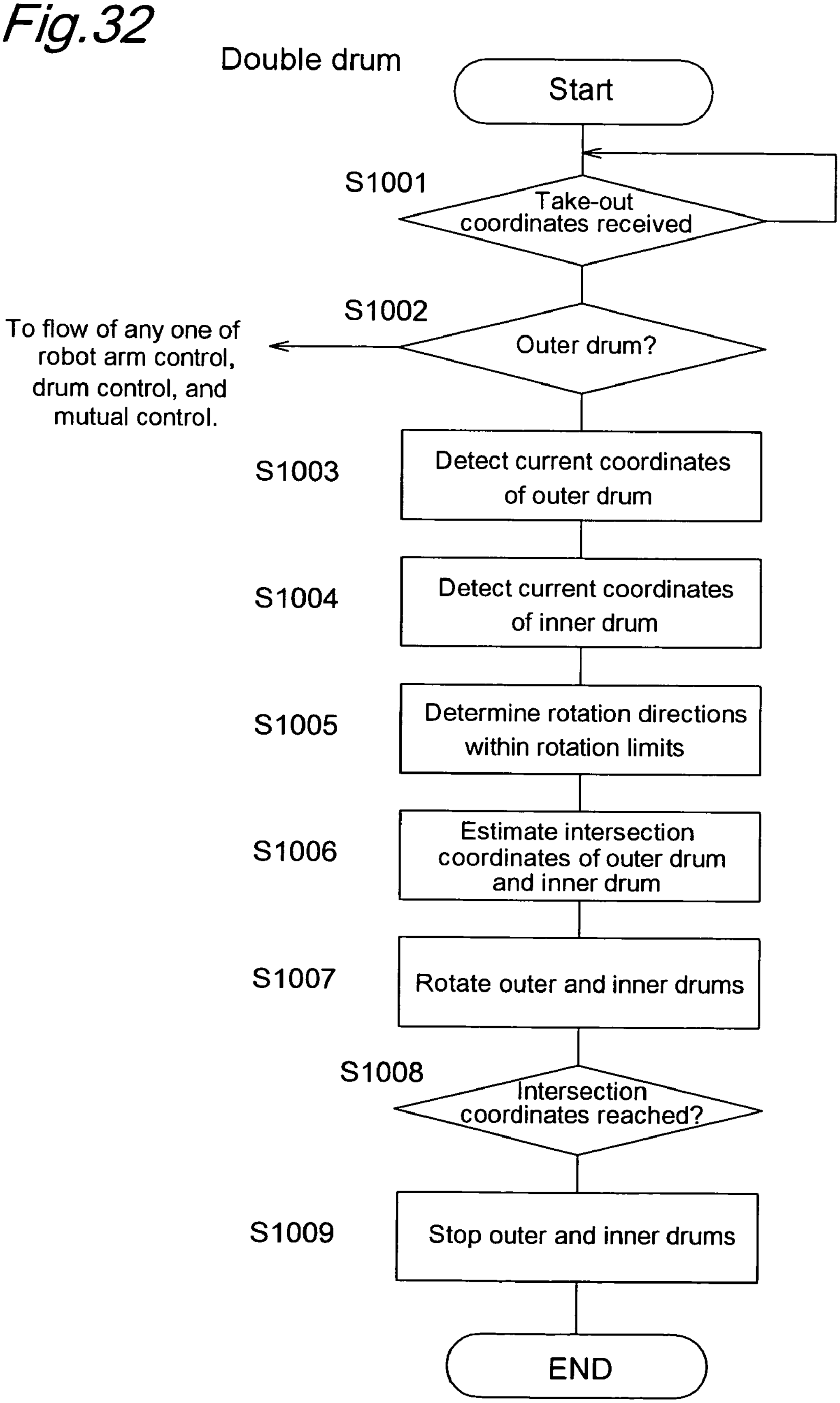
FIG. 32 is a flowchart diagram of drug filling position control performed by the double drums.

The drug filling position control performed in the double drum in the modified embodiments of FIGS. 28 and 29 will be described below with reference to the flowchart diagram of FIG. 32. When take-out coordinates are received in step S1001, it is judged whether or not the take-out coordinates apply to the outer drum 1022 in step S1002. If the take-out coordinates apply not to the outer drum 1022 but to the inner drum 1021, the flow of any one of the mutual control, the drum control, and the robot arm control according to the aforementioned embodiment shown in FIGS. 25 to 27 is performed. If the take-out coordinates apply to the outer drum 1022, the current coordinates of the outer drum 1027 are detected in step S1003, the current coordinates of the inner drum 1021 are detected in step S1004, the rotation directions of the inner drum 1021 and the outer drum 1022 within their rotation limits are determined based on these coordinates in step S1005, and the intersection coordinates of the outer drum 1022 and the inner drum 1021 are estimated in step S1006. The inner drum 1021 and the outer drum 1022 rotate in step S1007, and if the intersection coordinates are reached in step S1008, the inner and outer drums 1021 and 1022 stop in step S1009.

<Drug Filling Position Control of the Double Drum in Modified Embodiment 3>

Figure 33:
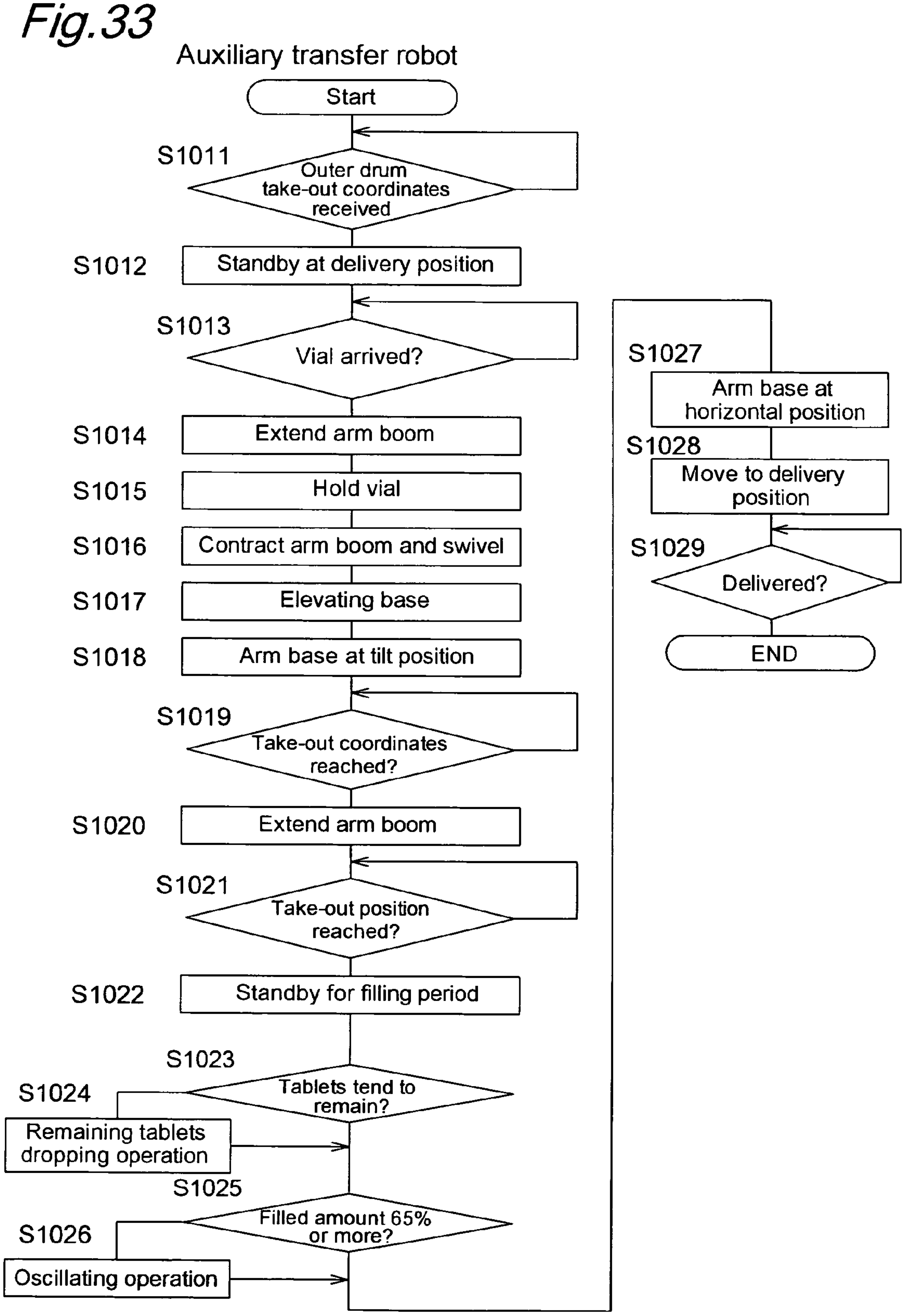
FIG. 33 is a flowchart diagram of drug filling position control performed by the auxiliary transfer robot.

The drug filling position control performed in the double drum by the auxiliary transfer robot 1025 in the modified embodiment 3 of FIG. 30 will be described below with reference to the flowchart diagram of FIG. 33. Upon receiving take-out coordinates of the outer drum 1022 in step S1011, the auxiliary transfer robot 1025 stands by at the delivery position of the second transfer robot 250 in step S1012. If the auxiliary transfer robot 1025 detects in step S1013 that a vial 3 held by the second transfer robot 250 has arrived, it extends the boom 1027 in step S1014, and holds the vial 3 in step S1015. The auxiliary transfer robot 1025 contracts the boom 1027 and swivels the swivel table 1028 toward the drum 1022 in step S1016. The auxiliary transfer robot 1025 lifts the lifting table 1026 in step S1017, and tilts the arm base 1029 at the tilt position in step S1018. If the auxiliary transfer robot 1025 reaches the take-out coordinates in step S1019, it extends the boom 1027 in step S1020. If the boom 1027 reaches the take-out position in step S1021, it stands by for a predetermined filling time in step S1022. This permits tablets to be dispensed into the vial. Subsequently, the auxiliary transfer robot 1025 detects in step S1023 whether or not the tablets are of a type that tends to remain. If the tablets are of a type that tends to remain, the auxiliary transfer robot 1025 performs an operation of dropping off the remaining tablets by extending and contracting the boom 1027 two or three times in step S1024. If the tablets are not of a type that tends to remain, the auxiliary transfer robot 1025 judges in step S1025 whether or not the filled amount of tablets is 65% or more. If the filled amount is 65% or more, the auxiliary transfer robot 1025 performs an oscillating operation by tilting the arm base 1029 through minus 5 degrees in step S1026. If the filled amount is less than 65%, the auxiliary transfer robot 1025 locates the arm base 1029 at the horizontal position in step S1027, moves to the delivery position of the second transfer robot 250 in step S1028, and, upon confirmation of the delivery in step S1029, ends it operation.

6. Third Transfer Robot 350

Figure 34:
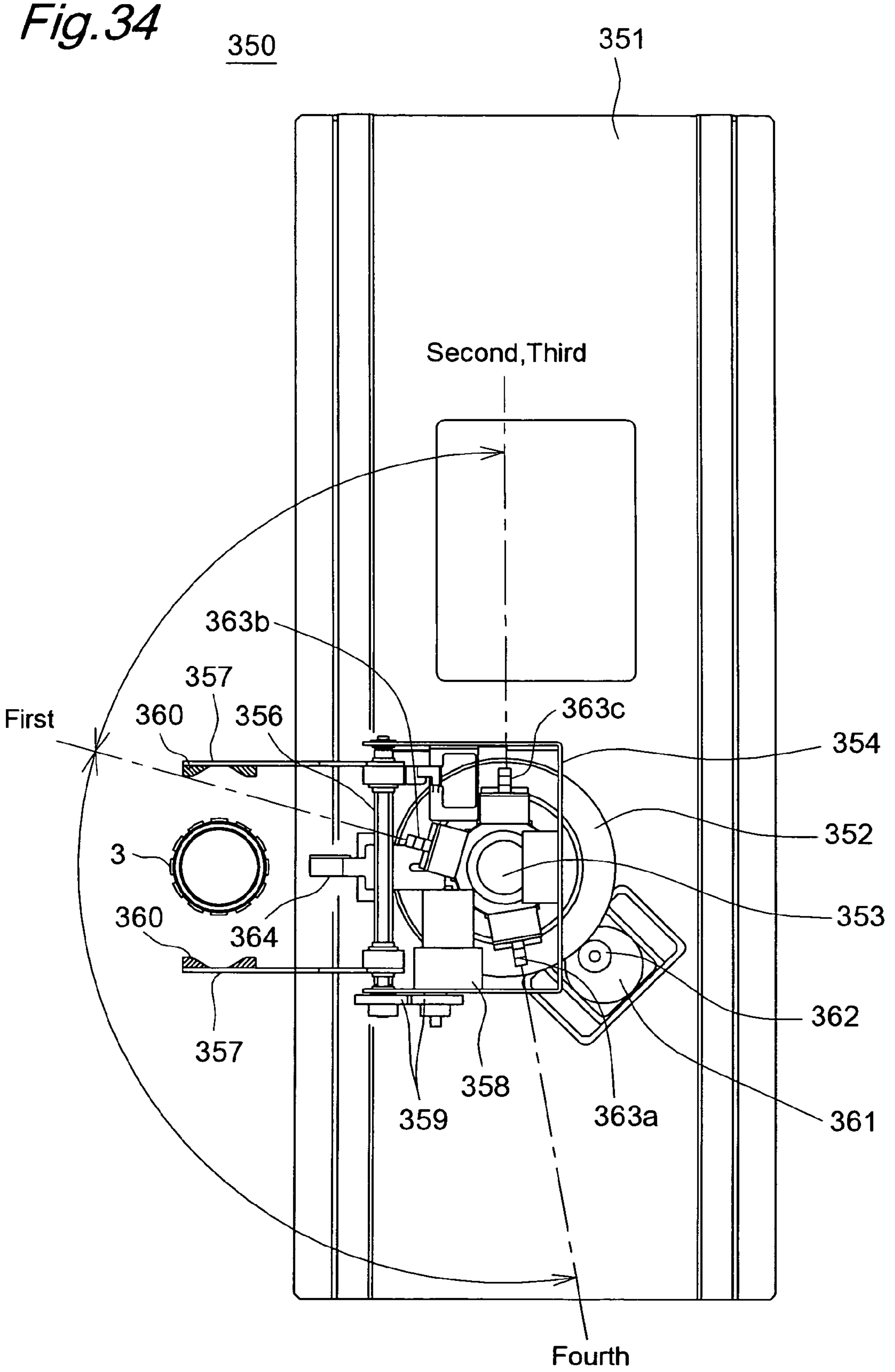
FIG. 34 is a flowchart diagram showing operation performed by a third transfer robot.
Figure 35:
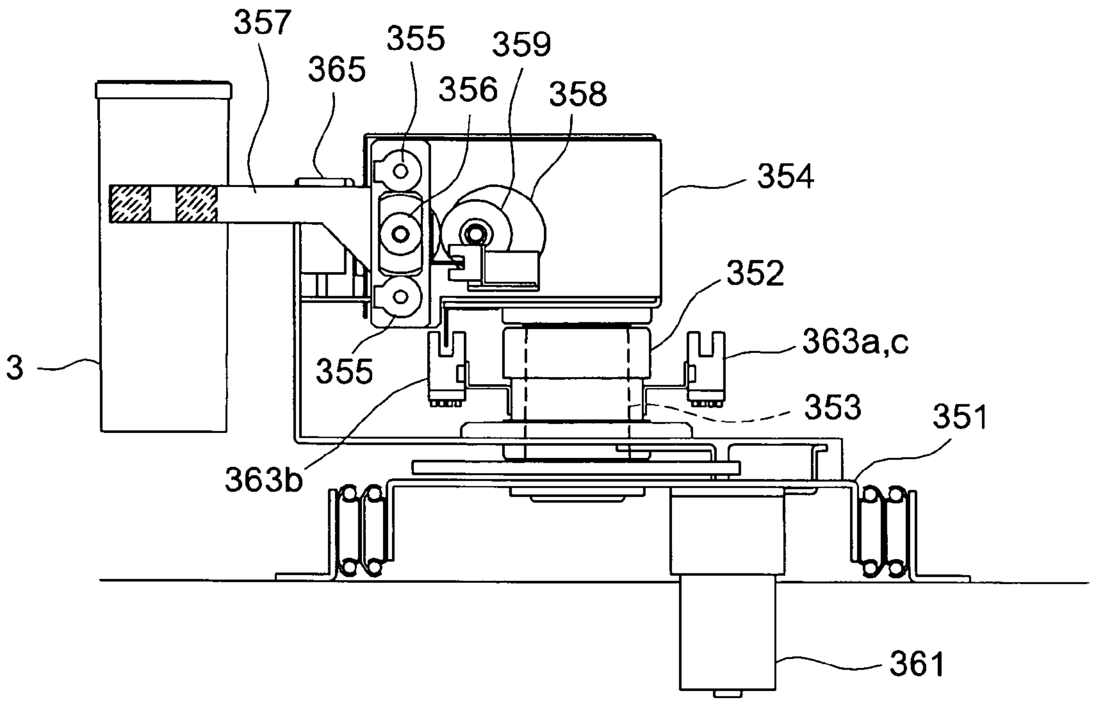
FIG. 35 is a flowchart diagram showing operation performed by a third transfer robot.

The third transfer robot 350 has, as shown in FIGS. 34 and 35, a rotation shaft 353 that is rotatably and vertically supported by a base 352 of a fitting base 351 fitted to the main body 10. To the ends of the arm base 354, guide bars 355 are fitted in pairs at the upper and the lower positions, respectively, with a ball screw 356 stretched in between. One pair of arms 357 have base ends thereof slidably joined to the guide bars 355 and also screwed with the ball screw 356. One end of the ball screw 356 is coupled with a gear 359 in between to an arm driving motor 358 fitted to the arm base 354. This permits the distance between the arms 357 to become wider or narrower when the arm driving motor 358 is driven, thereby permitting holding and releasing of the vial 3. To the ends of the arms 357, pads 360 are fitted which press against the vial 3. The lower end of the rotation shaft 353 is coupled with a gear 362 in between to a rotation driving motor 361 fitted to the fitting base 351. This permits the arm base 354 to be rotatable about the rotation shaft 353.

The base 352 is fitted with three position detection sensor 363*a*, 363*b*, and 363*c* which are located around the rotation shaft 353 for detecting the rotation position of the arm base 354. This permits the arm 357 to be rotatably moved between a first delivery position for receiving the vial 3 transferred by the first transfer robot 150 or the second transfer robot 250, a second delivery position for passing over the vial 3 to the photographing part 400, a third delivery position for passing over the vial 3 to the capping part 600 (the same as the second deliver position in this embodiment), and a fourth delivery position for passing over the vial 3 to the fourth transfer robot 450. Moreover, the rotation shaft 353 is fitted with a vial detection sensor 364 for detecting that the vial 3 is at a position that permits the arms 357 to hold the vial 3. Furthermore, the arm base 354 is fitted with a position detection sensor 365 for detecting an open-close position of the arms 357.

Figure 36:
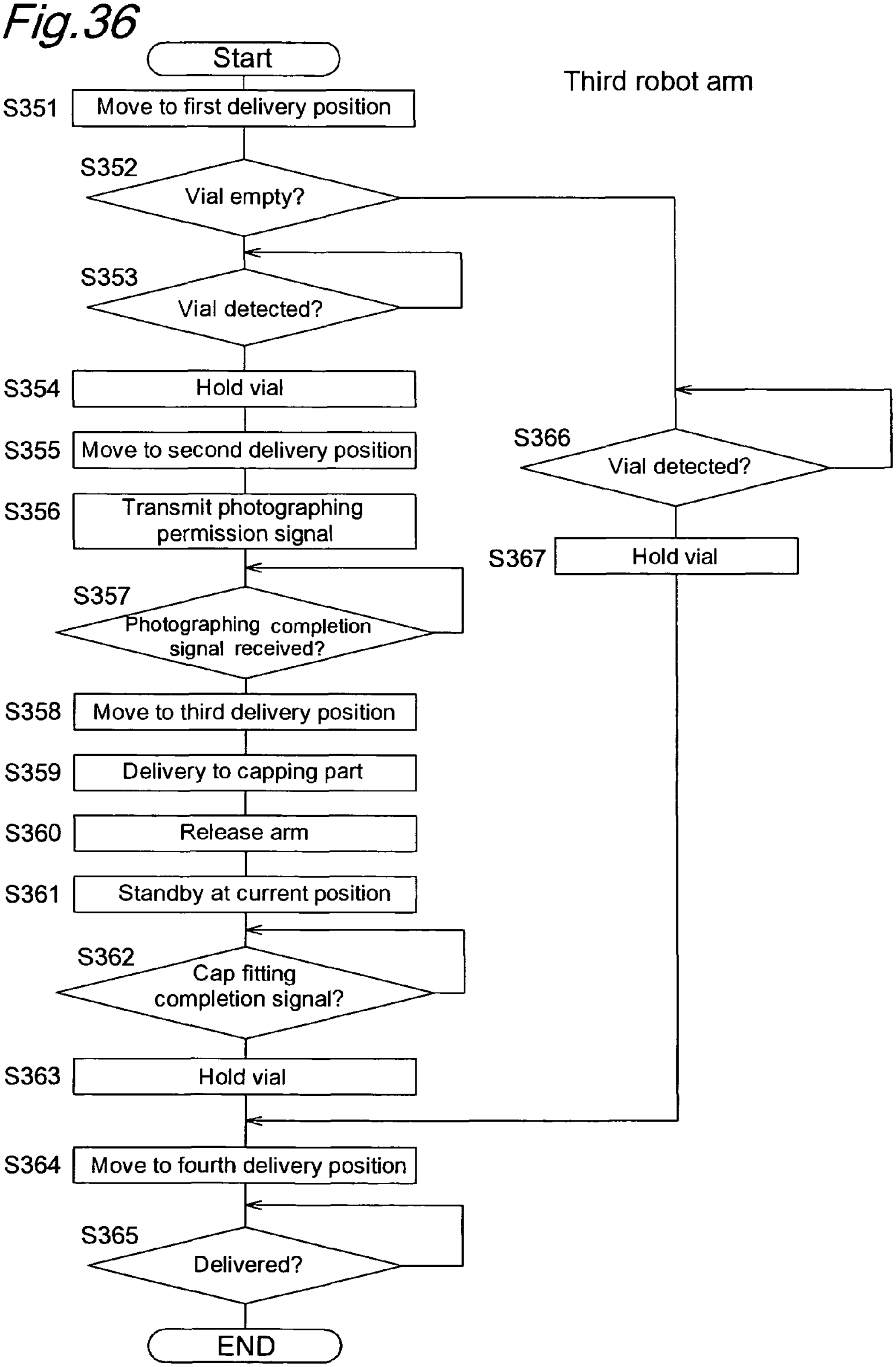
FIG. 36 is a flowchart diagram showing operation performed by a third transfer robot.

The operation performed by the third transfer robot 350 with the construction described above will be described with reference to the flowchart diagram FIG. 36. The third transfer robot 350 moves to an origin, i.e., the first delivery position, in step S351, and judges whether or not the vial is empty in step S352. If the vial is not empty, processing proceeds to step S353. If the third transfer robot 350 detects the vial at the first delivery position in this step, it holds the vial in step S354, moves to the second delivery position in step S355, and transmits a photographing permission signal to the PC801 in step S356. If the third transfer robot 350 receives a photographing end signal from the PC801 in step S357, it moves to the third delivery position in step S358, delivers it to the capping part 600 in step S359, releases the arms 357 in step S360, and stands by at the current position in step S361. If the third transfer robot 350 receives a cap-fitting signal from the device controller 802 in step S362, it holds the vial in step S363, moves to the fourth delivery position in step S364, and, upon confirmation of the delivery in step S365, ends its operation. If the vial 3 is empty in step S352, the processing proceeds to step S366. If the third transfer robot 350 detects the vial 3 at the first delivery position in this step, it holds the vial 3 in step S367, moves to the fourth delivery position in step S364, and, upon confirmation of the delivery in step S365, ends its operation.

7. Photographing Part 400

The photographing part 400 is, as shown in FIG. 5, built by fitting a digital camera 402 to the end of a support member 401 fitted to the main body 10 such that the lens of the digital camera 402 faces downward. The digital camera 402 is so configured as to be capable of photographing the interior of the vial 3 already filled with tablets and delivered by the third transfer robot 350 from above the vial 3. The support member 401 is movable horizontally in the anteroposterior direction and the left-right direction and also is liftable vertically with respect to the main body 10, by a driving motor (not shown), which is driven and controlled by the device controller 802.

Figure 37:
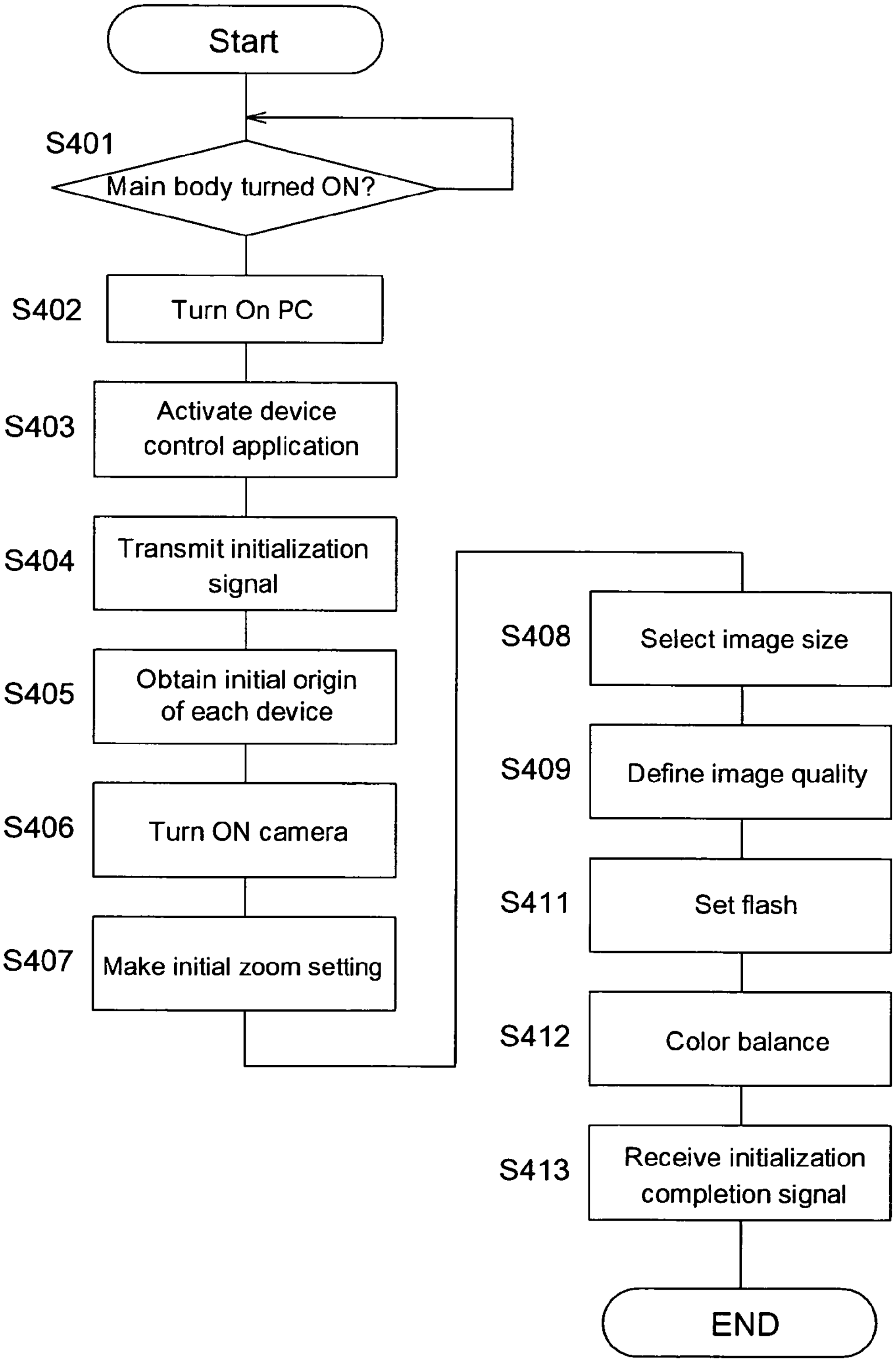
FIG. 37 is a flowchart diagram showing photographing initialization operation.

Photographing initialization operation performed by the device controller 802 on the photographing part 400 will be described referring to the flowchart diagram shown in FIG. 37. If the main body 10 is turned ON in step S401, the PC801 is turned ON in step S402, whereby the device control application is activated in step S403. The device controller 802 transmits an initialization signal to each device in step S404, and obtains the initial origin of each device in step S405. Subsequently, the device controller 802 turns ON the digital camera 402 in response to directions from the software in step S406, and makes setting in steps S407 to 411, i.e., initial zoom setting, image size selection, image quality setting, flash setting, and color balance, respectively. The device controller 802 ends its operation upon receiving an initialization end signal in step S412.

Figure 38:
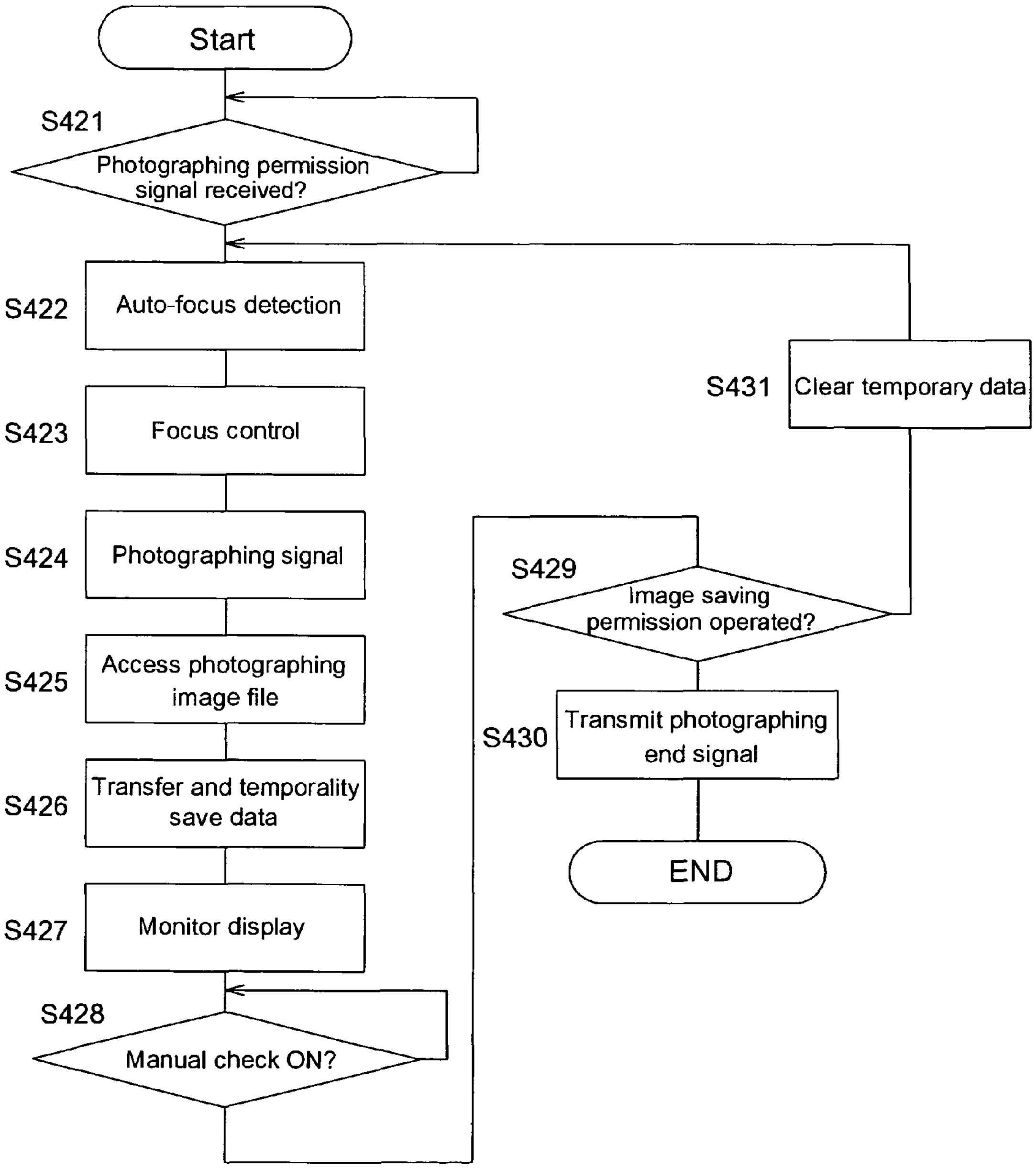
FIG. 38 is a flowchart diagram showing photographing control operation.

Next, photographing control operation will be described with reference to the flowchart diagram of FIG. 38. First, when a photographing permission signal is received in step S421, and auto-focus detection is performed to thereby obtain an average over a plurality of times in step S422. Based on this detected value, focus control is performed in step S423, and a photographing signal is transmitted in step S424. An image file is accessed in step S425, data of the image file is transferred and temporarily saved in step S426, and a monitor is displayed on the operation display panel 20 in step S427. If manual-check is turned ON in step S428 and image saving permission is operated in step S429, a photographing end signal is transmitted in step S430, thereby ending the operation. If the image saving permission is not operated in step S429, the temporarily saved data is cleared in step S431, and the processing returns to step S422 to repeat the steps described above.

As described above, in the photographing part 400, the interior of a vial 3 filled with tablets can be photographed by the digital camera 402 before the vial 3 is plugged with the cap 2, and the resulting image can be confirmed on the operation display panel 20, thus permitting a quick and simple audit operation without opening the cap 2 of the vial 3 which has been taken out. Moreover, if the image confirmed on the operation display panel 20 during photographing is not clear, photographing can be performed once again, thus permitting a clear image to be obtained at any time.

Figure 39:
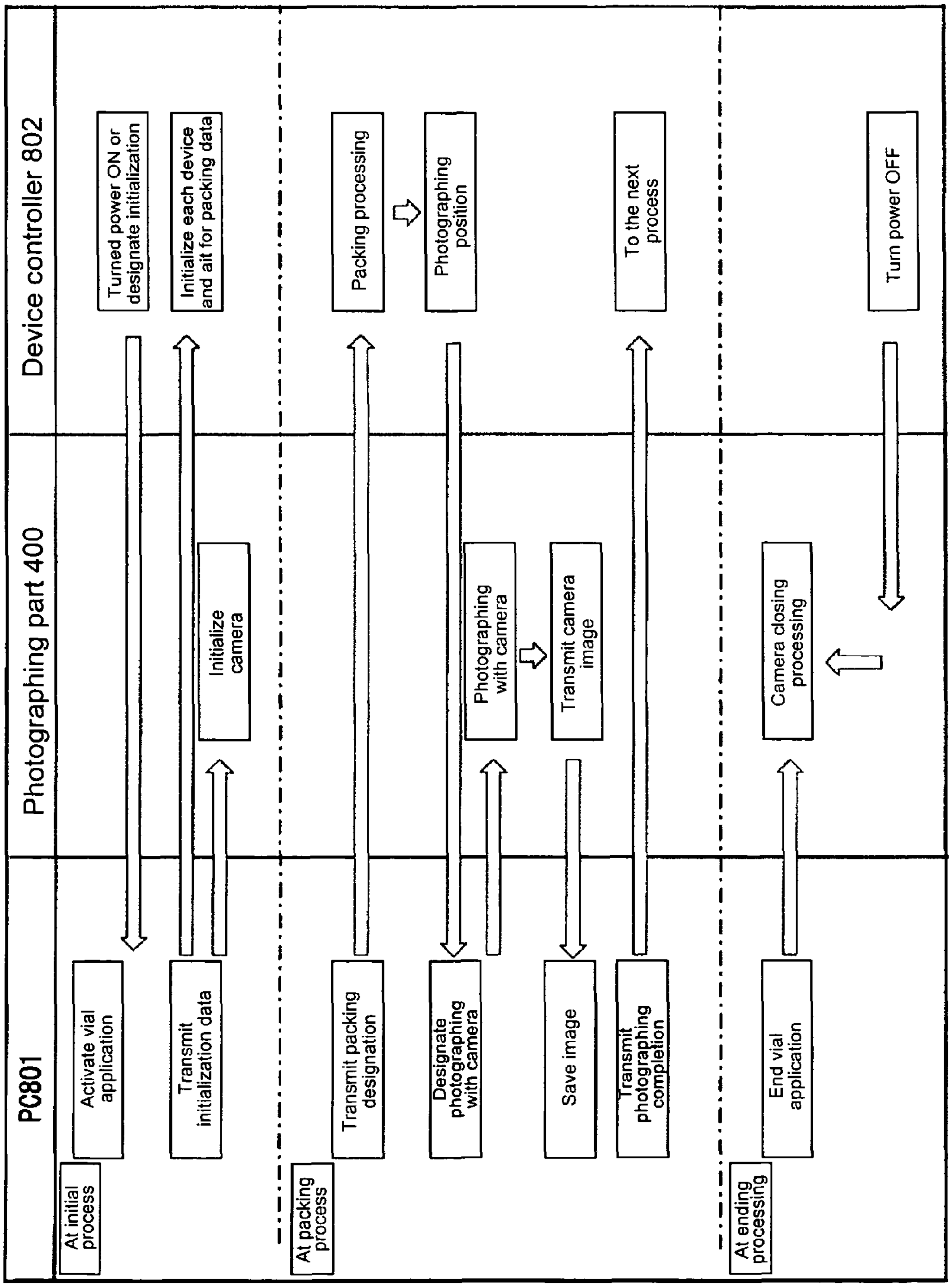
FIG. 39 shows a flow diagram of operation performed among a photographing part, PC, and a device controller.

FIG. 39 shows an operation flow among the photographing part 400, the PC801, and the device controller 802. At initial processing, when the main body is turned ON, the PC801 is turned ON to activate the device control application. When the device controller 802 provides an initialization designation to the PC801, the PC801 initializes the digital camera 402 of the photographing part 400 and transmits the initialization data to the device controller 802. Subsequently, the device controller 802 initializes the devices installed in the main body 10 and waits for packing data.

At packing processing, when the PC801 transmits a packing designation signal to the device controller 802, the device controller 802 controls the devices to perform packing. When the vial 3 filled with tablets reaches the photographing position, the device controller 802 transmits a camera-photographing signal to the PC801. The PC801 causes the digital camera 402 of the image-taking part 400 to perform camera-photographing. When the digital camera 402 transmits a camera image to the PC801, the PC801 saves the image and transmits a photographing completion signal to the device controller 802. The device controller 802 causes the devices to perform the next packing operation.

At ending processing, the PC801 causes the digital camera 402 of the photographing part 400 to perform camera-closing processing. When the main body is turned OFF, the device controller 802 causes the digital camera 402 of the photographing part 400 to perform camera-closing processing.

Figure 40:
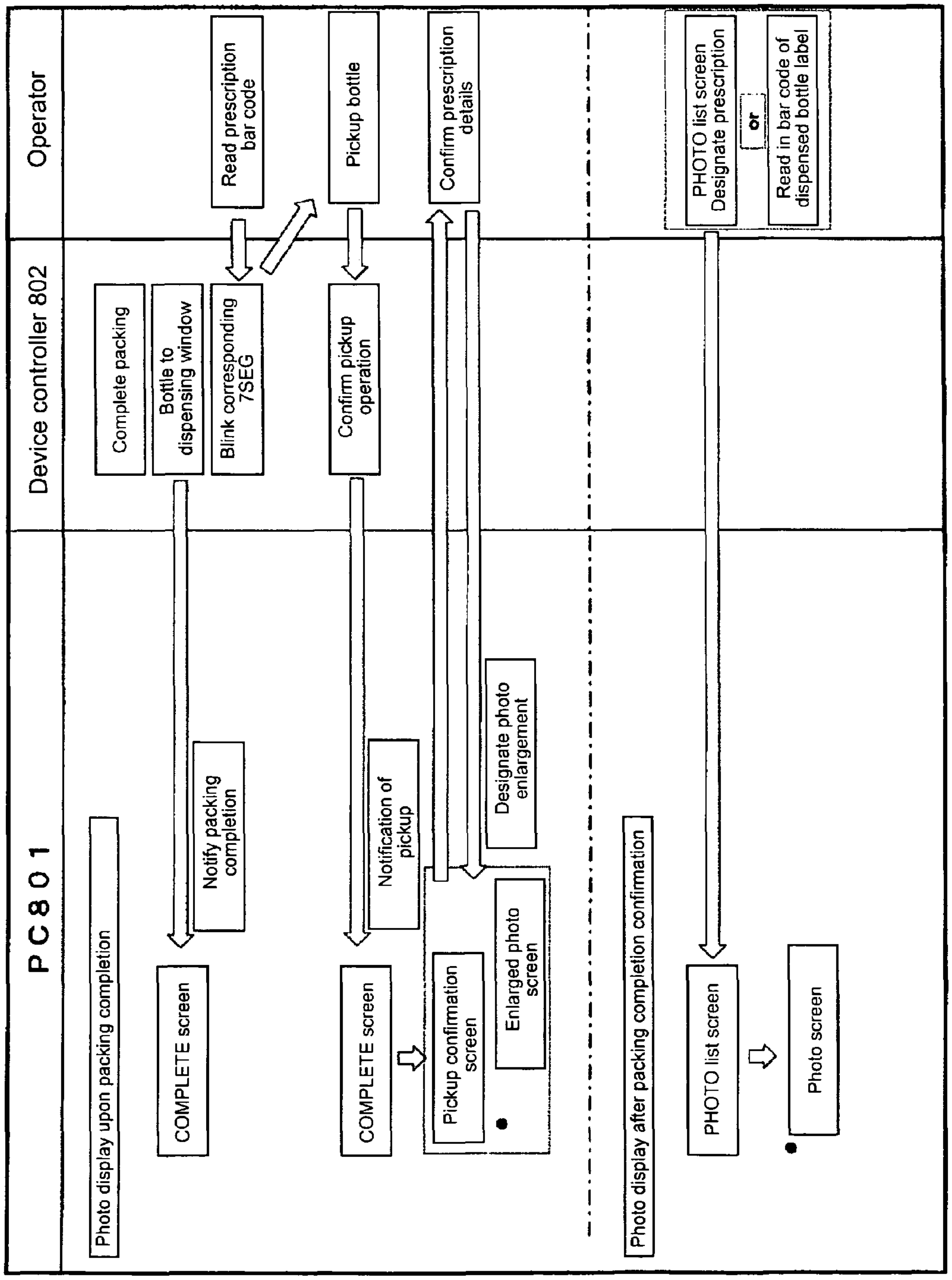
FIG. 40 shows a flow diagram of operation performed among PC, the device controller, and an operator.
Figure 45:
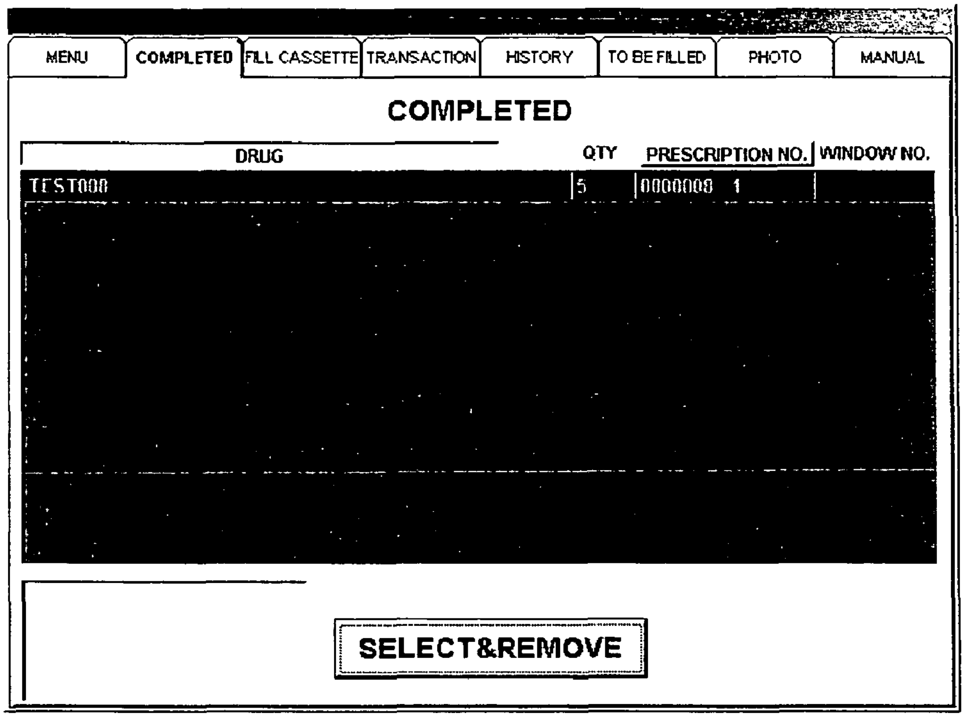
FIG. 45 is a view showing In-process prescription list screen 1.1.
Figure 46:
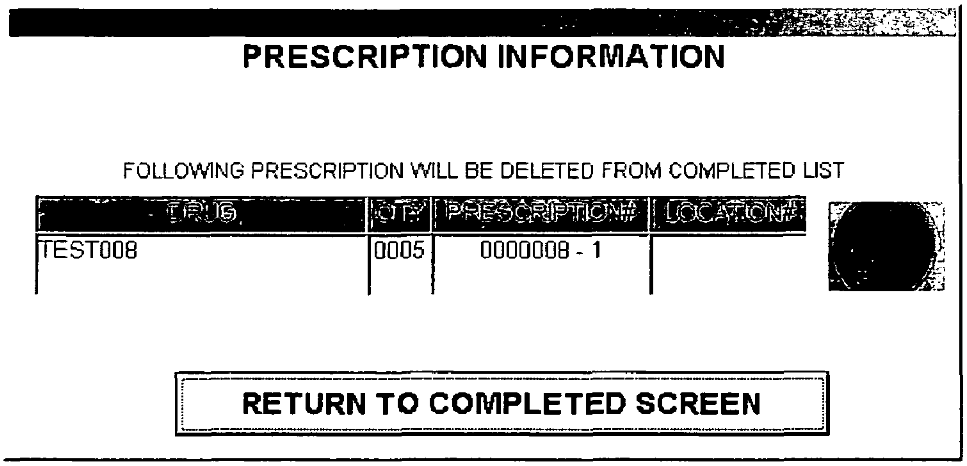
FIG. 46 is a view showing Vial take-out error confirmation screen 1.1.1.

FIG. 40 shows a flow of operation performed among the PC801, the device controller 802, and the operator. Upon completion of individual packaging, the device controller 802 transfers the vial 3 to the take-out ports 30*a-c* for storage, and notifies the PC801 of packing completion, whereby the PC801 displays already packed prescriptions on in-process prescription list screen 1.1 of the operation display panel 20 prescription as shown in FIG. 45. When the operator is prompted to read the bar code of the prescription, the device controller 802 blinks the 7SEG display of the take-out port 30*a*-30*c* that stores the vial 3 concerned. When the operator takes out the vial 3 through this take-out port 30*a-c*, the device controller 802 notifies the PC801 that the vial 3 has been taken out. The PC801 opens on the operation display panel 20 the vial take-out error confirmation screen 1.1 shown in FIG. 46. Then the operator confirms the details of the prescription, and when he or she touches the photographed image shown on the screen, the PC801 displays a vial interior photograph display screen 1.1.1.1 shown in FIG. 47.

After confirmation of packing, the operator specifies the prescription while viewing a dispensed vial photo list screen 1.5 shown in FIG. 61, or when the bar code of the vial 3 is read, the PC801 opens on the operation display panel 20 a photo display screen 1.6.1 shown in FIG. 63 displaying the interior photo of the vial 3.

8. Tablet Take-out Control Performed by an External Tablet Supply Part

Figure 41A:
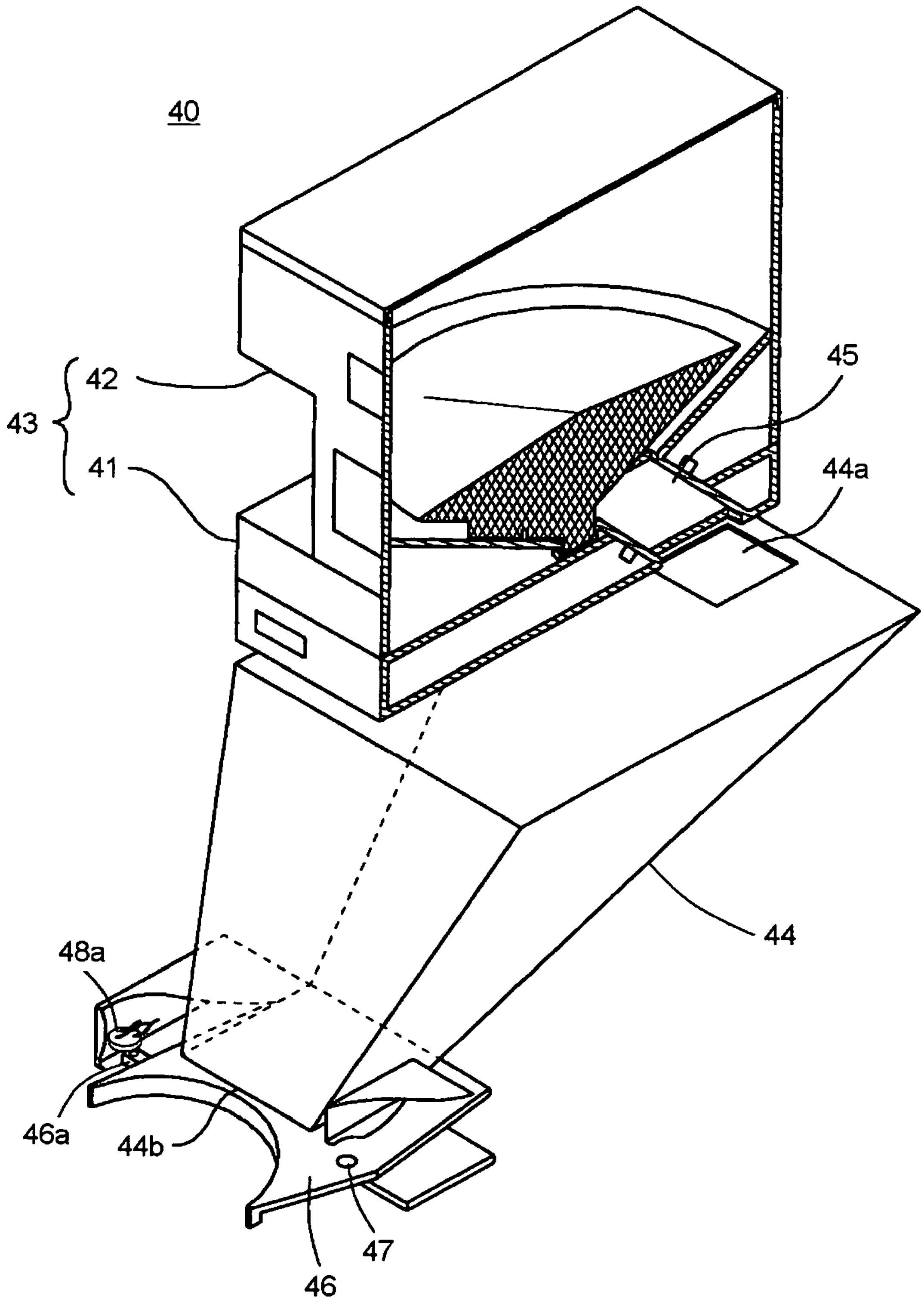
FIG. 41 A is a partially cutaway perspective view of an external tablet supply part.
FIG. 41B is a plan view of a shutter.
Figure 41B:
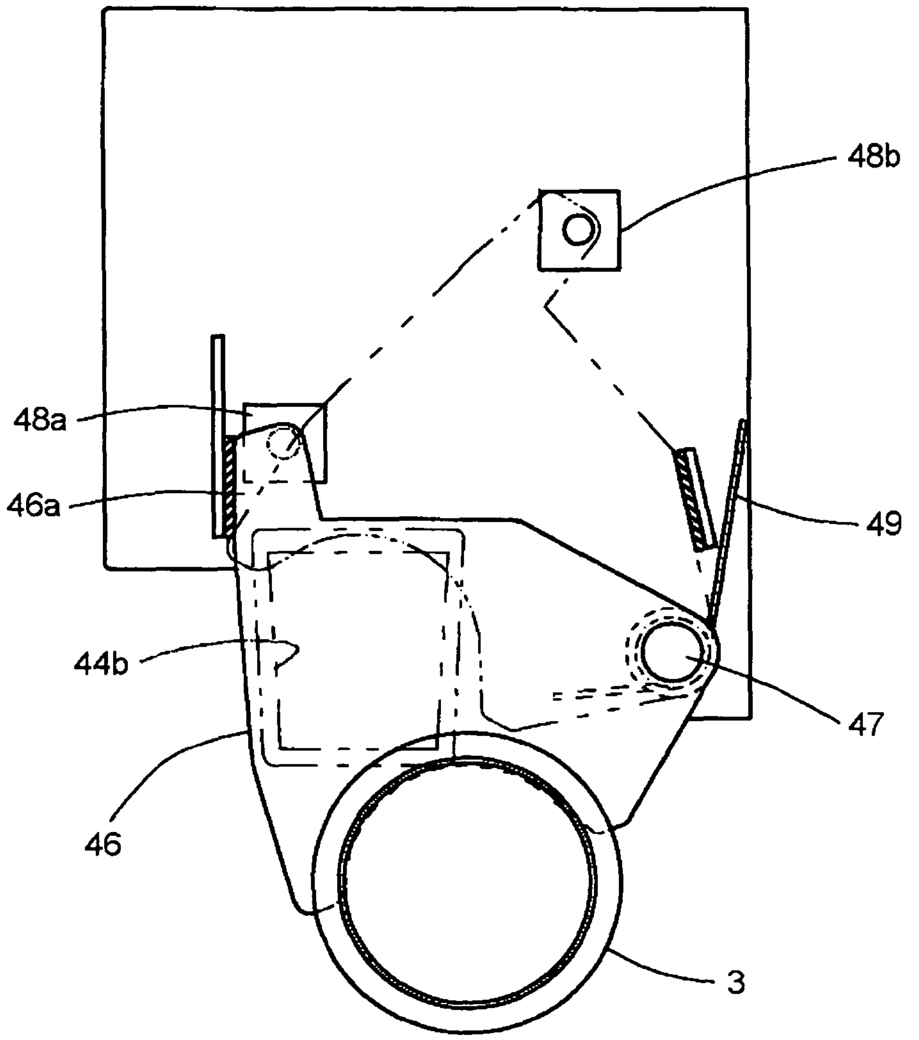

FIG. 41A shows the external tablet supply part 40. When tablets corresponding to prescription data are of a special type, such as pyrazolone, the external tablet supply part 40 instead of the tablet supply part 300 is used. The external tablet supply part 40 is composed of a tablet feeder 43 that is composed of a motor base 41 and a tablet cassette 42; and a tablet storage case 44. The motor base 41 is identical to the motor base 341 of the tablet supply part 300, except in that the outlet of the guide passage 341*c* of the motor base 341 included in the tablet supply part 300 is formed in the back surface of the motor base 341 while the outlet of a guide passage 45 is formed in the bottom surface of the motor base 41. The tablet cassette 42 is identical to the tablet cassette 342 of the tablet supply part 300. The tablet storage case 44 is different from that of the tablet supply part 300 in that it is provided below the motor base 41. The tablet storage case 44 has, at its upper end, an inlet 44*a*, connecting to the guide passage 45 and, at its lower end, an outlet 44*b*. The outlet 44*b* is provided with a shutter 46 which is so arranged as to be rotatable about a pin 47. The shutter 46 is, as shown in FIG. 41B, provided with a projected piece 46*a* which is detected by sensors 48*a* and 48*b* at the closing position and the open position. The shutter 46 is forced by a spring 49 in the closing direction. When tablets are discharged from the tablet cassette 42 to the tablet storage case 44 through the guide passage 45 of the motor base 41, the operator can manually fill the vial 3 with tablets by holding the vial 3 and pressing it against the shutter 46.

Figure 42:
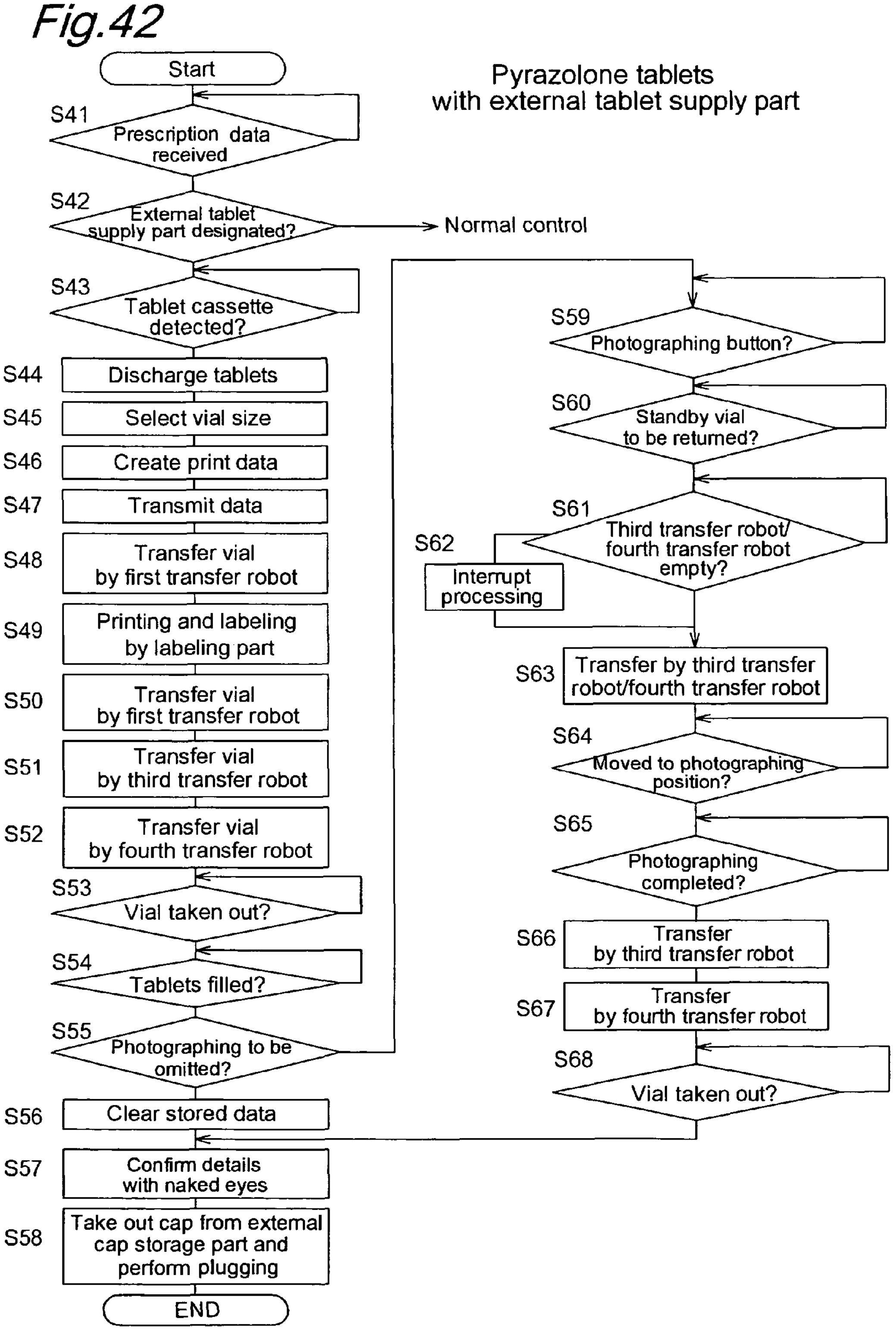
FIG. 42 is a flowchart diagram showing tablet take-out control performed by an external tablet supply part.

The tablet take-out control performed by this external tablet supply part 40 will be described below with reference to the flowchart diagram of FIG. 42. If prescription data is received in step S41, it is judged in step S42 whether or not the data is designated for the external tablet supply part 40. If the data is not designated for the external tablet supply part 40, normal tablet take-out control is performed. If the data is designated for the external tablet supply part, the external tablet supply part 40 detects the tablet cassette 42 corresponding to the prescription data in step S43, and discharges tablets in step S44. Subsequently, the vial size is selected in step S45, print data is created in step S46, and the print data is transmitted to the labeling part 200 in step S47. The vial 3 is delivered to the labeling part 200 by the first transfer robot 150 in step S48, printing and labeling are performed by the labeling part 200 in step S49, and the vial 3 is delivered by the first transfer robot 150 to the third transfer robot 350 in step S50. The vial 3 is transferred and delivered to the fourth transfer robot 450 by the third transfer robot 350 in step S51, and the vial 3 is transferred by the fourth transfer robot 450 to the storage part 700 in step S52. Then, if the operator takes out the vial 3 through the take-out ports 30*a-c* in step S53, the operator is asked in step S54 whether or not the vial has been filled with tablets. If the vial has been filled, the operator is asked in step S55 whether or not to omit photographing. If photographing is to be omitted, the data stored in the storage part 700 is cleared in step S56. The operator confirms the interior of the vial 3 with his or her naked eyes in step S57, and the cap 2 is taken out from the external cap supply part 50 for plugging the vial 3 in step S58.

If photographing is to be performed in step S55, a photographing button is pressed in step S59, and the vial 3 is returned in step S60. If the third transfer robot 350 or the fourth transfer robot 450 is occupied in step S61, interrupt processing is performed in step S62. If they are unoccupied, the vial 3 is delivered by the fourth transfer robot 450 to the third transfer robot 350, and the vial 3 is transferred by the third transfer robot 350 to the photographing part 400 in step S63. If it is detected that the vial 3 is located at the photographing position in step S64 and photographing is completed in step S65, the vial 3 is delivered by the third transfer robot 66 to the fourth transfer robot 450 in step S66, and the vial 3 is transferred by the fourth transfer robot 450 to the storage part 700 in step S67. If the vial 3 is taken out in step S68, processing returns to step S56, the operator confirms the vial with his or her naked eyes, and the cap 2 is taken out from an outer cap storage part 50 for plugging the vial 3 in step S58.

9. Operation Display Panel

Next, a description will be given on the embodiment of display and operation performed on the operation display panel 20. When the power button of the main body 10 is turned ON, the PC801 and the device controller 802 are turned ON, and the device controller 802 makes initial setting on each device and then transmits the position information of each device to the PC801, whereby initialization is completed and the PC801 turns into a standby state.

<Main Menu Screen>

Figure 43:
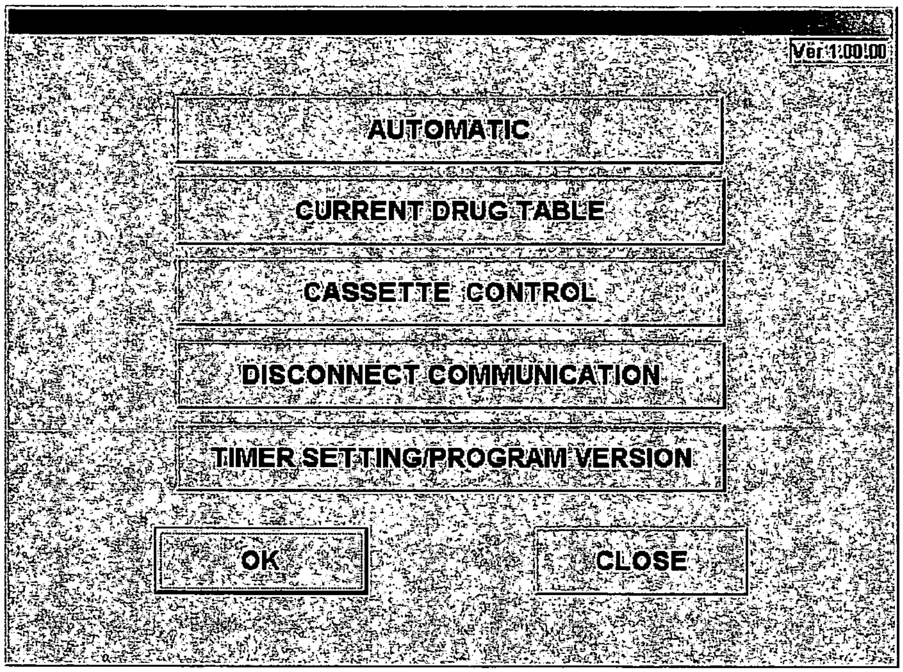
FIG. 43 is a view showing Main menu screen 0.0.

In the standby state, the operation display panel 20 opens the Main Menu screen 0.0 shown in FIG. 43. If the "AUTOMATIC" button, the "CURRENT DRUG TABLET" button, the "CASSETTE CONTROL" button, the "DISCONNECT COMMUNICATION" button, and the "TIMER SETTING/PROGRAM VERSION" button are respectively pressed and OK is pressed, the Automatic Dispensing screen 1.0 of FIG. 44, the Drug Table List screen 2.0 of FIG. 67, the Tablet Cassette Control screen 3.0 of FIG. 69, the Host Disconnection screen 4.0 of FIG. 70, and the Update Time Setting screen 5.0 of FIG. 71 open, respectively.

<Automatic Dispensing Screen>

Figure 44:
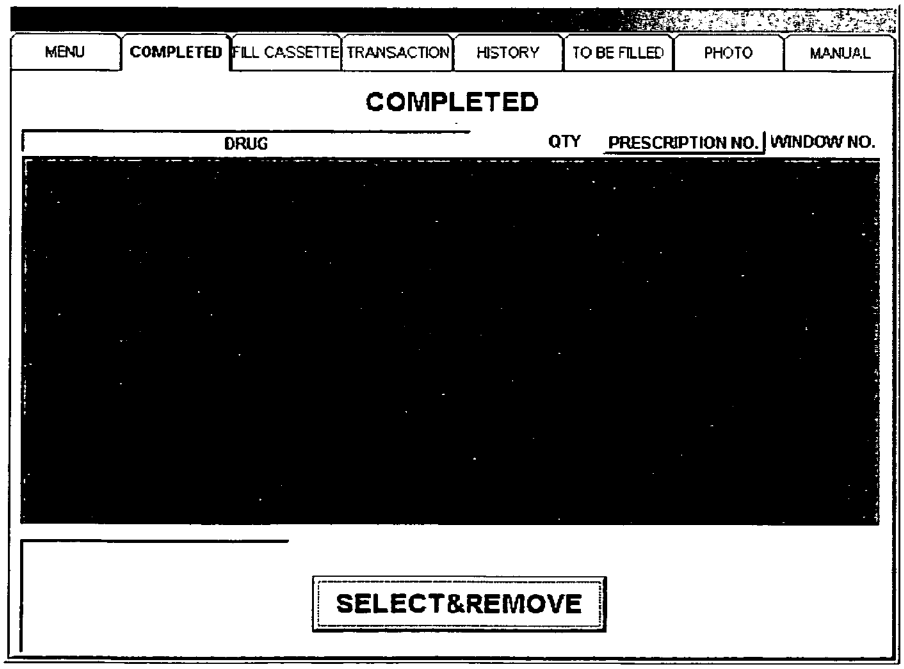
FIG. 44 is a view showing Automatic dispensing screen 1.0.

On the Automatic dispensing screen shown 1.0 of FIG. 44, clicking the "COMPLETED" tab, the "FILL CASSETTE" tab, the "TRANSACTION" tab, the "HISTORY" tab, the "TO BE FILLED" tab, the "PHOTO" tab, and the "MANUAL" tab open the In-process prescription list screen 1.1 of FIG. 45, the Drug filling cassette designation screen 1.2 of FIG. 48, the Processed prescription list screen 1.3 of FIG. 58, the Filling history drug selection screen 1.4 of FIG. 59, the Dispensing machine not-yet transmitted prescription list screen 1.5 of FIG. 61, the Dispensed vial photo list screen 1.6 of FIG. 62, and the Manual dispensing cassette designation screen 1.7 of FIG. 64, respectively.

<In-Process Prescription List Screen>

On the In-process prescription list screen 1.1 of FIG. 45, a list of prescriptions under dispensing is displayed. When a vial with which filling has been completed is taken out through the take-out port, the Vial take-out error confirmation screen 1.1.1 of FIG. 46 opens, prompting confirmation of the prescription and contents of the vial taken out. Touching the photo area on this Vial take-out error confirmation screen 1.1.1 opens the Vial interior photo display screen 1.11.1 of FIG. 47, displaying the photo of the interior of the vial on an enlarged scale.

<Drug Filling Cassette Specification Screen>

On the Drug filling cassette specification screen 1.2 of FIG. 48, the tablet cassette for filling drug is specified. When the tablet cassette number is inputted and OK is pressed, the New drug registration screen 1.2.1*a* of FIG. 49 opens if the tablet has not yet been registered for the tablet cassette concerned, or the NDC code check screen 1.2.1*b* of FIG. 52 opens if the tablets have been already registered. Pressing the "LIST" opens the Cassette list screen 1.2.2 of FIG. 55. Pressing the "STOCKS" button opens the Cassette-by-cassette tablet inventory list screen 1.2.3 of FIG. 56.

On the New drug registration screen 1.2.1*a* of FIG. 49, the tablets to be registered for the specified tablet cassette and master-slave cassette information are set. Tablets that are frequently dispensed in a large amount are filled using not one tablet cassette but a plurality of tablet cassettes. Here, it is defined that a tablet cassette serving as a main cassette is a master cassette while a tablet cassette serving as a subordinate cassette is a slave cassette. Pressing the "ENTER" button registers the tablets for the specified tablet cassette and opens the NDC code check screen 1.2.1*b* of FIG. 52. Pressing the "DATA BASE" button opens the Drug list display screen 1.2.1*a*.1 of FIG. 50 whereby a list of the contents of NDC masters is displayed. Selecting the drug to be deleted and pressing the "DELETE" button on this Drug list display screen 1.2.1*a*.1 opens the NDC master drug delete screen 1.2.1*a*.1.1 of FIG. 51, confirming if the drug selected on the list may be deleted from the NDC masters. Thus, the selected drug is deleted if it is accepted.

Figure 53:
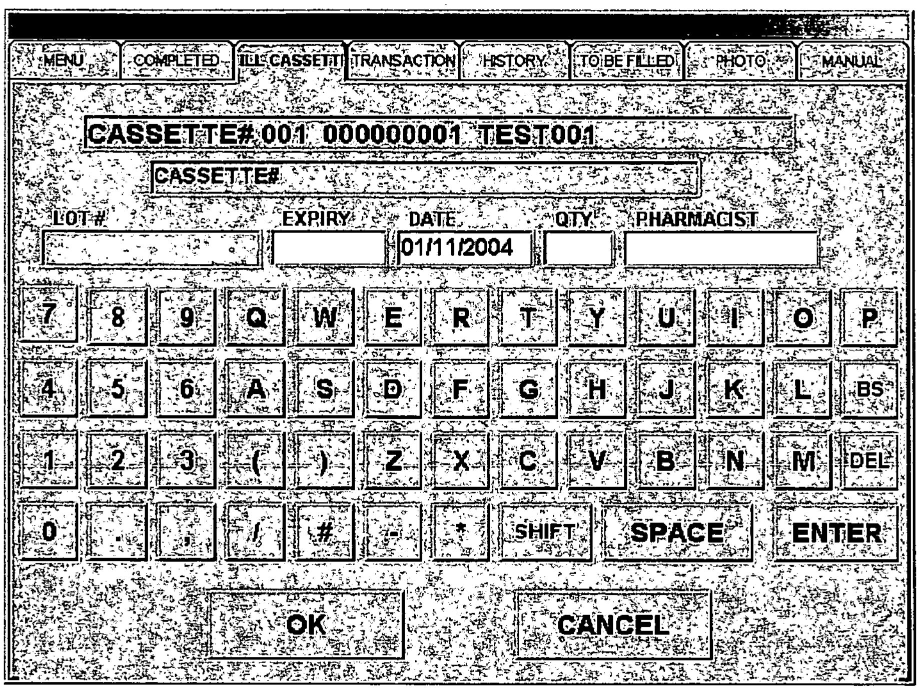
FIG. 53 is a view showing Tablet filling screen 1.2.1*b*.1.
Figure 54:
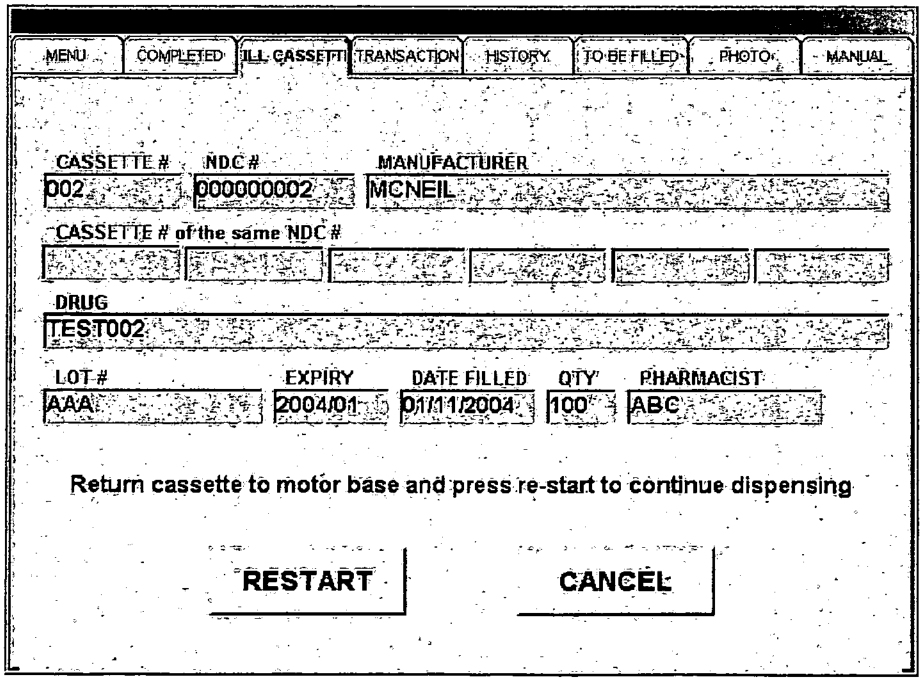
FIG. 54 is a view showing Filling confirmation screen 1.2.1*b*.1.1.

On the NDC code check screen 1.2.1*b* of FIG. 52, it can be checked, by reading the inputted tablet cassettes information and the bar code information printed on the drug to be filled, if the drug to be filled is appropriate. Manually inputting the NDC code and pressing the "ENTER" button can achieve the same operation as is achieved when the bar code is used. If the check result is OK, pressing OK opens the Tablet filling screen 1.2.1*b*.1 of FIG. 53. On this screen, inputting the tablet filling information and then pressing OK opens the Filling confirmation screen 1.2.1*b*.1.1 of FIG. 54, where it is checked if the inputted filling information is correct. If the check result is OK, the "RESTART" button is to be pressed.

Figure 55:
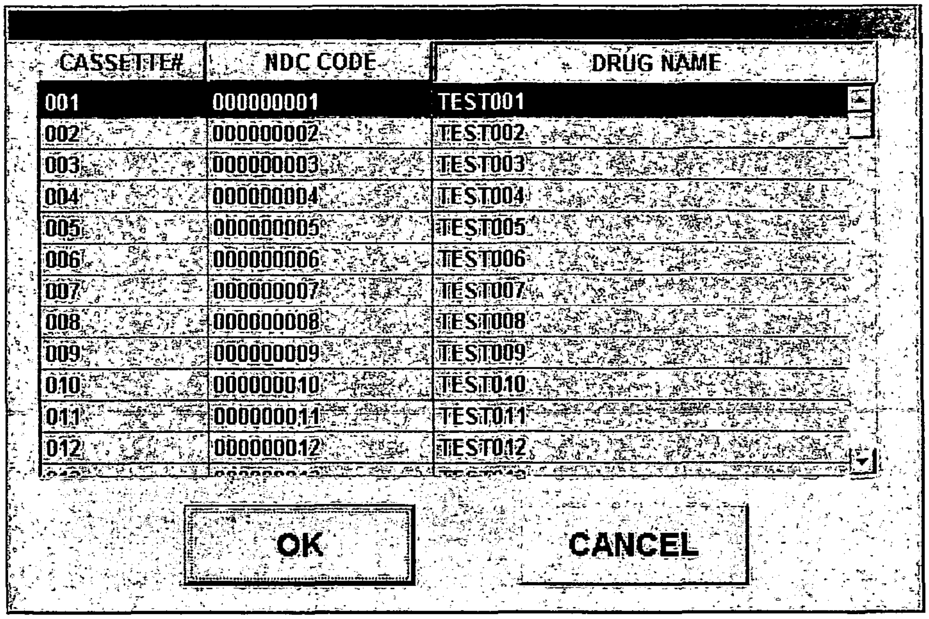
FIG. 55 is a view showing Cassette list screen 1.2.2.

On the Cassette list screen 1.2.2 of FIG. 55, a list is displayed indicating tablet cassettes and corresponding drugs registered for these tablet cassettes. Selecting the tablet cassette and then pressing OK permits transfer of this information to the new Drug registration screen 1.2.1*a*.

Figure 56:
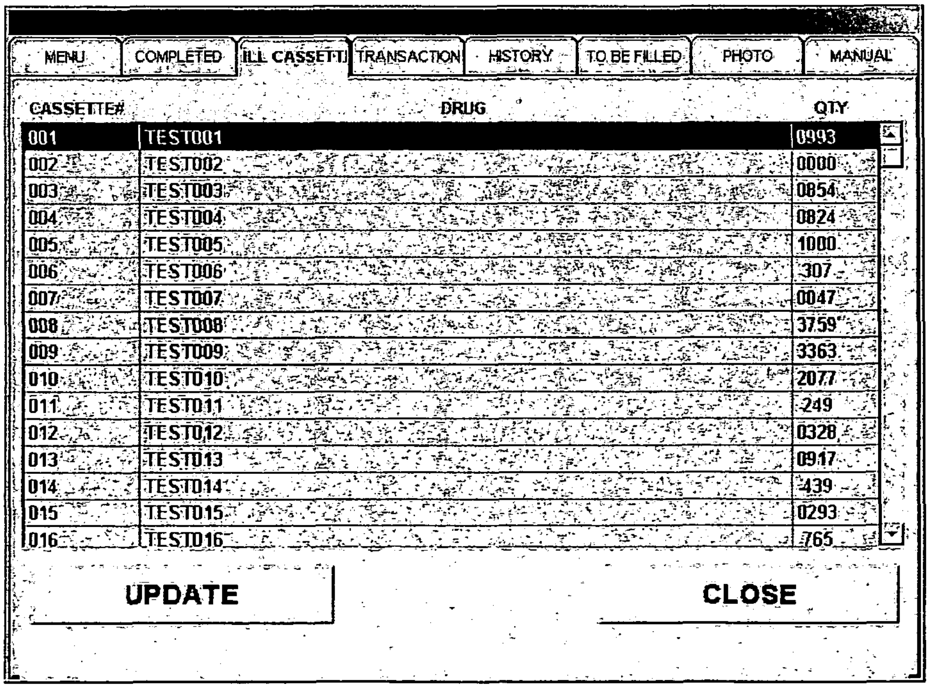
FIG. 56 is a view showing Cassette-by-cassette tablet inventory list screen 1.2.3.

On the Cassette-by-cassette tablet inventory list screen 1.2.3 of FIG. 56, a list is displayed indicating inventories of tablets registered for their corresponding tablet cassettes. To change the inventory, selecting the corresponding tablet cassette and pressing the "UPDATE" button opens the Tablet inventory change screen 1.2.3.1 of FIG. 57, permitting the new number of tablets to be set.

<Processed Prescription List Screen>

On the processed prescription list screen 1.3 of FIG. 58, a list of processed prescriptions is displayed. Selecting a prescription suffering from a filling failure or contamination and pressing "REFILL VIAL" permits providing a designation for dispensing the selected prescription again.

<Filling History Drug Selection Screen>

On the Filling history drug selection screen 1.4 of FIG. 59, a list of tablets filled into the tablet cassettes is displayed. Selecting the tablets and pressing the "SELECT" button opens the Filling history display screen 1.4.1 of FIG. 60, displaying a list of filling history of the selected tablets. Pressing the "SAVE" button causes the filling history data to be written into the floppy disk, and pressing the "PRINT" button causes the filling history to be printed out.

<Dispensing Machine Not-Yet-Transmitted Prescription List Screen>

On the Dispensing machine not-yet-transmitted prescription list screen 1.5 of FIG. 61, a list is displayed indicating data of prescriptions which were received from the host computer or manually inputted but have not yet been transmitted to the device controller. On this screen, selecting the prescription and then pressing the "DELETE" button permits deletion of this prescription.

<Dispensed Vial Photo List Screen>

On the Dispensed vial photo list screen 1.6 of FIG. 62, a list is displayed indicating prescriptions whose tablets in the vial have been photographed by the photographing part 400. Selecting the prescription and pressing the "SHOW" button opens the Photo display screen 1.6.1 of FIG. 63, displaying the photo of the interior of the vial corresponding to the selected prescription. By reading the bar code on the label of a vial taken out through the take-out port, the photo of the interior of this vial can be displayed on the Photo display screen 1.6.1 of FIG. 63. Viewing these photos permits auditing of whether the tablets have been filled in accordance with the prescription and also whether any contamination is present therein.

<Manual Dispensing Cassette Designation Screen>

Figure 65:
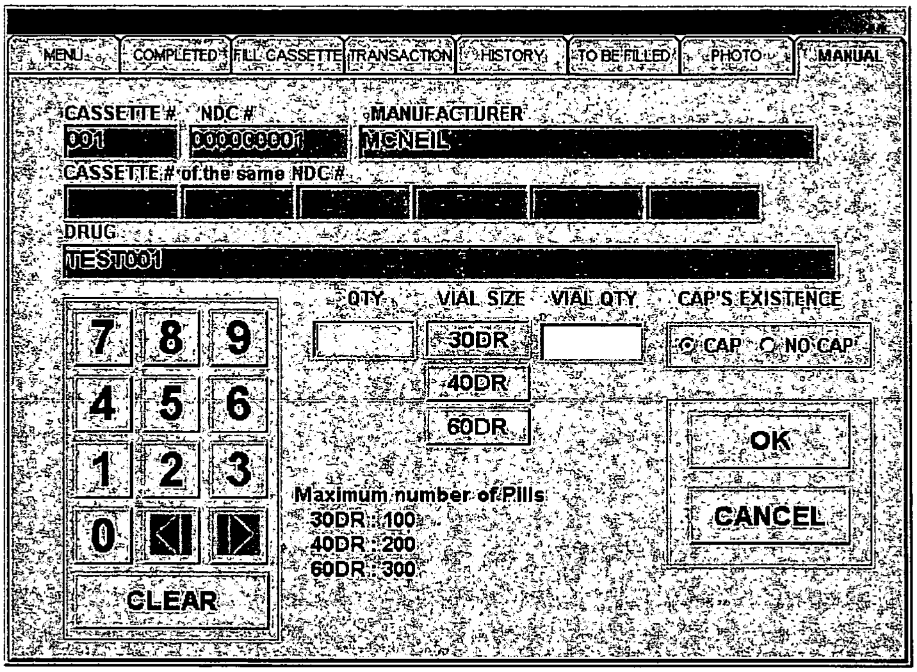
FIG. 65 is a view showing Manual dispensed tablet quantity designation screen 1.7.1.
Figure 66:
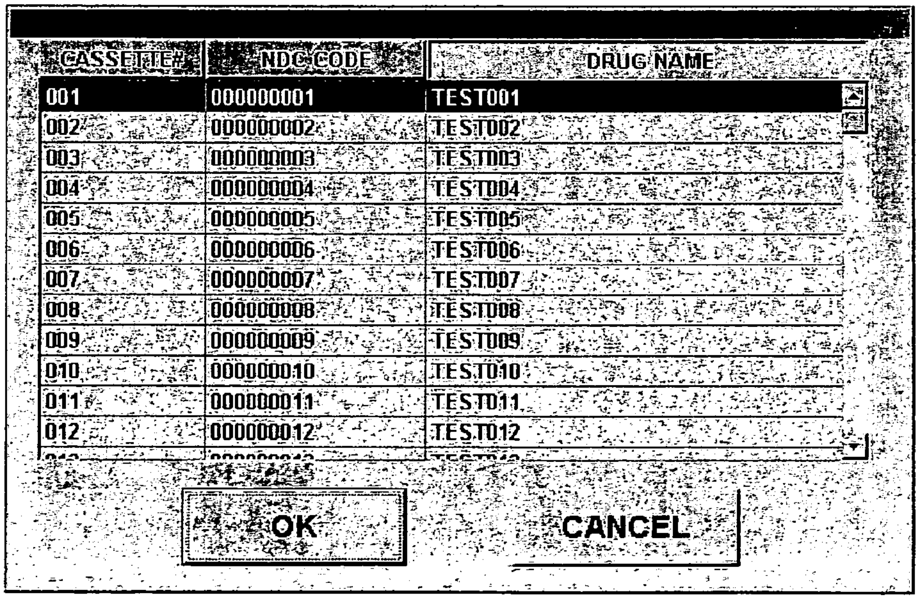
FIG. 66 is a view showing Cassette list screen 1.7.2.

On the Manually dispensing cassette designation screen 1.7 of FIG. 64, if no prescription data is received from the host computer, prescription data can be manually inputted to dispense tablets. Inputting the cassette number and pressing OK on this Manual dispensing cassette designation screen 1.7 opens the Manual dispensed tablet quantity specification screen 1.7.1 of FIG. 65, permitting specification of the quantity of tablets to be dispensed, the type of vial, and the presence or absence of a cap and then permitting transmission of this data. If the cassette number is unknown, pressing the "LIST" button on the Manual dispensing cassette designation screen 1.7 of FIG. 64 opens the cassette list screen 1.7.2 of FIG. 66, displaying a list of tablet cassettes and their corresponding registered drugs. Selecting the tablet cassette and pressing OK on this screen causes delivery of this information to the Manual dispensing cassette designation screen 1.7.

<Drug Table List Screen>

Figure 67:
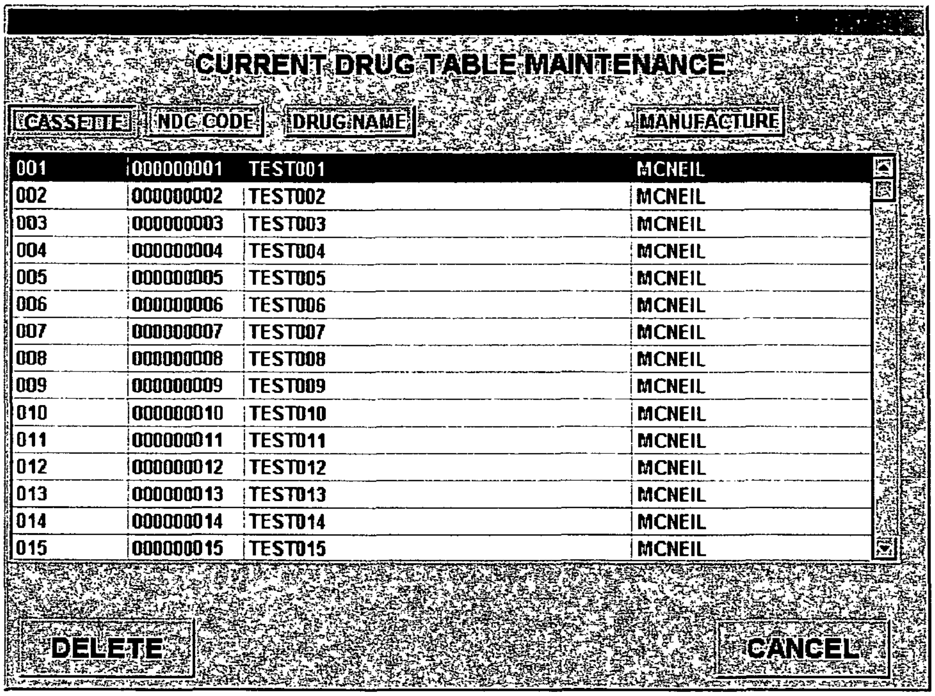
FIG. 67 is a view showing Drug table list screen 2.0.
Figure 68:
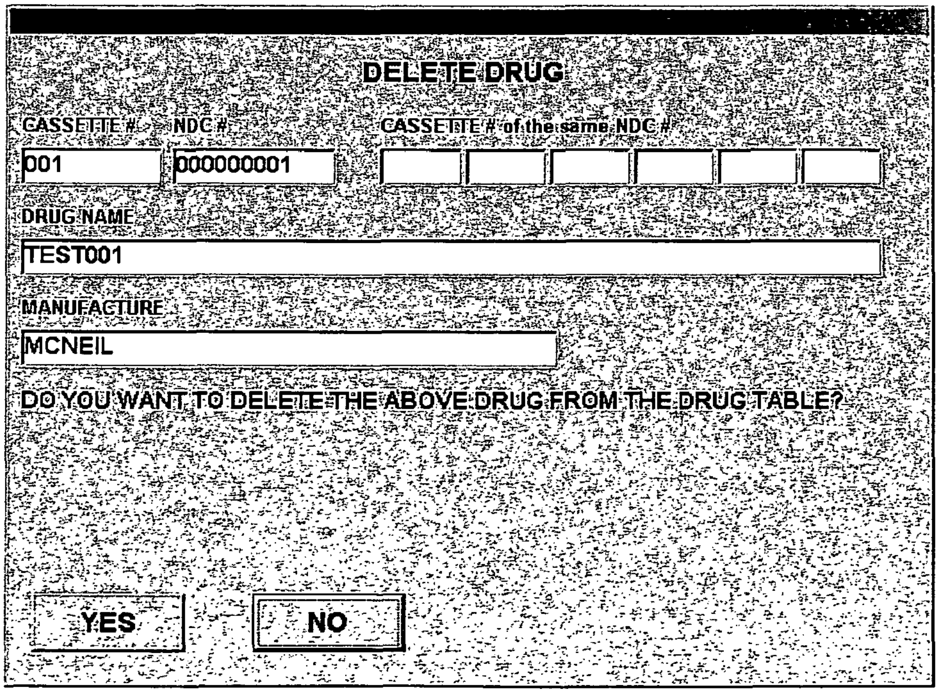
FIG. 68 is a view showing Deleted drug confirmation screen 2.1.

On the Drug table list screen 2.0 of FIG. 67, a list of drug masters currently registered can be displayed. Selecting the drug and pressing the "DELETE" button opens the Delete drug confirmation screen 2.1 of FIG. 68, where it is confirmed if the selected tablets may be deleted from the drug masters, and the selected tablets are deleted if it is accepted.

<Tablet Cassette Control Screen>

On the Tablet cassette control screen 3.0 of FIG. 69, a tablet cassette can be moved to the regular position for tablet filling or for maintenance of the motor base. Inputting the cassette number and pressing the "CENTER" button and then the "SEARCH" button permits rotation of the drum to thereby automatically move the specified tablet cassette from the current position to the regular position located on the front of the main body. Pressing the button "<<" or ">>" permits the drum to be moved to the left or to the right by one pitch.

<Host Disconnection Screen>

On the Host disconnection screen 4.0 of FIG. 70, it is specified what action is to be taken with the remaining processing on data in process when the application end processing is performed due to mechanical problems or the like occurring during the operation of this apparatus. To block the communication, delete unprocessed Rx data, and close the vial filling application, the check item indicated above is to be selected and then OK is to be pressed. To block the communication, return to the automatic dispensing screen 1.0, and complete all the un-dispensed Rx data remaining in the queue, the check item indicated below is to be selected and OK is to be pressed.

<Date Update Time Setting Screen>

Figure 71:
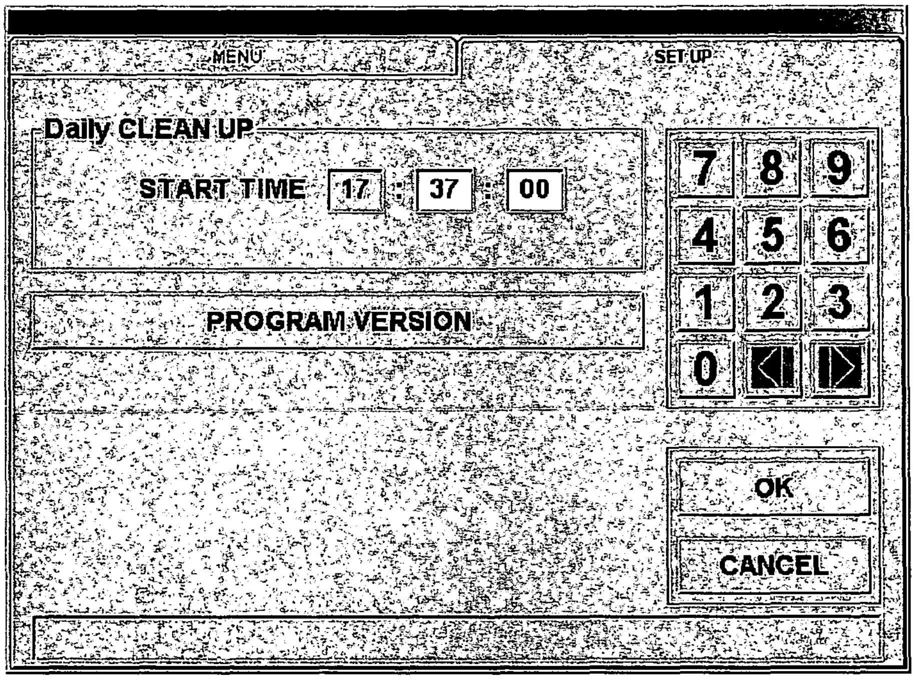
FIG. 71 is a view showing Program version information display screen 5.1.
Figure 72:
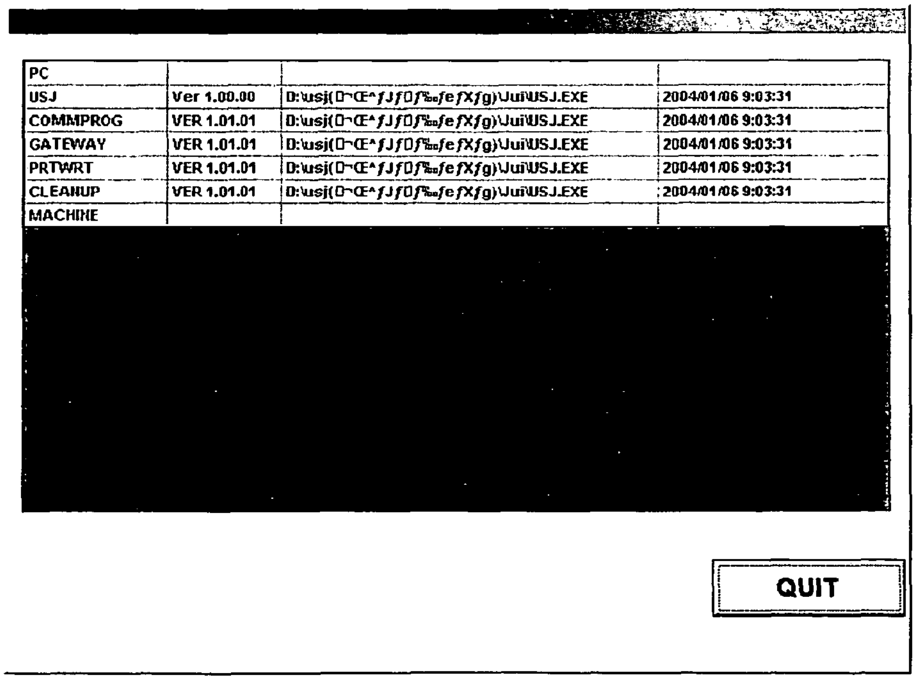
FIG. 72 is a view showing Date update time setting screen 5.0.

On the Date update time setting screen 5.0 of FIG. 71, the time for executing date updating on backup data can be inputted and OK can be pressed to make this setting. Pressing the "PROGRAM VESION" button opens the Program version information display screen 5.1 of FIG. 72, permitting display of the program version.

The invention claimed is:

1. A tablet storage and take-out apparatus comprising:

a vial supply part for storing vials and supplying the vials one by one;

a labeling part for putting a label with prescription information on the vial supplied from the vial supply part;

a tablet supply part for storing plural kinds of tablets and filling the vial with a specified number and type of the tablets according to prescription data of a prescription;

a cap supply part for storing caps for plugging the vials and supplying the caps one by one;

a capping part for plugging the vial, which is filled with tablets, with the cap supplied from the cap supply part; and a storage part for storing the vials filled with the tablets and plugged with the cap so that the vials can be taken out by an operator through take-out ports, the apparatus further comprising:

a photographing unit for photographing an interior of the vial after filling the vial with the tablets and before attaching the cap on the vial;

a storing unit for storing an image photographed by the photographing unit;

a prescription reading unit for reading a barcode of the prescription;

an indicating unit for indicating the take-out port storing the vial containing the tablets corresponding to the prescription read by the prescription reading unit; and a displaying unit for displaying a vial take-out error confirmation screen on an operation display panel when the vial is taken out from the indicated take-out port, wherein the take-out ports, the prescription reading unit and the displaying unit are positioned in the front surface of the apparatus, and wherein the displaying unit is operable to display both the prescription data of the prescription and an image of the tablet corresponding to the prescription data of the prescription from the image photographed by the photographing unit and stored in the storing unit on the vial take-out error confirmation screen so as to permit auditing of whether the tablets have been filled in accordance with the prescription data.

2. The tablet storage and take-out apparatus as in claim 1, further comprising:

a vial reading unit for reading a barcode of a label of the vial; and a displaying unit for displaying on the operation display panel the image of the tablet contained in the vial read out by the vial reading unit from the image photographed by the photographing unit and stored in the storing unit.

3. The tablet storage and take-out apparatus as in claim 1, further comprising:

a photo list displaying unit for displaying on the operation display panel a dispensed vial photo list screen including the image photographed by the photographing unit: and a displaying unit for displaying on the operation display panel the image of the tablet of the specific prescription data specified in the dispensed vial photo list screen from the image photographed by the photographing unit and stored in the storing unit.

4. The tablet storage and take-out apparatus as in claim 1, further comprising:

a focus control sensor for irradiating the surface of the filled tablets in the vial; and a focus control unit for focus controlling the photographing unit according to the detection value of the focus control sensor, wherein the photographing data of the photographing unit, after focus controlling by the focus control unit, is transferred to a control section of the tablet storage and take-out apparatus.

5. The tablet storage and take-out apparatus as in claim 4, further comprising an initializing unit for initializing the photographing unit in accordance with a command from the control section.

6. The tablet storage and take-out apparatus as in claim 4, further comprising a contrast control unit for controlling the contrast of the photographing unit in accordance with a command from the control section.

7. The tablet storage and take-out apparatus as in claim 4, wherein the focus control sensor is one which irradiates multiple times the surface of the tablets contained in the vial, and wherein the focus control unit adopts as the detection value the mean value of the multiple detection values of the focus control sensor.

8. The tablet storage and take-out apparatus as in claim 1, further comprising a supporting member for supporting the photographing unit on the body of the tablet storage and take-out apparatus, the supporting unit being movable horizontally in front and rear directions and left and right directions, wherein the supporting unit is also movable vertically.

* * * * *